United States Patent
Bandyk et al.

(10) Patent No.: US 12,486,711 B2
(45) Date of Patent: Dec. 2, 2025

(54) SECURITY SYSTEM FOR A MOVEABLE BARRIER OPERATOR

(71) Applicant: THE CHAMBERLAIN GROUP LLC, Oak Brook, IL (US)

(72) Inventors: Edward Bandyk, Woodridge, IL (US); Patrick Bruckner, Naperville, IL (US)

(73) Assignee: The Chamberlain Group LLC, Oak Brook, IL (US)

( * ) Notice: Subject to any disclaimer, the term of this patent is extended or adjusted under 35 U.S.C. 154(b) by 107 days.

(21) Appl. No.: 18/516,341

(22) Filed: Nov. 21, 2023

(65) Prior Publication Data

US 2024/0084637 A1 Mar. 14, 2024

Related U.S. Application Data

(63) Continuation of application No. PCT/US2022/031223, filed on May 26, 2022.
(Continued)

(51) Int. Cl.
*E05F 15/668* (2015.01)
*E05F 15/77* (2015.01)
*G07C 9/00* (2020.01)

(52) U.S. Cl.
CPC ............ *E05F 15/668* (2015.01); *E05F 15/77* (2015.01); *G07C 9/00857* (2013.01); *G07C 2009/00865* (2013.01)

(58) Field of Classification Search
CPC .... E05F 15/668; E05F 15/77; G07C 9/00857; G07C 2009/00865; G07C 9/00309;
(Continued)

(56) References Cited

U.S. PATENT DOCUMENTS 5,914,667 A 6/1999 Issa et al.
7,809,945 B2 * 10/2010 Kakii .................... H04L 9/3263
713/168

(Continued)

FOREIGN PATENT DOCUMENTS

EP 3748900 A1 12/2020

OTHER PUBLICATIONS

European Patent Office; Communication pursuant to Rules 161(2) and 162 EPC; dated Jan. 9, 2024; in connection with EP Application No. 22812206.5; 3 pages.
(Continued)

*Primary Examiner* — Nam V Nguyen
(74) *Attorney, Agent, or Firm* — Foley IP Law, PLLC

(57) ABSTRACT

In one aspect, a movable barrier operator is provided having a motor, a transmitter, a receiver, and a controller. The controller is configured to receive through the receiver a first public key from a remote control; determine a second public key and a second private key; and determine a shared secret session key using the second private key and the first public key. The controller is configured to operate the transmitter and receiver to bidirectionally communicate with the remote control so that the movable barrier operator can learn a fixed code and a changing code of the remote control. The bidirectional communications are encrypted using the shared secret session key. Upon the movable barrier operator successfully learning the remote control, the movable barrier operator transmits a long-term key to the remote control that is used to encrypt subsequent communications between the movable barrier operator and the remote control.

17 Claims, 53 Drawing Sheets

Related U.S. Application Data

(60) Provisional application No. 63/193,725, filed on May 27, 2021.

(58) Field of Classification Search
CPC .......... G07C 2009/00388; G07C 2009/00412; G07C 2009/00841; G07C 2009/00873; G07C 2009/00928; G07C 9/00896; H04L 9/0844; H04L 2209/80; H04L 9/0838; H04L 9/3226; H04L 63/0435; H04L 63/0823; H04L 9/16; H04L 9/3228; H04L 9/3268; H04L 9/0816; H04L 9/3271; H04W 12/50; B60R 2325/105; B60R 2325/106; B60R 2325/108; B60R 2325/40; B60R 25/24; G08C 2201/62
USPC ........................................................ 340/5.61
See application file for complete search history.

(56) References Cited

U.S. PATENT DOCUMENTS

| | | | | |
|---|---|---|---|---|
| 8,510,559 B2* | 8/2013 | Guccione | ............... | H04W 12/40 380/46 |
| 8,918,648 B2* | 12/2014 | Brown | .................. | H04L 9/0844 713/168 |
| 9,184,911 B2* | 11/2015 | Pahl | ..................... | H04L 63/166 |
| 10,812,262 B2* | 10/2020 | Hillan | .................. | H04L 9/0838 |
| 11,316,898 B2* | 4/2022 | Roozbehani | .......... | H04W 12/08 |
| 11,632,243 B1* | 4/2023 | Johnston | ................. | H04L 9/085 380/44 |
| 2006/0288209 A1* | 12/2006 | Vogler | .................. | H04L 9/0844 713/168 |
| 2009/0103726 A1* | 4/2009 | Ahmed | ..................... | H04L 9/12 380/46 |
| 2011/0019825 A1 | 1/2011 | Shearer | | |
| 2019/0200225 A1 | 6/2019 | Fitzgibbon | | |
| 2019/0260660 A1 | 8/2019 | Abuan et al. | | |
| 2020/0159930 A1* | 5/2020 | Venkateswaran | ..... | H04L 9/3247 |
| 2021/0203492 A1* | 7/2021 | Soares de Resende | ..................... | H04L 67/125 |

OTHER PUBLICATIONS

EPO, Extended European Search Report, dated Mar. 11, 2025, in EP Application No. 22812206.5, 10 pages.

Sig Proprietary Bluetooth: "Bluetooth SIG Proprietary Bluetooth Core Specification v5.0", Dec. 6, 2016 (Dec. 6, 2016), pp. 1-2822, XP055567380, Retrieved from the Internet: URL:https://www.bluetooth.org/en-us/specification/adopted-specifications.

International Search Report and Written Opinion of the ISA/AU, mailed Sep. 16, 2022, in PCT Application No. PCT/US2022/031223; 26 pages.

* cited by examiner

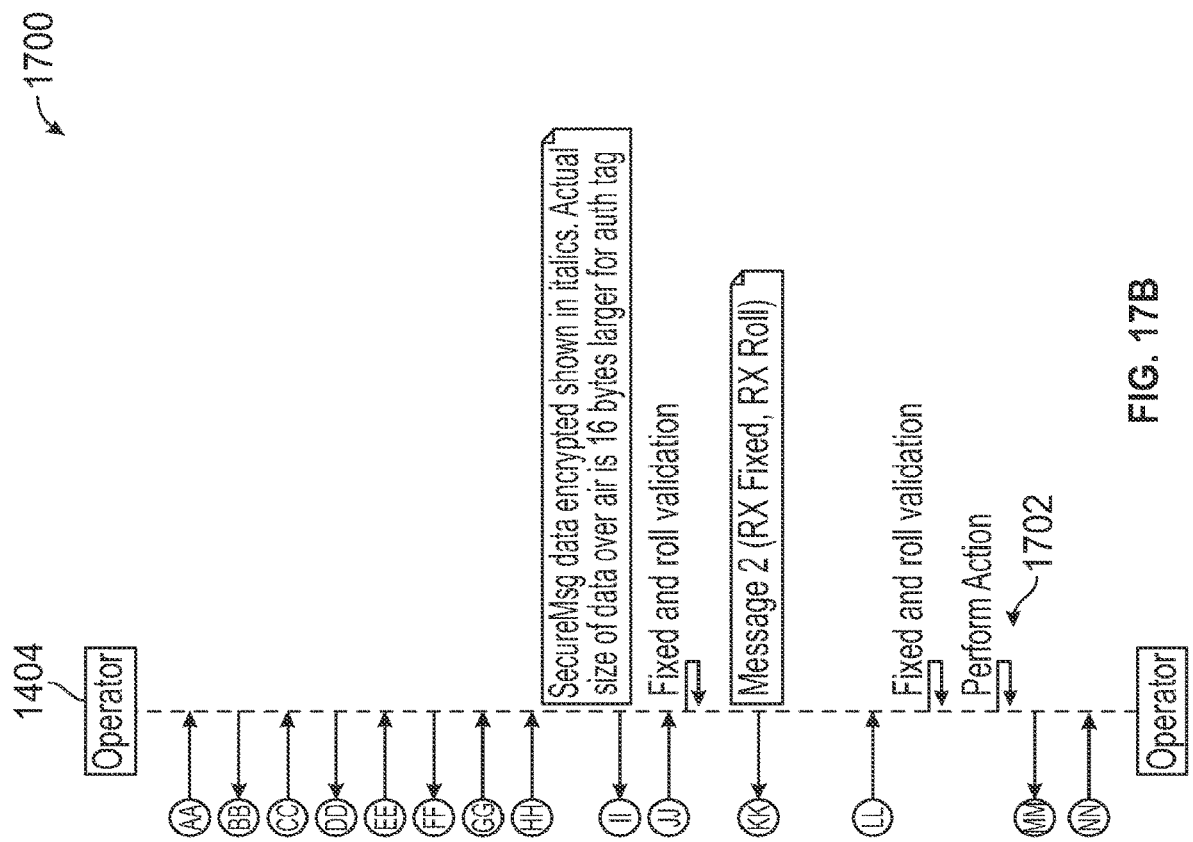

SECURITY SYSTEM FOR A MOVEABLE BARRIER OPERATOR

CROSS-REFERENCE TO RELATED APPLICATION

This application is a continuation of PCT Application No. PCT/US2022/031223, filed May 26, 2022, which claims the benefit of U.S. Provisional Application No. 63/193,725, filed May 27, 2021. The disclosures of which are hereby incorporated by reference in their entirety.

FIELD

The disclosure relates in general to security systems that allow operation upon the receipt of a properly coded signal. More particularly, the disclosure relates to a security system or to a barrier operator system, such as a garage door operator, employing a transmitter and a receiver that communicate via codes having at least a portion thereof that changes with operations of the transmitter.

BACKGROUND

It is well known to provide radio-controlled garage door operators, which include a garage door operator unit having a radio receiver and a motor connected to the garage door. The radio receiver is adapted to receive radio frequency signals from radio transmitters. The radio frequency signals have particular signal characteristics that, when received, cause the door to be opened.

Many movable barrier operators, for example, garage door operators, use activation codes that change after each transmission. Such varying codes, called rolling access codes, are created by the transmitter and acted on by the receiver, both of which operate in accordance with the same method to predict a next rolling access code to be sent and received. One such rolling type access code includes four portions, a fixed transmitter identification portion, a rolling code portion, a fixed transmitter type identification portion, and a fixed switch identification portion. In this example, the fixed transmitter identification is a unique transmitter identification number. The rolling code portion is a number that changes every transmission to confirm that the transmission is not a recorded and replayed transmission. The fixed transmitter type identification is used to notify the movable barrier operator of the type and features of the transmitter. The switch identification is used to identify which switch on the transmitter is being pressed, because there are systems where the function performed is different depending on which switch is pressed.

BRIEF DESCRIPTION OF THE DRAWINGS

FIGS. 17A-B are flow diagrams of a method of a first device requesting a second device perform an action, the first device providing feedback to a user of the second device performing the action, and the first device disconnecting from the second device;

Figure 1:
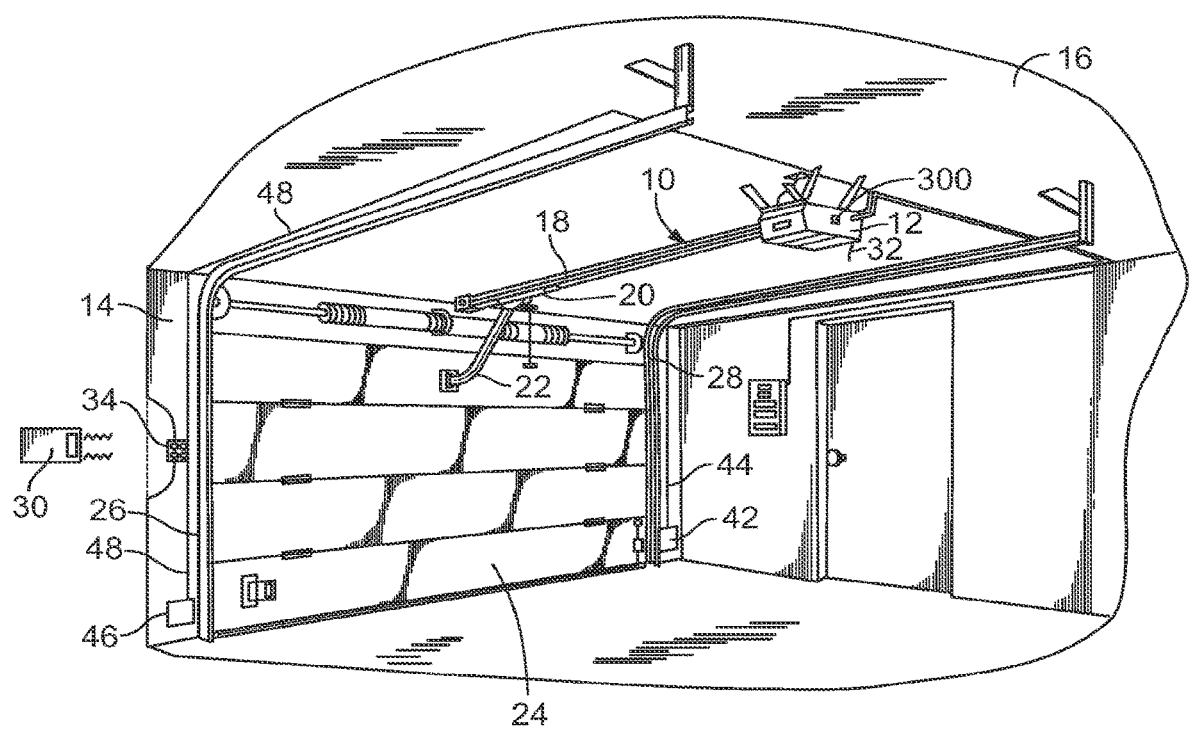
FIG. 1 is a perspective view of an example moveable barrier operator system that receives control signals from a user-operated transceiver.

Skilled artisans will appreciate that elements in the figures are illustrated for simplicity and clarity and have not necessarily been drawn to scale. Common but well-understood elements that are useful or necessary in a commercially feasible embodiment may be omitted for simplicity and/or clarity. It will further be appreciated that certain actions and/or steps may be described or depicted in a particular order of occurrence while those skilled in the art will understand that such specificity with respect to sequence is not actually required.

DETAILED DESCRIPTION

The systems and methods described herein include a user-actuated first device, for instance a handheld or vehicle mounted transceiver, generally configured for developing a first encrypted message comprising a fixed code and a changing or variable code (such as a rolling code). The changing or variable code is changed with each actuation of the transceiver according to a set sequence or protocol accessible by the first device and a second device with which it communicates. The fixed code remains the same for each actuation of the first device. The second device includes an operator mechanism, such as a motorized garage door opener, to induce one or more actions when commanded by the first device. The first and second device may be configured to communicate with one another by various techniques, for example a wired communication path, radio frequencies, or any variety of proprietary wireless platforms.

In some embodiments, the second device receives the encrypted message from the first device, validates the message by comparing the fixed code and changing or variable code to stored values and, upon validation, sends a response signal including at least a second encrypted message having a second fixed code and a second changing code that is independent from the first changing code. The stored values may represent, for instance, fixed and changing values from prior operations with a sequence or algorithm associated with the changing code to determine changing code values. In some embodiments, the second device may recognize a plurality of changing code values as valid in order to account for accidental or otherwise ineffective actuation of the first device (such as when outside of the range of the second device or when interference prevents normal communication with the second device).

The first device receives and attempts to validate the second encrypted message, and in some embodiments, is configured to transmit a third encrypted message to the second device, the third encrypted message including the first fixed code and a changed version of the second changing code. This third encrypted message is configured to effect performance of an action by the second device, such as lifting or lowering a moveable barrier. Thus, communication between the devices may involve bidirectional validation of messages wherein each of two devices are configured to both transmit and receive messages and compare them to stored values, such as values from prior communications between devices. The communication between the devices may, in some embodiments, involve additional exchanges of messages in order to further improve security, for instance transmission and validation of fourth and fifth encrypted messages containing fixed codes and changing codes.

Referring now to the drawings and especially to FIG. 1, a movable barrier operator system 10 is provided that includes moveable barrier operator 12 mounted within a garage 14 and a handheld transceiver 30. The operator 12 is mounted to the ceiling 16 of the garage 14 and includes a rail 18 extending therefrom with a releasable trolley 20 attached having an arm 22 extending to a multiple paneled garage door 24 positioned for movement along a pair of door tracks 26 and 28. The handheld transceiver unit 30 is adapted to send signals to and receive signals from the operator 12. An antenna 32 may be positioned on the operator 12 and coupled to a receiver as discussed hereinafter in order to receive transmissions from the handheld transceiver 30. An external control pad 34 may also be positioned on the outside of the garage 14 having a plurality of buttons thereon and communicate via radio frequency transmission with the antenna 32 of the operator 12. An optical emitter 42 may be connected via a power and signal line 44 to the operator 12 with an optical detector 46 connected via a wire 48 to the operator 12 in order to prevent closing of the door 24 on a person or object inadvertently in the door's path. A switch 300 may be provided for switching between modes, such as operating mode and learn mode.

Figure 2:
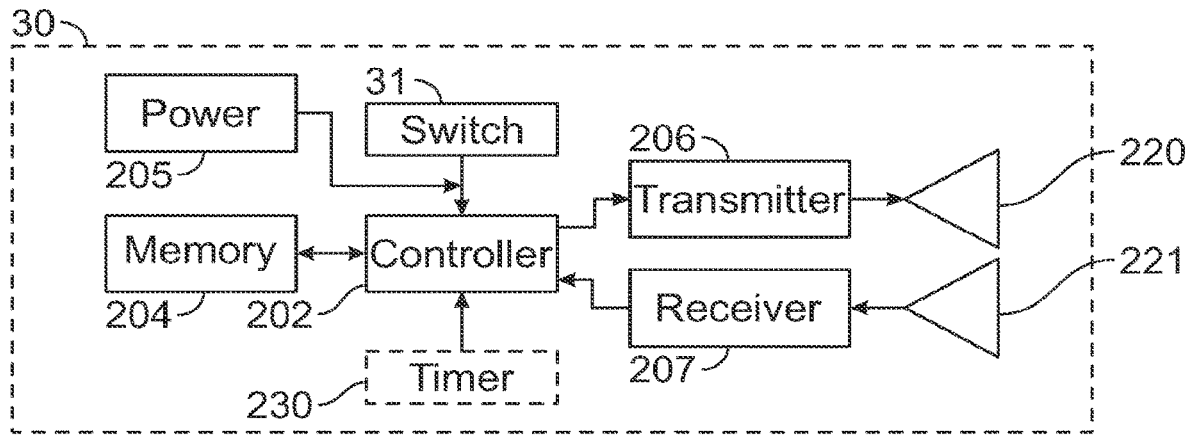
FIG. 2 is a block diagram of an example of the user-operated transceiver of FIG. 1.

Referring now to FIG. 2, a block diagram of the transceiver 30 is provided. The transceiver 30 includes both a transmitter 206 and receiver 207 (which may be combined into a single mechanism) in operative communication with antennas 220 and 221, respectively. The antennas may be positioned in, on, or extending from the user operated transceiver 30, wherein the transmitter 206 and receiver 207 are configured for wirelessly transmitting and receiving transmission signals to and from the movable barrier operator 12, including transmission signals that contain a first rolling access code with a fixed code portion and a rolling code portion. In some embodiments, both the transmitter and receiver may communicate with a single antenna or multiple antennas, and in some embodiments both devices may be configured to be a single transceiver device in communication with a single antenna. The user-operated transceiver 30 also includes a controller 202 in operative communication with the transmitter 206 and a memory 204 and is configured for processing data and carrying out commands. The memory may be, for instance, a non-transitory computer readable medium, and may have stored thereon instructions that when executed by a controller cause the controller to perform operations. A power source 205 is coupled to the controller 202 and/or other components, and may be routed in some embodiments so that a switch 31 couples/decouples the power source to other components so that power is supplied only upon activation of the switch 31 or a specified time thereafter. The controller 202 is configured to generate and cause the transmitter 206 to transmit a first rolling access code, including at least one fixed code portion and at least one changing or rolling code portion for the transmission signal, and the receiver 207 is configured to receive responsive transmissions. A timer 230 may be provided in some embodiments that is in communication with the controller 202 and provides a way to determine the time of incoming and outgoing signal transmissions. The timer may also provide reference for the controller 202 to enable and disable the transmitter 206 and/or receiver 207 of the device in connection with some embodiments. The memory 204 is connected for operative communication with the controller 202 and is configured to store codes and in some embodiments other information for outgoing transmissions. The memory 204 is further configured to store fixed and/or changing or variable code values for comparison to incoming transmissions. The switch 31 may include one or more user-operable switches for inputting commands to the transceiver 30, for example to issue a barrier movement command or a learning command. The switch 31 may be associated with a button, lever, or other device to be actuated, for example by a user's hand or other actions, events, or conditions. As other examples, the switch 31 may be voice operated or operated by a user contacting a touch-sensitive screen as the location of an object displayed on the screen.

Figure 3:
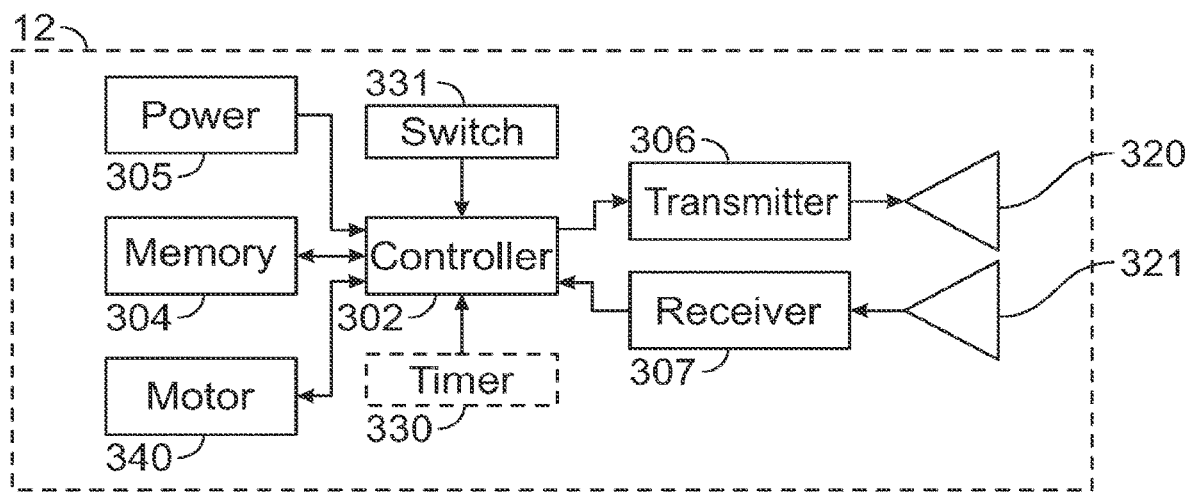
FIG. 3 is a block diagram of an example of the moveable barrier operator of the system of FIG. 1.

Referring now to FIG. 3, in one example, the operator 12 includes a controller 302 in communication with a memory 304 and is configured for storing and retrieving data to and from the memory 304 as well as processing data and carrying out commands. A power source 305, such as an AC power conduit, battery, or other known source, supplies electricity to the controller 302 in order to allow operation. The operator 12 also includes a wireless transmitter 306 and receiver 307 (or combination transceiver device) in operative communication with the controller 302. As shown, the transmitter 306 communicates with a first antenna 320 and the receiver 307 communicates with a second antenna 321, but both devices may communicate with a single antenna or multiple antennas, and in some embodiments the operator 12 may be configured to have a single transceiver device in communication with a single antenna. The antennas may be positioned in, on, or extending from the movable barrier operator 12. In this regard, signals, such as radio frequency or other wireless transmission carriers, may be sent to and received from the user-actuated transceiver 30 according to a variety of frequencies or modulations. Signals may be modulated in a number of different ways; thus, the transceiver 30 and movable barrier operator 12 may be configured to communicate with one another via a variety of techniques. The controller 302 of the operator 12 is also in communication with a motor 340 in order to carry out an operation such as lifting or lowering a garage door; sliding, swinging, or rotating a gate; or otherwise moving or repositioning a barrier structure. One or more switches 331 may be provided to override the controller 302 or place the controller in and out of a learning mode in which the operator 12 may learn a user-operated device by exchanging and storing messages.

The term controller refers broadly to any microcontroller, computer, or processor-based device with processor, memory, and programmable input/output peripherals, which is generally designed to govern the operation of other components and devices. It is further understood to include common accompanying accessory devices. The controller can be implemented through one or more processors, microprocessors, central processing units, logic, local digital storage, firmware, software, and/or other control hardware and/or software, and may be used to execute or assist in executing the steps of the processes, methods, functionality, and techniques described herein. Furthermore, in some implementations the controller may provide multiprocessor functionality. These architectural options are well known and understood in the art and require no further description here. The controllers may be configured (for example, by using corresponding programming stored in a memory as will be well understood by those skilled in the art) to carry out one or more of the steps, actions, and/or functions described herein.

Generally, the controllers 202 and 302 may be configured similarly or independently, and each can include fixed-purpose hard-wired platforms or can comprise a partially or wholly programmable platform. These architectural options are well known and understood in the art and require no further description here. The controller can be configured (for example, by using corresponding programming as will be well understood by those skilled in the art) to carry out one or more of the steps, actions, and/or functions described herein, and can store instructions, code, and the like that is implemented by the controller and/or processors to implement intended functionality. In some applications, the controller and/or memory may be distributed over a communications network (e.g. LAN, WAN, Internet) providing distributed and/or redundant processing and functionality. In some implementations, the controller can comprise a processor and a memory module integrated together, such as in a microcontroller. One or more power sources may provide power to each controller, and may be of any known type.

When a user actuates the switch 31 of the user-operated transceiver 30, such as by pressing a button designated as performing a particular action, the controller 202 activates the transmitter 206 to transmit through antenna 220 a message based on information stored in the memory component 204. The message is received by the receiver 307 of the operator 12 via antenna 321, and communicated to the operator's controller 302. In some embodiments, the controller 302 verifies the message by comparing it to stored information from the operator's memory module 304, and upon verification the controller 302 is configured to cause transmission of a response signal from the transmitter 306 through antenna 320.

Upon receiving the response of the operator 12 through receiver 207, the user-actuated transceiver 30 may validate the response by comparing the response or one or more portions thereof to stored information in its memory module 204. Upon validation of the response, the user-actuated device 30 may transmit another message through transmitter 206 to the operator 12. This third message is configured to cause the operator's controller 302 to activate a motor 340 in order to carry out a function associated with activation of the user-actuated device. The transceiver 30 may include multiple buttons, levers, switches, displays, microphone(s), speaker(s), or other inputs associated with different tasks to be carried out by the operator 12.

In another example, the moveable barrier operator 12 learns a user-actuated transceiver. The receiver 307 of the operator 12 is configured to receive an authorization signal indicating that it is authorized to communicate with the user-actuated transceiver 30 and to provide an indication that it received the authorization signal to the controller 302. One or more switches 331 may be provided in order to turn on and/or otherwise permit the receiver 307 to receive the authorization signal. In response to receiving the authorization signal, the controller 302 is configured to generate a first rolling access code and to store a representation of the first rolling access code in the memory device 304. The controller 302 is configured with the transmitter 306 to transmit a transmission signal including the first rolling access code to the user-actuated device 30. The receiver 307 also receives a transmission signal from the user-actuated transceiver 30 including a second rolling access code, as described further below. In this example, the receiver 307 provides the transmission signal to the controller 302, which compares the second rolling access code with the representation of the first rolling access code stored in the memory device 304.

Figure 4A:
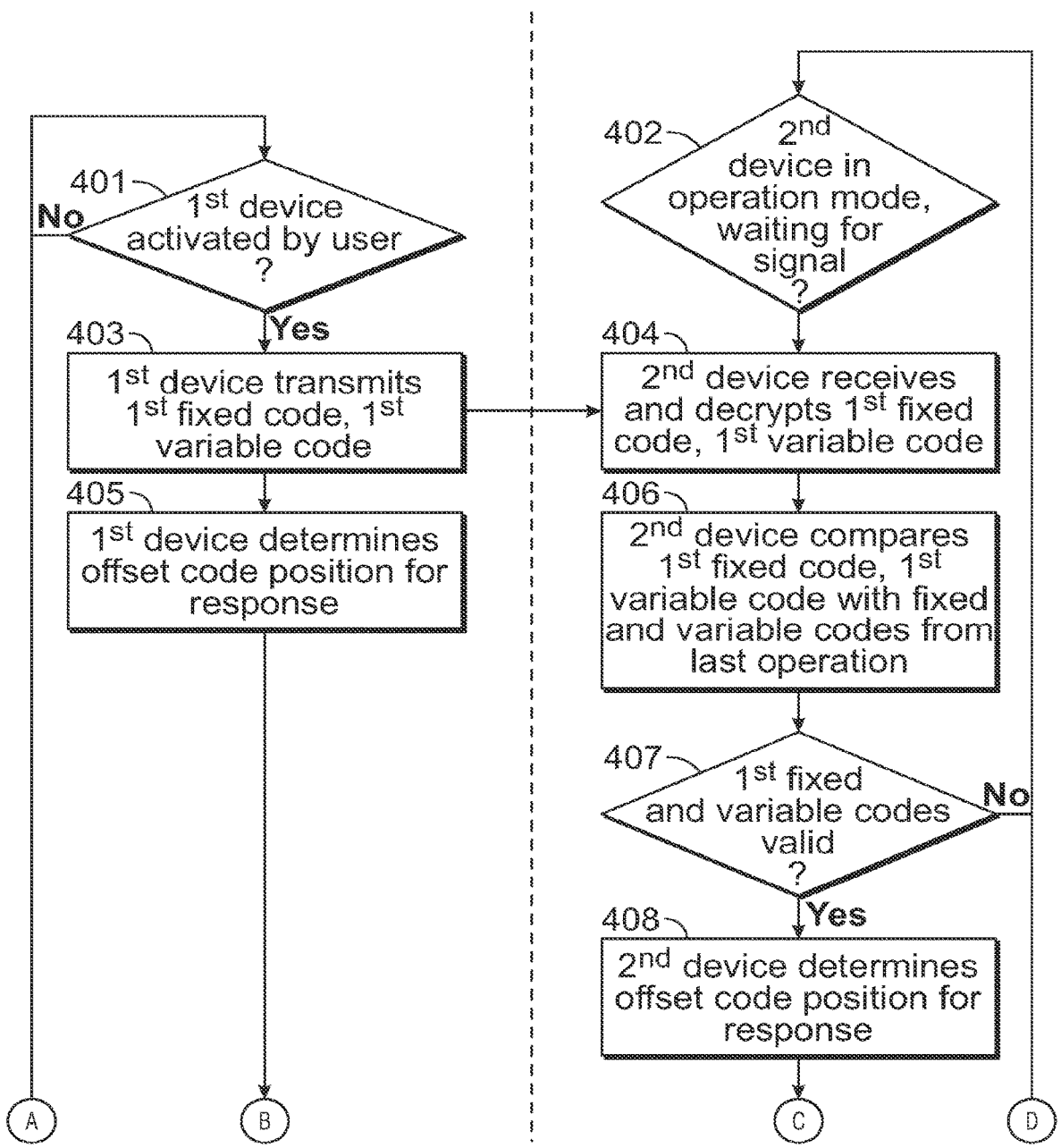
FIGS. 4A-B are flow diagrams showing an example communication flow between a first device and a second device during normal operation.
Figure 4B:
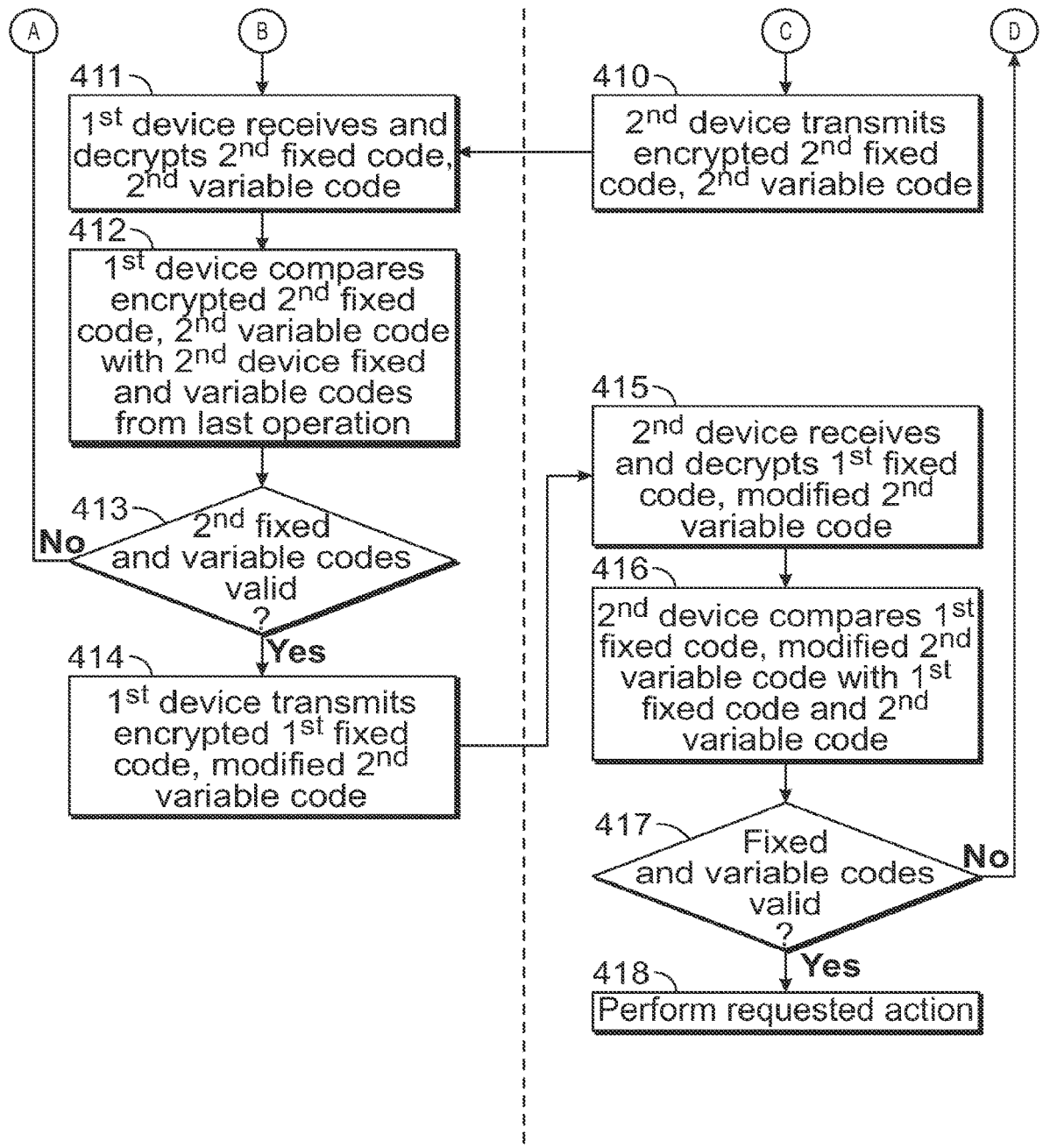

FIGS. 4A, 4B, and 4C are interconnected flow charts that demonstrate steps of one example of a process in which signals are exchanged between first and second devices to verify authorization and carry out an activity. Steps to the left of the central dashed line relate to a first device, such as a user-operated remote control, while steps to the right relate to a second device, such as a moveable barrier operator. For example, the first and second devices may be the transceiver 30 and the operator 12 discussed previously. In this example, a previous operation such as a learning procedure or an operation sequence has been performed at an earlier time so that each of the first and second device have stored information received from the other device; a first-time operation of the device in the form of a learning or synchronization sequence will be explained further below in connection with FIGS. 5A-5C.

Initially, the first and second devices both have stored in their memories a first fixed code and first variable code from the immediately previous operation involving the first device, as well as a second fixed code and second rolling code from the immediately previous operation involving the second device. The first device assesses at step 401 whether it has been activated. For instance, a user pressing a button on the first device may complete an electrical circuit or effect a measurable change in at least one component of the first device. When the first device has not been activated, it continues to await activation. Once activated, the first device transmits 403 a first message that includes at least a first fixed code and a first changing or variable code that represents a modification from the first changing code in the immediately previous operation. The first fixed code and/or first variable code are now stored within the memory of the first device, and may be encrypted using one or more encryption methods. The encryption methods may include one or more types of public key or private key encryption, block ciphers, stream ciphers, and other techniques. In some embodiments, encryption may comprise using a predetermined number of bits of the changing code as a basis for selecting a particular data bit order pattern and particular data inversion pattern. The first device also specifies or determines 405 an offset code position for an anticipated response (in this instance, a position in a forthcoming message from the second device wherein the position is offset from a preamble or header of the message and where fixed and variable codes from the second device will be located). This determination may take place before or after transmission of the message by the first device. In some embodiments, the determination of the offset code position by the first device may be made prior to generating the first message transmitted at step 403, and information regarding the offset code position may be used in generating the first message. Alternatively, in other embodiments, the first device may generate the first message (or portions thereof) and then determine the offset position based on characteristics of the first message. In some embodiments, the determination of the offset code position is made randomly (e.g. using a random or pseudo-random number generator) or may be based on at least a portion of the first encrypted message or from at least a portion of the unencrypted variable code, or both. The determination of the offset code position may also be made based on a fixed code or other portion of the encrypted or unencrypted versions of the first message.

Meanwhile, the second device has been placed in operation mode and awaits 402 a signal to effect an action, and upon receiving 404 the first message from the first device, decrypts the message to obtain the first fixed code and first variable code. The second device then stores the first fixed code and first variable code, and validates the first fixed code and first variable code by comparing 406 them to stored code values. In this step, the first fixed code and first variable code from the encrypted message are compared to the first fixed and variable code from the previous operation. If the fixed codes match and the first variable code from the encrypted message matches the previous variable code as modified according to a set of established rules for the variable code (e.g. matches a subsequent value from a predetermined sequence or algorithm), the first encrypted message will be considered validated. If the decrypted code values do not match the stored code values, the second device ignores the first message and waits 402 for further signals. On the other hand, if the code values are valid in 407, the second device determines 408 an offset code position, based on the first encrypted message, in which to include the second fixed code and second changing/variable code from the second device within the second message.

In response to validating the first encrypted message, and after determining the offset code position, the second device transmits a response 410 in the form of a second message. The second message comprises the second encrypted message including the second fixed code and the second changing/variable code (that is, in the depicted embodiment, independent from the first changing code and represents a modified version of a variable code from the immediately previous operation). The second fixed code and second variable code are positioned within the second message at the determined offset code position so that a device (e.g. the first device) receiving the second message can correctly locate the offset code position and accurately determine the second fixed code and second variable code. The second fixed and modified second variable code values are also stored in the second device's memory, so that at this stage the second device memory contains the first fixed and variable code from the previous operation, the second fixed and variable code from the previous operation, the first fixed and variable code from the first encrypted message from the first device, and the second fixed and variable code from the encrypted response.

The first device will receive 411 and decrypt the second encrypted message, which includes the second fixed code and second changing/variable code. The first device determines where to locate the second fixed code and second changing/variable code, either by identifying a position on the encrypted version of the second message where encrypted versions of the codes are located and then decrypting all or a portion of the second message to reveal the second fixed code and second changing/variable code, or by first decrypting the second message and then identifying the position of the second fixed code and second changing/variable code. If the first device has not determined the same offset code position that the second device determined when creating the second encrypted message, the first device will be unable to locate the beginning of offset portion and thus cannot properly read the second fixed code and changed variable code from the second encrypted message. If, however, the first device has determined or otherwise knows, retrieves, or uses the appropriate offset code position for the second encrypted message, the first device will be able to successfully identify the second fixed and changed variable code and store those codes in the first device's memory, along with the second fixed and variable code from the previous operation and the first fixed and variable code from the first encrypted message. The first codes from the previous operation are no longer needed, and may be deleted from the memory.

The first device then compares 412 the second fixed code and second variable/changing code with fixed and variable codes from the previous operation stored in the memory of the first device. If the second fixed code matches the fixed code from the prior operation and the second variable code matches the prior changing code as modified according to a set of established rules for the changing code, the response message is validated. If the second fixed and variable codes are determined 413 valid, the first device transmits 414 a third encrypted message including at least the first fixed code and a changed version of the second changing code. If the first device is unable to validate the response from the second device, the process ends and the first device returns to awaiting 401 subsequent activation. The position of the first fixed code and changed version of the second changing code may be offset within the third message based on information from the first or second message in a manner similar to the offsetting of information within the second message based on information from the first message as described above, and the offsetting of codes in the third message may be the same as or different than the offsetting of codes in the second message.

When the second device receives 415 the third encrypted message, the second device decrypts 415 the message to determine the first fixed code and the changed version of the second variable code. The second device also determines the location of the first fixed code and the changed version of the second variable code if they have been offset within the third message. The values are stored in the second device memory, which now contains the first fixed and variable codes from the previous operation, the first fixed and variable code from the first encrypted transmission, the second fixed and variable codes from the previous operation, the second fixed and variable code from the second encrypted (response) transmission, and first fixed code and changed second variable code from the third encrypted message. The second device then compares 416 the first fixed code and the changed versions of the second variable code to stored code values comprising the first fixed code and unmodified second variable code in order to validate 417 the third encrypted message. While the validation step may have a forward window of values that are acceptable (validation occurs when the received version of the changing code is any one of the next several (e.g. twelve) values expected in the sequence), security may be increased by reducing the size of—or completely eliminating—this forward window. Therefore, in some embodiments the third encrypted message is validated only if it contains the next variable code value in the sequence. If the third message is validated, the second device performs 418 the requested action associated with activation of the first device. If the second device is unable to validate the third message, the second device ends the process without performing the requested action and returns to awaiting 402 signals from the first device.

Figure 5A:
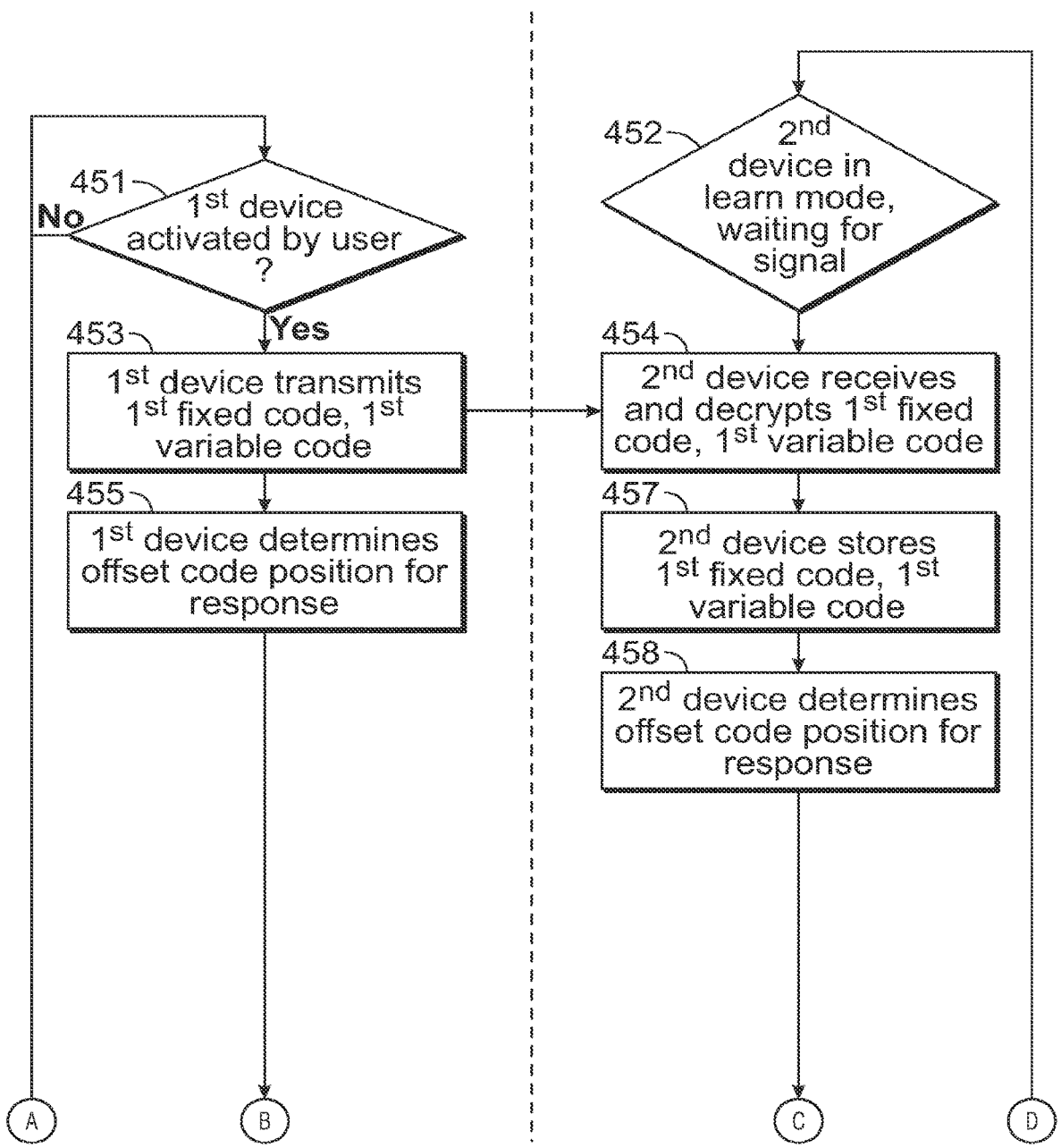
FIGS. 5A-C are flow diagrams showing an example communication flow between a first device and a second device during a learning sequence.
Figure 5B:
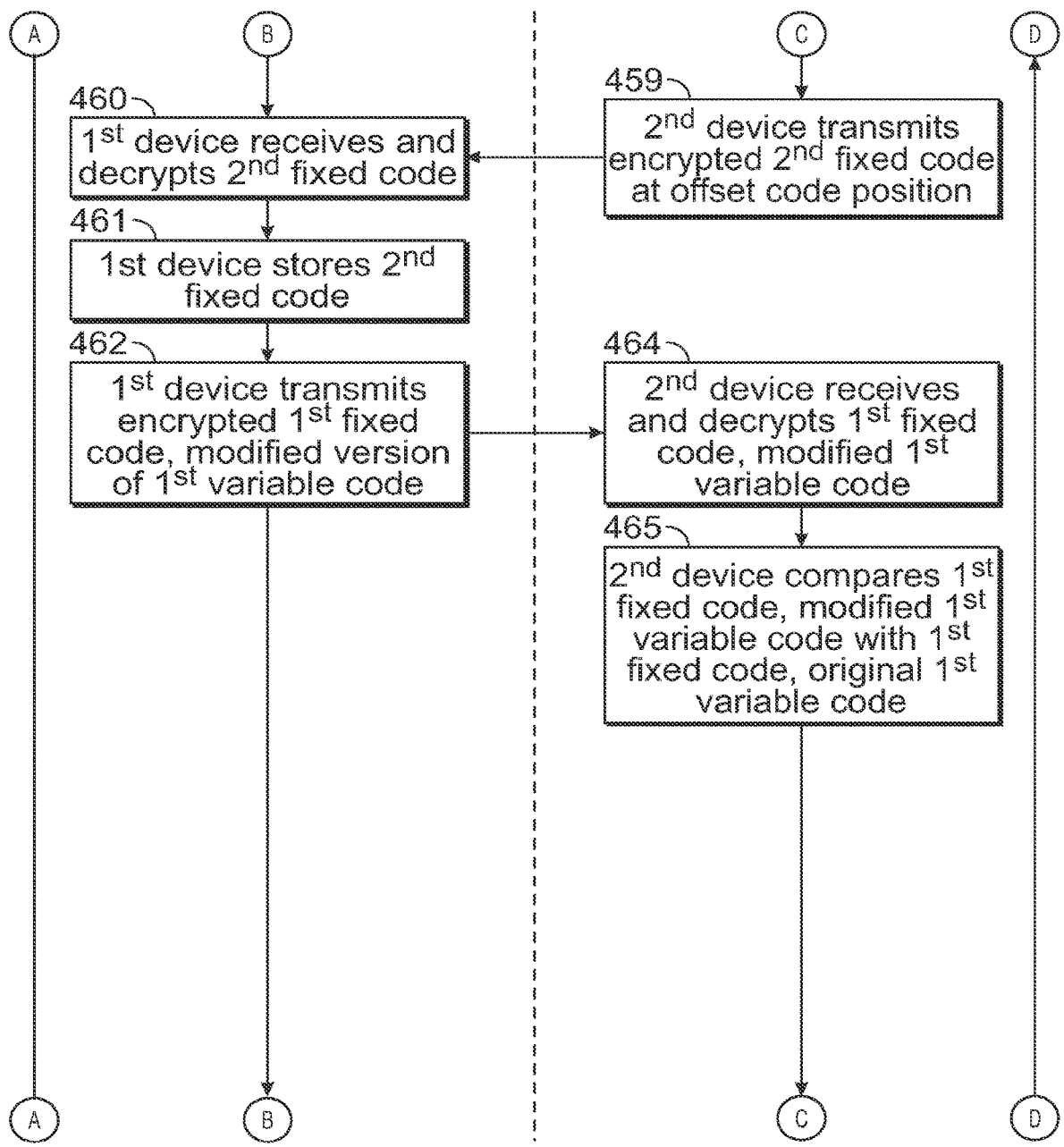
Figure 5C:
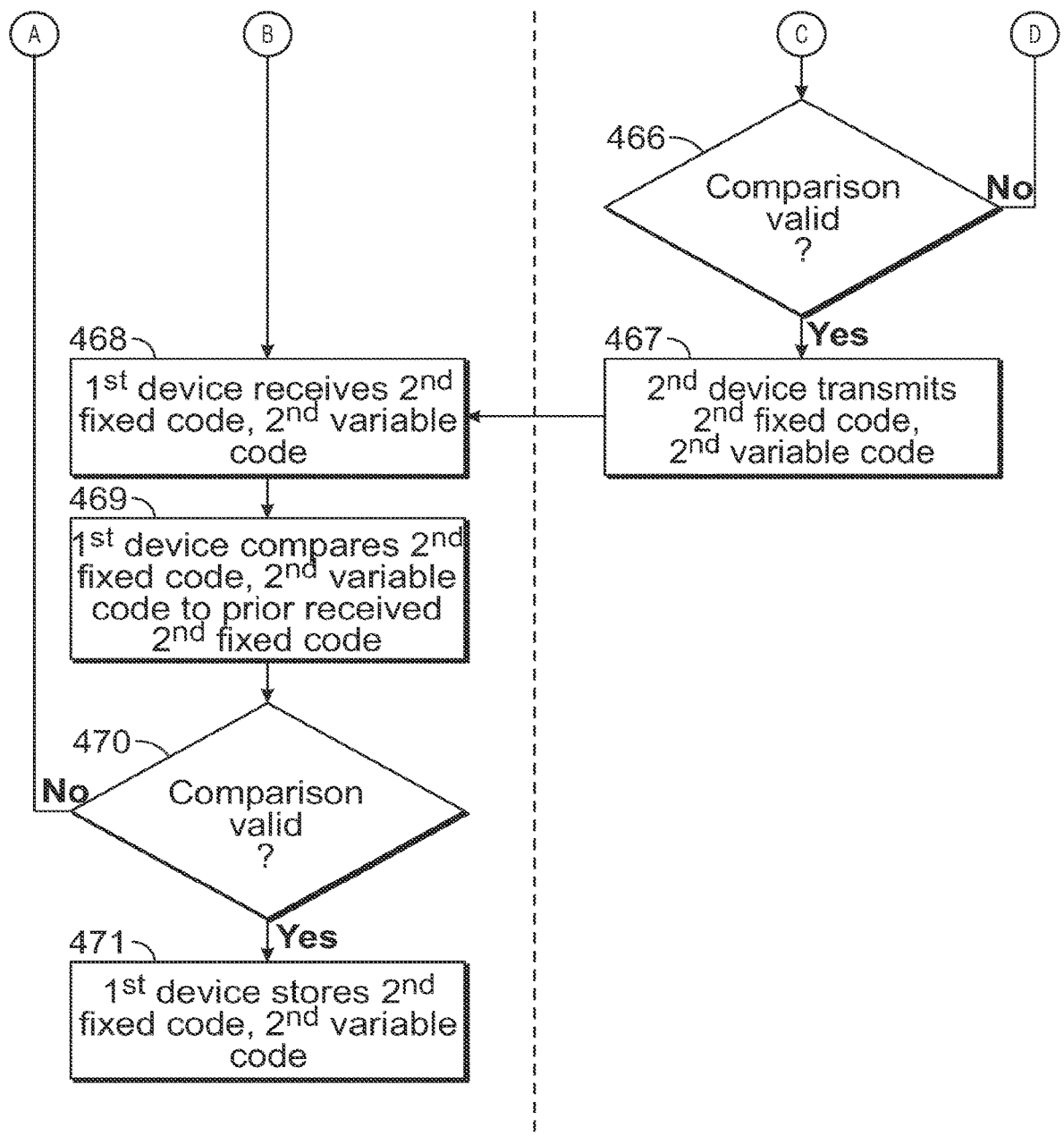

Turning now to FIGS. 5A-C, a flow diagram illustrates an example communication flow for a first device and a second device during a learning sequence so that, for example, a user-actuated device and an operator device are synchronized in order to recognize and validate signals shared between the devices. The first device may be the transceiver 30 and the second device may be the operator 12 discussed previously. The method involves at least one of the devices learning a changing code sequence from the other device, and in some embodiments, may involve bi-directional learning so that each device receives and stores a series of fixed and changing code values from the other device. In some embodiments, the devices may be configured so that the method of learning entails a button or other actuator being actuated on each device, such as pressing a button on a garage door operator to set the device in learn mode and then pressing a button on the remote control device to initiate the learning process.

In one form, the learning sequence begins when a first device is activated 451 by a user while a second device has been placed 452 in "learn" mode, such as by pressing a button or switching a lever on or associated with the second device. To begin, the first device contains within its memory a first fixed code and a first variable code, and the second device contains a second fixed code and a second variable code. When the first device is activated, it transmits 453 from the first device a first encrypted message that includes at least a first fixed code and a first changing or variable code, and specifies or determines 455, based on at least a portion of the first encrypted message, an offset code position for a subsequent message from the second device to include fixed code and changing/variable code information. The second device, meanwhile, receives 454 the first encrypted message while the second device is in the learn mode and stores 457 in the second device's memory the decrypted first fixed and first variable codes from the first encrypted message or portions thereof. The second device determines 458 an offset code position for a responsive message at which information of interest in a subsequent message will be positioned for the first device to retrieve. The second device then transmits 459 the response, comprising a second encrypted message including a second fixed code from the second device located at the determined offset position within the message. The second message is received and decrypted 460, and the first device stores 461 the second fixed code.

After receiving the response from the second device and storing associated values, the first device then transmits 462 a third encrypted message including at least the first fixed code and a changed version of the first variable code. The third message may include offset information based on information from the first or second message, and the offset of information in the third message may be the same or different as the offset of information in the second message.

When the second device receives 464 and decrypts the third encrypted message, the second device validates the message by comparing 465 the first fixed code and the changed versions of the first variable code to stored code values from the first encrypted message. If the second device determines 466 that the comparison is valid, the second device then transmits 467 in response to validating the third encrypted message a fourth encrypted message including the second fixed code and a second changing code from the memory of the second device. The second fixed code and second changing/variable code may be located at an offset position within the fourth message, and the offset position within the fourth message may be determined based on at least a portion of the first, second, and/or third message.

The first device receives 468 the fourth encrypted message, and identifies the position of the second fixed code and the second changing code if they have been offset. The first device validates the fourth message by comparing 469 the second fixed code and the second changing code to the response stored by the first device. If the fourth message is determined 470 to be valid, the first device stores 471 the second fixed code and the second changed version of the second variable code in response to validating the fourth encrypted message. However, if the first and second devices do not determine the same offset position for the second fixed code and second changing/variable code, then the first device will be unable to properly determine the second fixed code at this stage and will thus be unable to validate the fourth encrypted message.

The variable or changing codes transmitted by the first and second devices may be selected from those known in the art, such as rolling code systems in which the changing code is modified based on a preset algorithm and/or a predefined list or sequence of numbers. When a device validates a changing code by comparison with stored values, the device will ordinarily compare the received code value to a number expected subsequent values in order to account for activations of one device that are out of range of the other device or otherwise do not result in communication with the other device. For instance, in some embodiments a device will compare a received changing code to at least twelve stored values, and in some embodiments at least 24, 48, 96, 128, or 256 stored values.

A variety of methods and/or algorithms may be used to encrypt and/or decrypt the fixed and changing codes of each message transmitted between devices. In some forms, a first device transmits an encrypted signal by generating a radio frequency oscillatory signal, generating variable binary code, generating a three-valued/trinary code responsive to the variable binary code, and modulating the radio frequency oscillatory signal with the trinary code to produce a modulated trinary coded variable radio frequency signal for operation or control of a second device. To provide even further security, in some embodiments the fixed code and the rolling codes may be shuffled or interleaved so that alternating trinary bits are comprised of a fixed code bit and a rolling code bit to yield, for example, a total of 40 trinary bits. The 40 trinary bits may then be packaged in a first 20-trinary bit frame and a second 20-trinary bit frame. A single synchronization and/or identification pulse may proceed the first and second frames to indicate the start of the frame and whether it is the first frame or the second frame. Signals may be configured to comply with local laws and regulations; for instance, immediately following each of the frames, the first device may be placed into a quieting condition to maintain the average power of the transmitter over a typical 100 millisecond interval and within local regulations (e.g. within legal limits promulgated by the United States Federal Communications Commission). The first trinary frame and the second trinary frame may be used to modulate a radio frequency carrier, for instance via amplitude modulation, to produce an amplitude modulated encrypted signal. The amplitude modulated encrypted signal may then be transmitted and may be received by the second device.

In some embodiments, the second device receives the amplitude modulated encrypted signal and demodulates it to produce a pair of trinary bit encoded frames. The trinary bits in each of the frames may be converted substantially in real-time to 2-bit or half nibbles indicative of the values of the trinary bits which ultimately may be used to form two 16-bit fixed code words and two 16-bit variable code words. The two 16-bit fixed code words may be used as a pointer to identify the location of a previously stored variable code value within the operator. The two 16-bit rolling code words may be concatenated by taking the 16-bit words having the more significant bits, multiplying it by 310 and then adding the result to the second of the words to produce a 32-bit encrypted variable code. The 32-bit encrypted code may then be compared via a binary subtraction with the stored variable code. If the 32-bit code is within a window or fixed count, the microprocessor of the second device may produce an authorization signal which may then be responded to by other portions of the second device's circuit to cause the garage door to open or close as commanded. In the event that the code is greater than the stored rolling code, plus the fixed count, indicative of a relatively large number of incrementations, a user may be allowed to provide further signals or indicia to the receiver to establish authorization, instead of being locked out, without any significant degradation of the security. This process may be accomplished by the receiver entering an alternate mode using two or more successive valid codes to be received, rather than just one. If the two or more successive valid codes are received in this example, the operator will be actuated and the garage door will open. However, in such an embodiment, to prevent a person who has previously or recently recorded a recent valid code from being able to obtain access to the garage, a trailing window is compared to the received code. If the received code is within this trailing window, the response of the system simply is to take no further action, nor to provide authorization during that code cycle due to indications that the code has been purloined.

Figure 6:
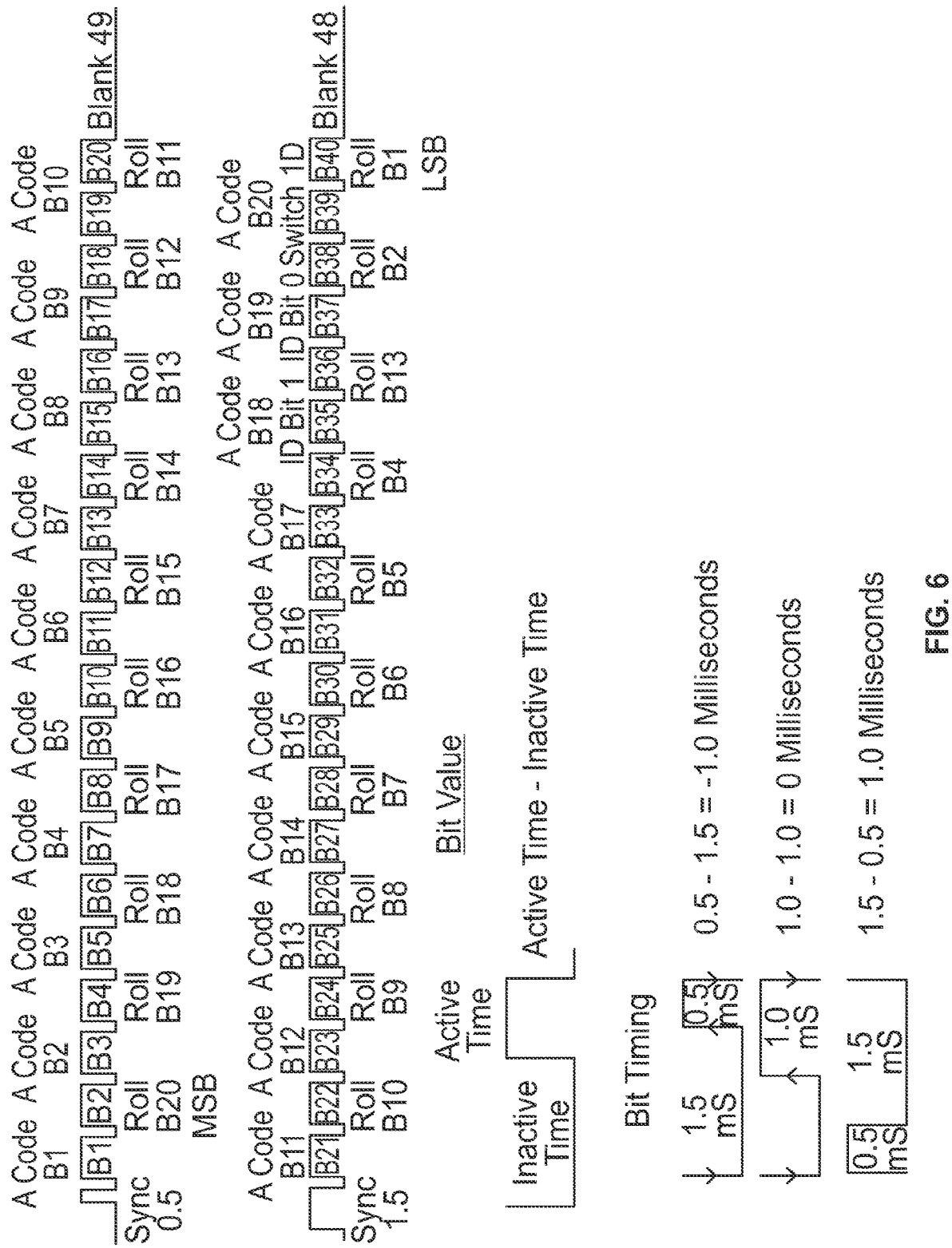
FIG. 6 is a timing diagram of examples of signals generated by a portion of a transmitter of one of the first and second devices.

FIGS. 6-8 demonstrate one potential encryption/decryption scheme. FIG. 6 is an example of trinary code which is actually used to modify the radio frequency oscillator signal. In the depicted example, the bit timing for a 0 is 1.5 milliseconds down time and 0.5 millisecond up time, for a 1, 1 millisecond down and 1 millisecond up, and for a 2, 0.5 millisecond down and 1.5 millisecond up. The up time is actually the active time when a carrier signal or wave is being generated. The down time is inactive when the carrier is cut off. The codes are assembled in two frames, each of 20 trinary bits, with the first frame being identified by a 0.5 millisecond sync bit and the second frame being identified by a 1.5 millisecond sync bit.

Figure 7A:
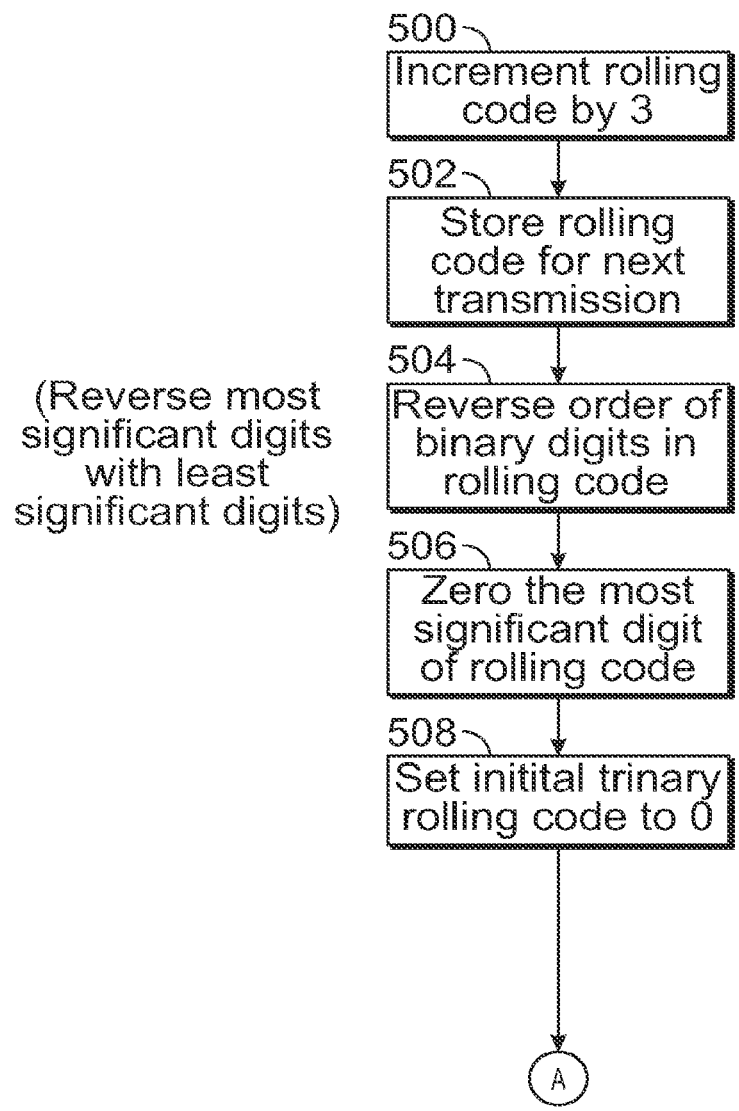
FIGS. 7A-C are flow diagrams showing examples of operation of the transmitter.
Figure 7B:
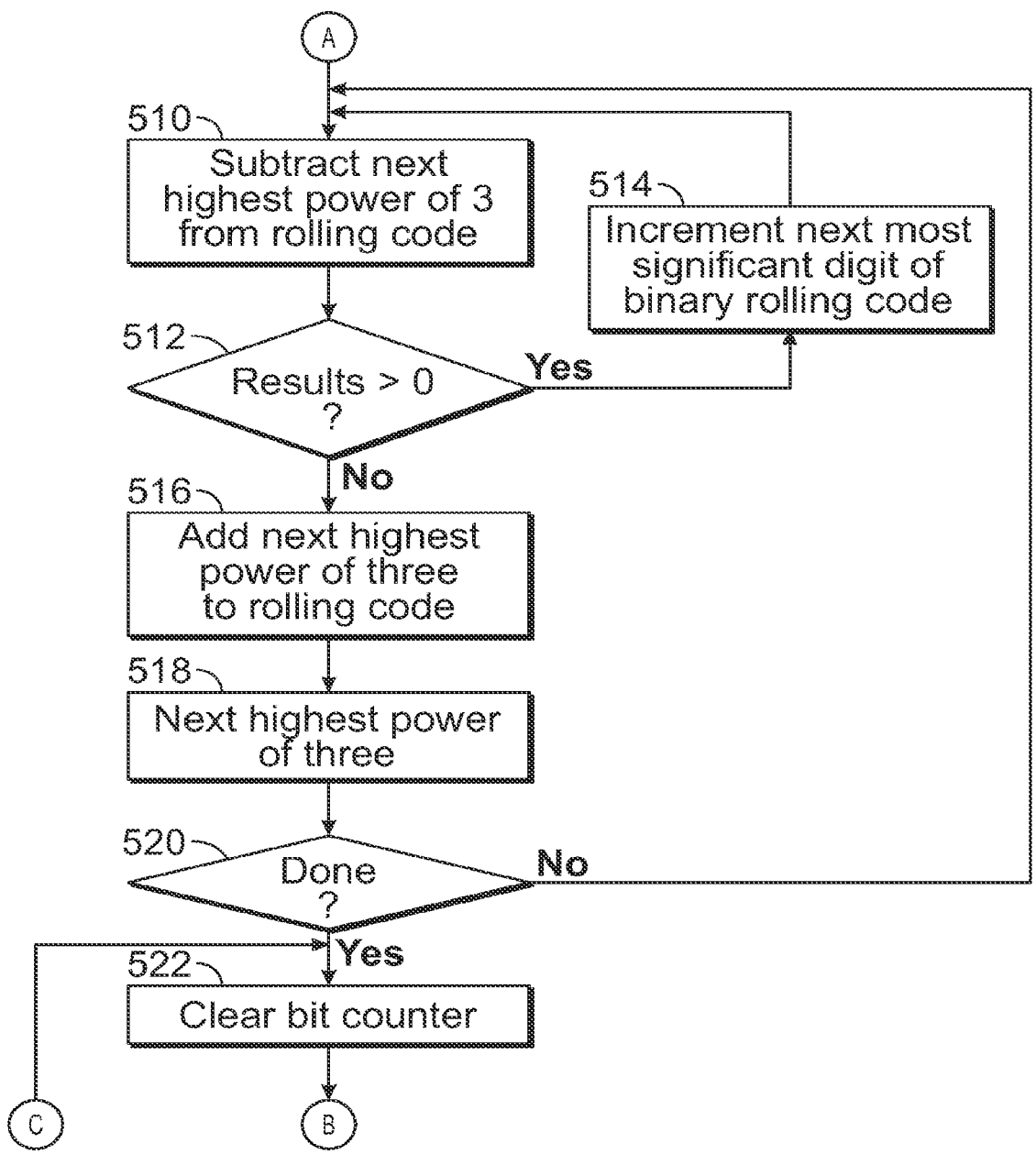
Figure 7C:
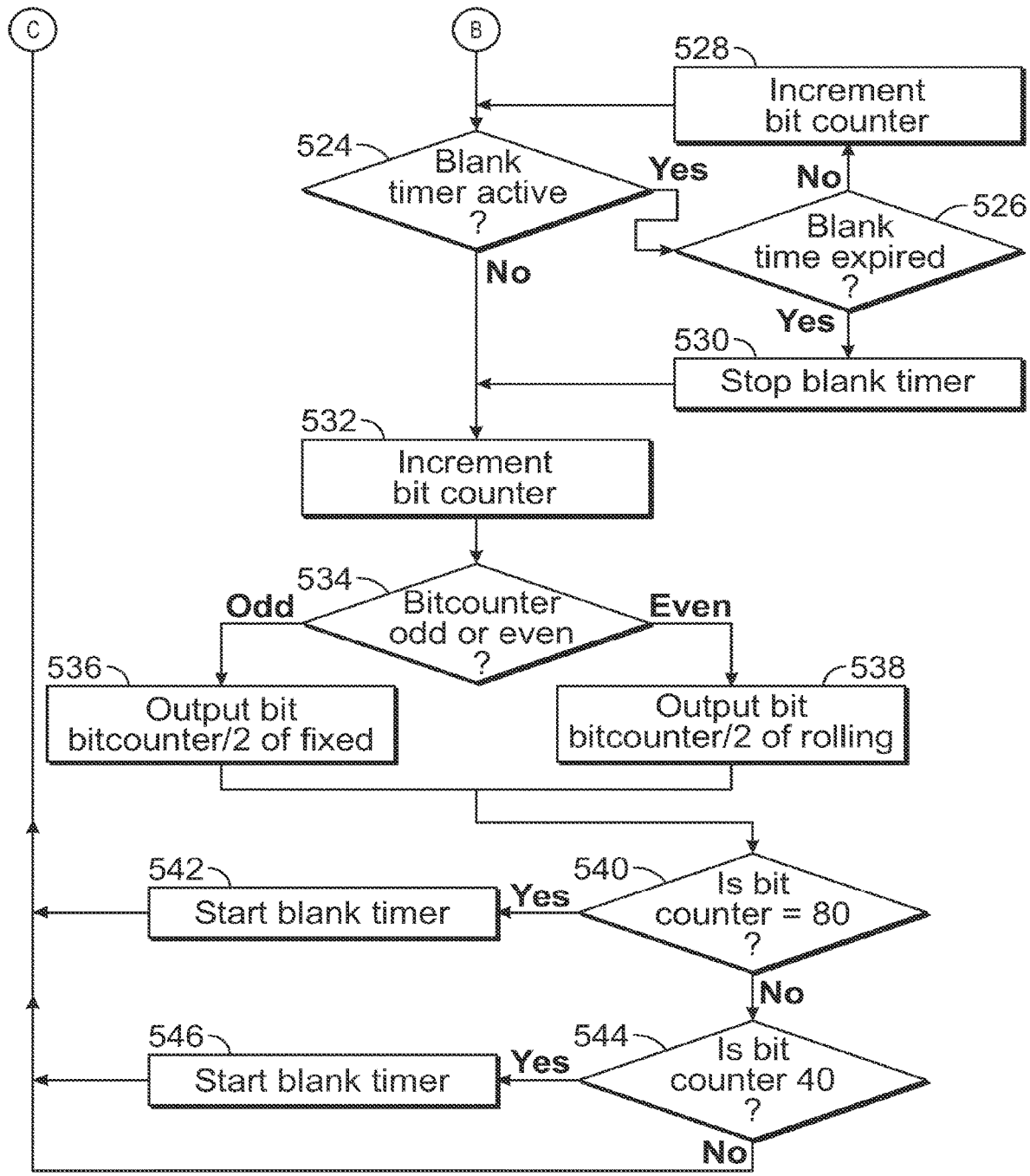

Referring now to FIGS. 7A through 7C, the flow chart set forth therein describes one form of generating a rolling code encrypted message from a first device to be transmitted to a second device. A rolling code is incremented by three in a step 500, followed by the rolling code being stored 502 for the next transmission from the device when a button is pushed. The order of the binary digits in the rolling code is reversed, inverted or mirrored in a step 504, following which in a step 506, the most significant digit is converted to zero effectively truncating the binary rolling code. The rolling code is then changed to a trinary code having values 0, 1 and 2 and the initial trinary rolling code bit is set to 0. In some forms, the trinary code is actually used to modify the radio frequency oscillator signal, and an example of trinary code is shown in FIG. 6. It may be noted that the bit timing in FIG. 6 for a 0 is 1.5 milliseconds down time and 0.5 millisecond up time, for a 1, 1 millisecond down and 1 millisecond up and for a 2, 0.5 millisecond down and 1.5 milliseconds up. The up time is actually the active time when carrier is being generated or transmitted. The down time is inactive when the carrier is cut off. The codes are assembled in two frames, each of 20 trinary bits, with the first frame being identified by a 0.5 millisecond sync bit and the second frame being identified by a 1.5 millisecond sync bit.

In a step 510, the next highest power of 3 is subtracted from the rolling code and a test is made in a step 512 to determine if the result is greater than zero. If it is, the next most significant digit of the binary rolling code is incremented in a step 514, following which the method returns to the step 510. If the result is not greater than 0, the next highest power of 3 is added to the rolling code in step 516.

In step 518, another highest power of 3 is incremented and in a step 520, a test is determined as to whether the rolling code is completed. If not, control is transferred back to step 510. If the rolling code is complete, step 522 clears the bit counter. In a step 524, a blank timer is tested to determine whether it is active or not. If not, the bit counter is incremented in step 532. However, if the blank timer is active, a test is made in step 526 to determine whether the blank timer has expired. If the blank timer has not expired, control is transferred to a step 528 in which the bit counter is incremented, following which control is transferred back to the decision step 524. If the blank timer has expired as measured in decision step 526, the blank timer is stopped in a step 530 and the bit counter is incremented in a step 532. The bit counter is then tested for being odd or even in a step 534. If the bit counter is odd (i.e. not even), control is transferred to a step 536 where the output bit is the bit counter of the fixed code divided by 2. If the bit counter is even, the output bit is the bit counter of the rolling code divided by 2 in a step 538. The bit counter is tested to determine whether it is set to equal to 80 in a step 540—if yes, the blank timer is started in a step 542, but if not, the bit counter is tested for whether it is equal to 40 in a step 544. If it is, the blank timer is started in a step 546. If the bit counter is not equal to 40, control is transferred back to step 522.

Figure 8A:
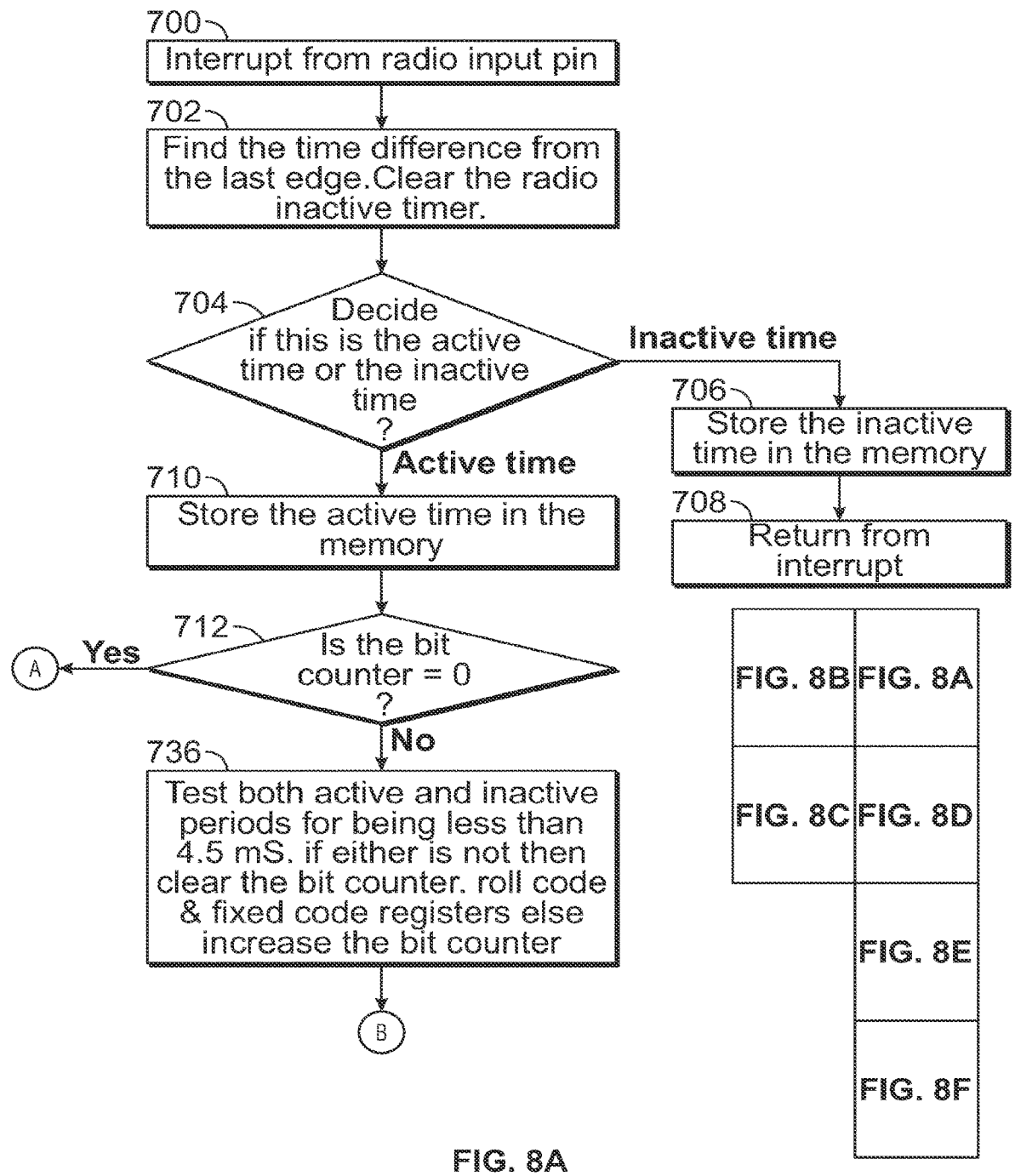
FIGS. 8A-F are flow charts showing examples of operation of a receiver of one of the first and second devices.
Figure 8B:
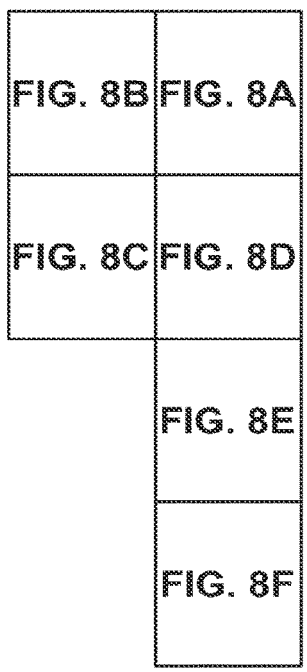
Figure 8B:
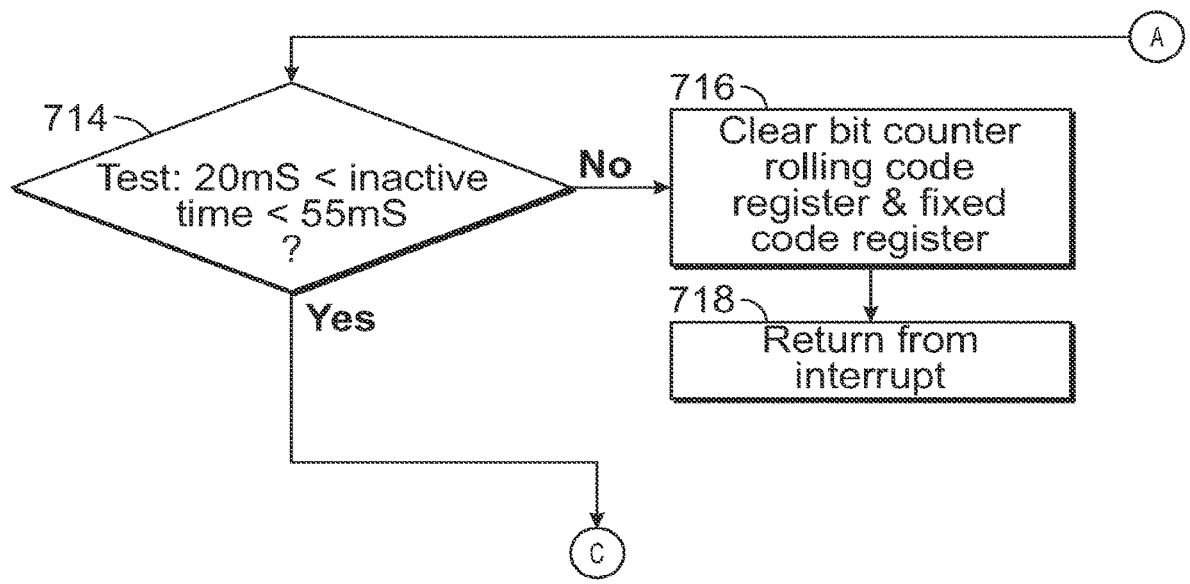
Figure 8C:
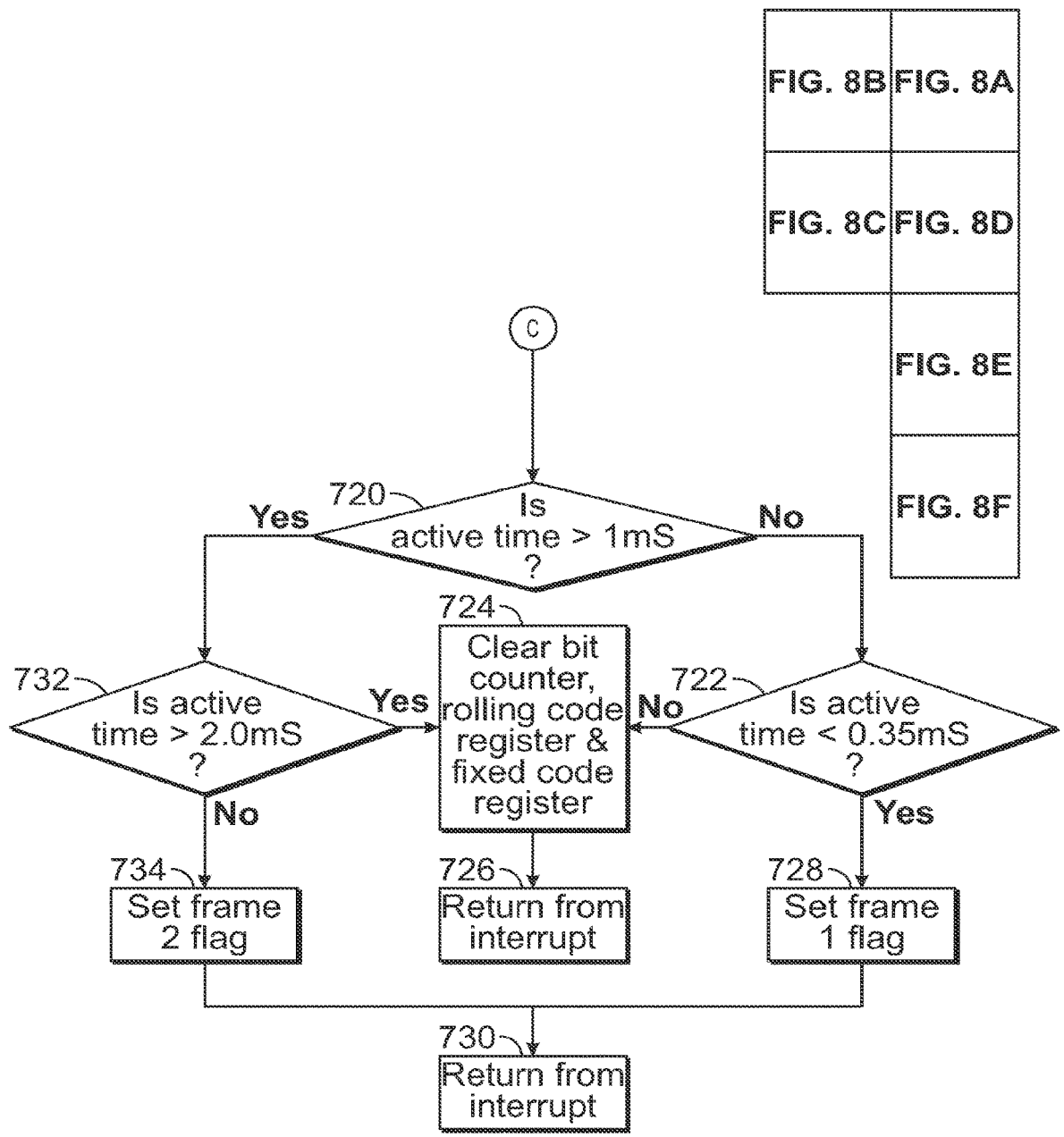

Referring now to FIGS. 8A through 8F and, in particular, to FIG. 8A, one example of processing of an encrypted message by a second device from a first device is set forth therein. In a step 700, an interrupt is detected and acted upon. The time difference between the last edge is determined and the radio inactive timer is cleared in step 702. A determination is made as to whether this is an active time or inactive time in a step 704, i.e., whether the signal is being sent with carrier or not. If it is an inactive time, indicating the absence of carrier, control is transferred to a step 706 to store the inactive time in the memory and the routine is exited in a step 708. In the event that it is an active time, the active time is stored in memory in a step 710 and the bit counter is tested in a step 712. If the bit counter is zero, control is transferred to a step 714, as may best be seen in FIG. 8B and a test is made to determine whether the inactive time is between 20 milliseconds and 55 milliseconds. If it is not, the bit counter is cleared as well as the rolling code register and the fixed code register in step 716 and the routine is exited in step 718.

In the event that the inactive time is between 20 milliseconds and 55 milliseconds, a test is made in a step 720 to determine whether the active time is greater than 1 millisecond, as shown in FIC. 8C. If it is not, a test is made in a step 722 to determine whether the inactive time is less than 0.35 millisecond. If it is, a frame 1 flag is set in a step 728 identifying the incoming information as being associated with frame 1 and the interrupt routine is exited in a step 730. In the event that the active time test in step 722 is not less than 0.35 millisecond, in the step 724, the bit counter is cleared as well as the rolling code register and the fixed register, and the return is exited in the step 726. If the active time is greater than 1 millisecond as tested in step 720, a test is made in a step 732 to determine whether the active time is greater than 2.0 milliseconds, and if not the frame 2 flag is set in a step 734 and the routine is exited in step 730. If the active time is greater than 2 milliseconds, the bit counter rolling code register and fixed code register are cleared in step 724 and the routine is exited in step 726.

Figure 8D:
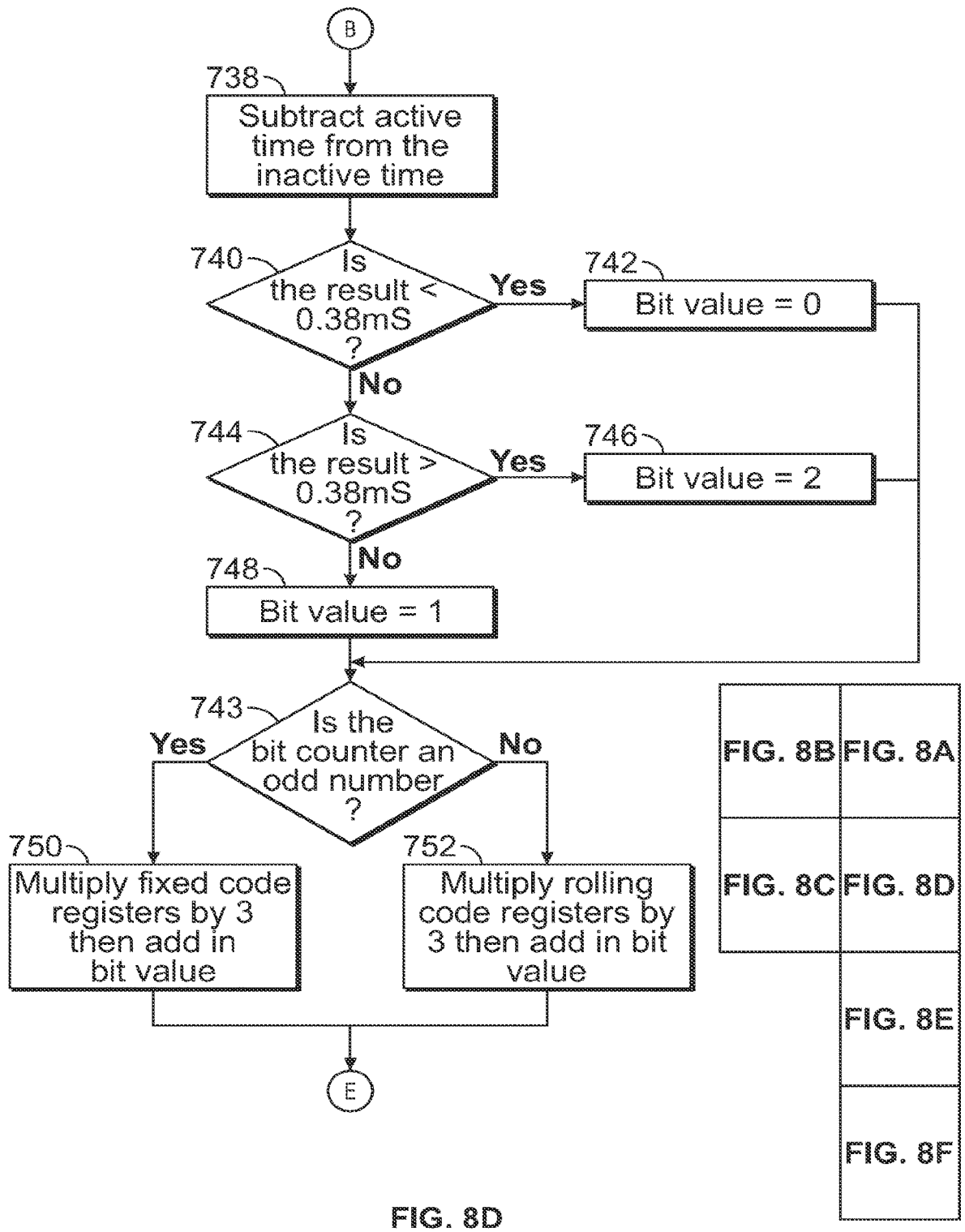

In the event that the bit counter test in step 712 indicates that the bit counter is not 0, control is transferred to setup 736, as shown in FIG. 8A. Both the active and inactive periods are tested to determine whether they are less than 4.5 milliseconds. If either period is not less than 4.5 milliseconds, the bit counter is cleared as well as the rolling code register and the fixed code registers. If both are equal to or greater than 4.5 milliseconds, the bit counter is incremented and the active time is subtracted from the inactive time in the step 738, as shown in FIG. 8D. In the step 740, the results of the subtraction are determined as to whether they are less than 0.38 milliseconds. If they are the bit value is set equal to zero in step 742 and control is transferred to a decision step 743. If the results are not less than 0.38 milliseconds, a test is made in a step 744 to determine if the difference between the active time and inactive time is greater than 0.38 milliseconds and control is then transferred to a step 746 setting the bit value equal to 2. Both of the bit values being set in steps 742 and 746 relate to a translation from the three-level trinary bits 0, 1 and 2 to a binary number.

If the result of the step 744 is in the negative, the bit value is set equal to 1 in step 748. Control is then transferred to the step 743 to test whether the bit counter is set to an odd or an even number. If it is set to an odd number, control is transferred to a step 750 where the fixed code, indicative of the fact that the bit is an odd numbered bit in the frame sequence, rather an even number bit, which would imply that it is one of the interleaved rolling code bits, is multiplied by three and then the bit value added in.

Figure 8E:
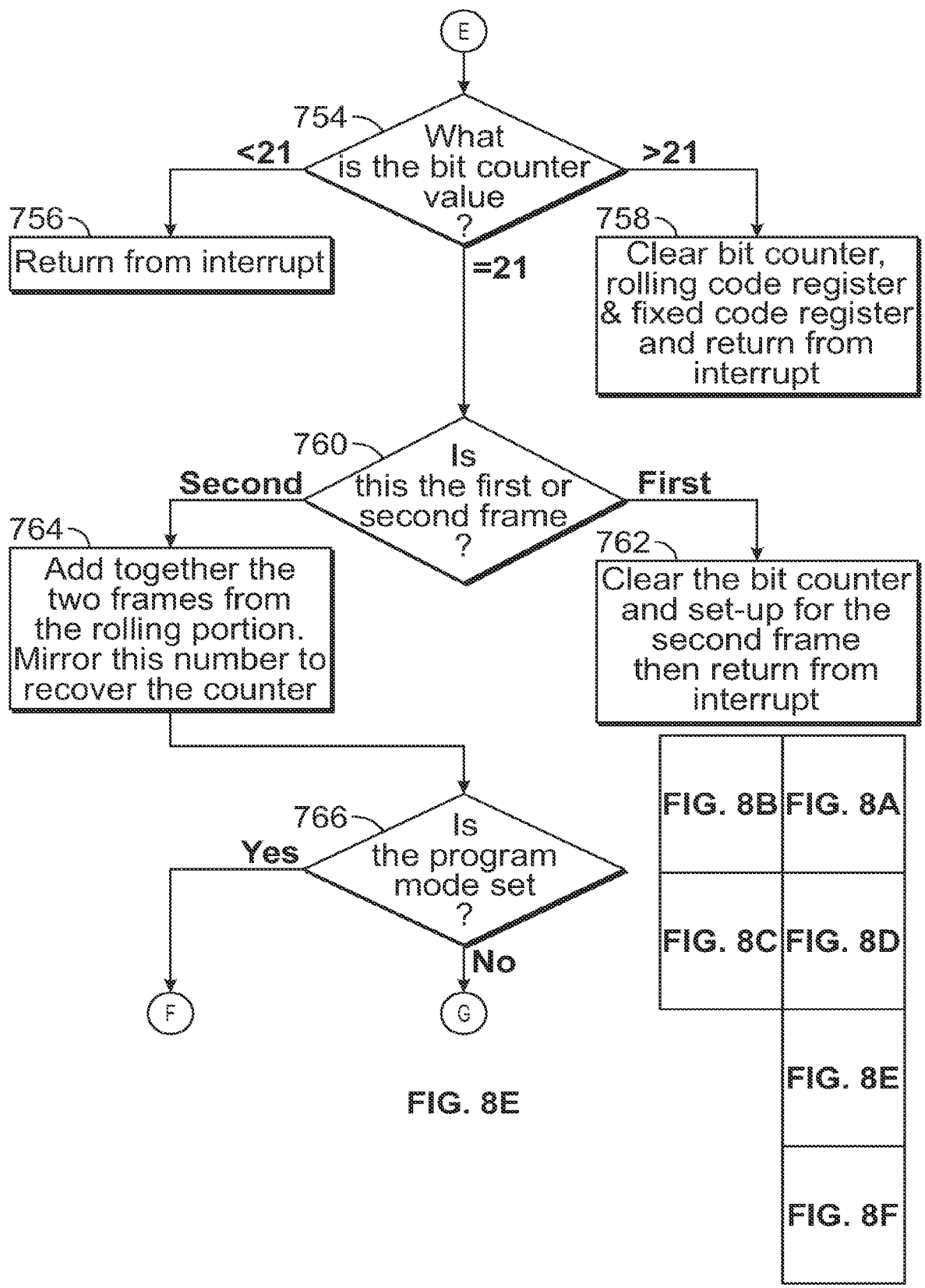
Figure 8F:
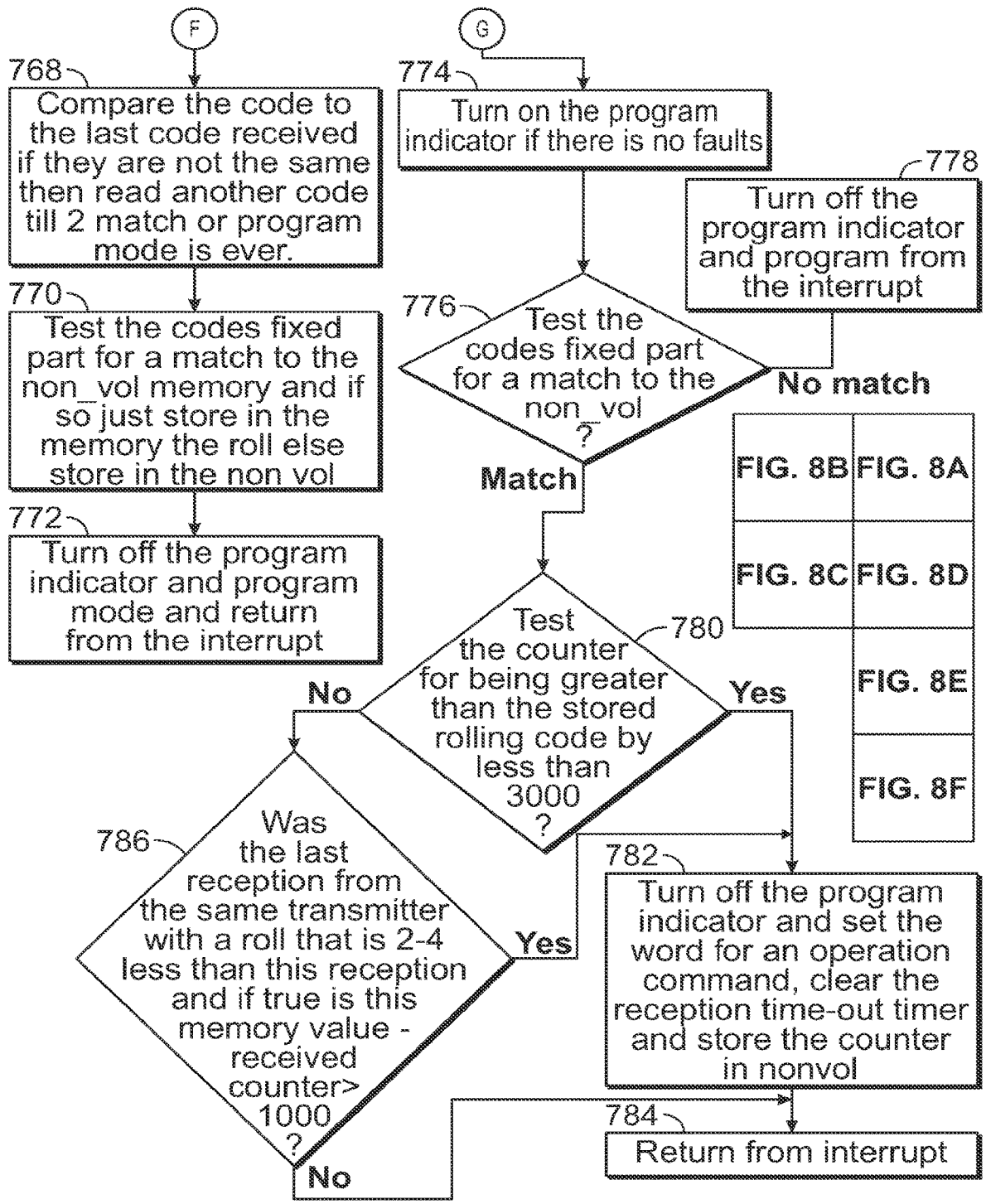

If the bit counter indicates that an odd number trinary bit is being processed, the existing rolling code registers are multiplied by three and then the trinary bit value obtained from steps 742, 746 and 748 is added in. Whether step 750 or 752 occurs, the bit counter value is then tested in the step 754, as shown in FIG. 8E. If the bit counter value is greater than 21, the bit counter rolling code register and fixed code register are cleared in the step 758 and the routine is exited. If the bit counter value is less than 21, there is a return from the interrupt sequence in a step 756. If the bit counter value is equal to 21, indicating that a sink bit plus trinary data bits have been received, a test is made in a step 760 to determine whether the sink bit was indicative of a first or second frame, if it was indicative of a first frame, the bit counter is cleared and set up is done for the second frame following which there is a return from the routine in the step 762. In the event that the second frame is indicated as being received by the decision of step 760, the two frames have their rolling contributions added together to form the complete inverted rolling code. The rolling code is then inverted or mirrored to recover the rolling code counter value in the step 764. A test is made in the step 766 to determine whether the program mode has been set. If it has been set, control is transferred to a step 768 where the code is compared to the last code received. If there is no match, then another code will be read until two successive codes match or the program mode is terminated. In a step 770, the codes are tested such that the fixed codes are tested for a match with a fixed code non-volatile memory. If there is a match, the rolling portion is stored in the memory. If there is not, the rolling portion is stored in the non-volatile memory. Control is then transferred to step 772, the program indicator is switched off, the program mode is exited and there is a return from the interrupt. In the event that the test of step 766 indicates that the program mode has not been set, the program indicator is switched on in a step 774, as shown in FIG. 8F. The codes are tested to determine whether there is a match for the fixed portion of the code in the step 776. If there is no match, the program indicator is switched off and the routine is exited in step 778. If there is a match, the counter which is indicative of the rolling code is tested to determine whether its value is greater than the stored rolling code by a factor or difference of less than 3,000 indicating an interval of 1,000 button pushes for the first device. If it is not, a test is made in the step 786 to determine whether the last transmission from the same first device is with a rolling code that is two to four less than the reception and, if true, is the memory value minus the received rolling code counter value greater than 1,000. If it is, control is transferred to a step 782 switching off the program indicator and setting the operation command word causing a commanded signal to operate the garage door operator. The reception time out timer is cleared and the counter value for the rolling code is stored in non-volatile memory, following which the routine is exited in the step 784. In the event that the difference is not greater than 1,000, in step 786 there is an immediate return from the interrupt in the step 784. In the event that the counter test in the step 780 is positive, steps 782 and 784 are then executed thereafter.

Figure 8G:
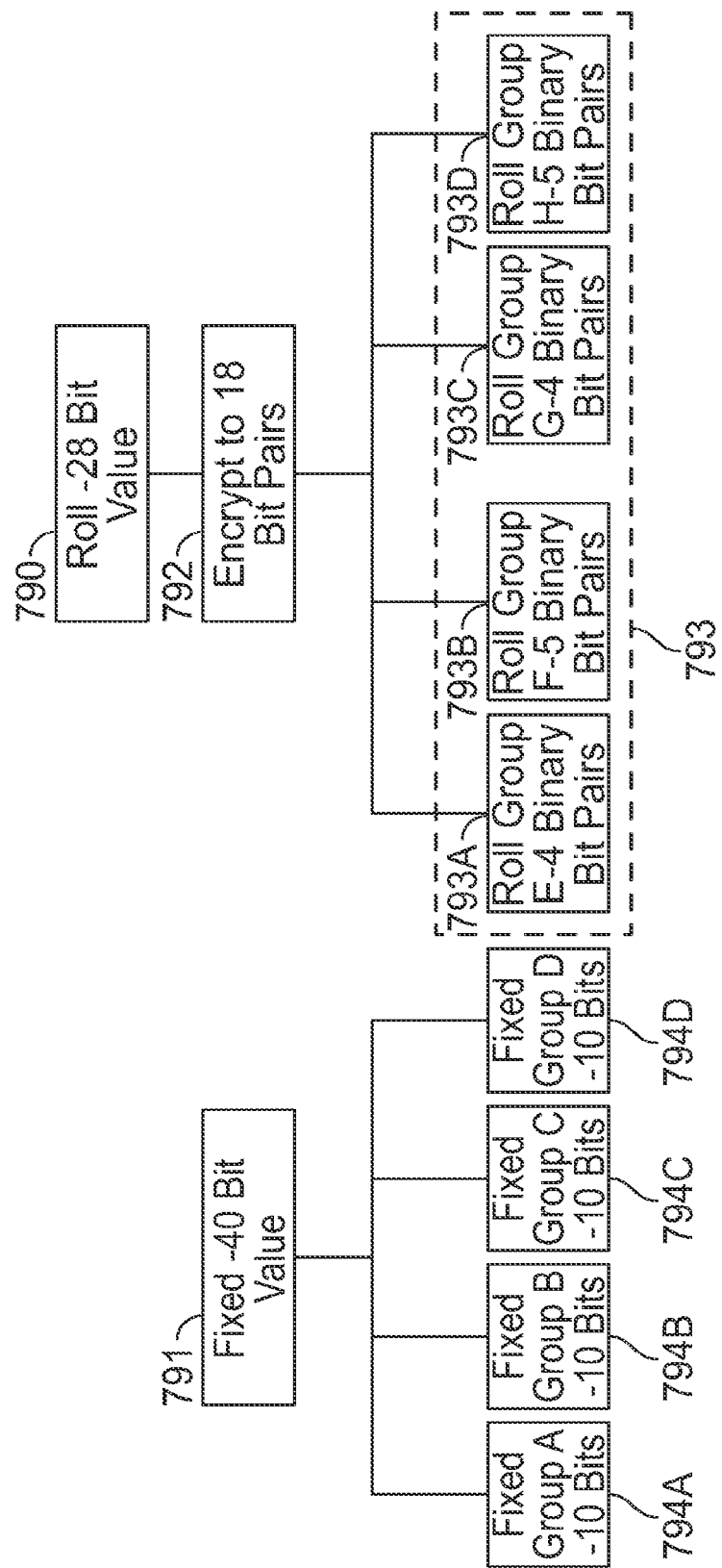
FIG. 8G is a schematic view of one example of bit processing for use in encrypting a message.
Figure 8H:
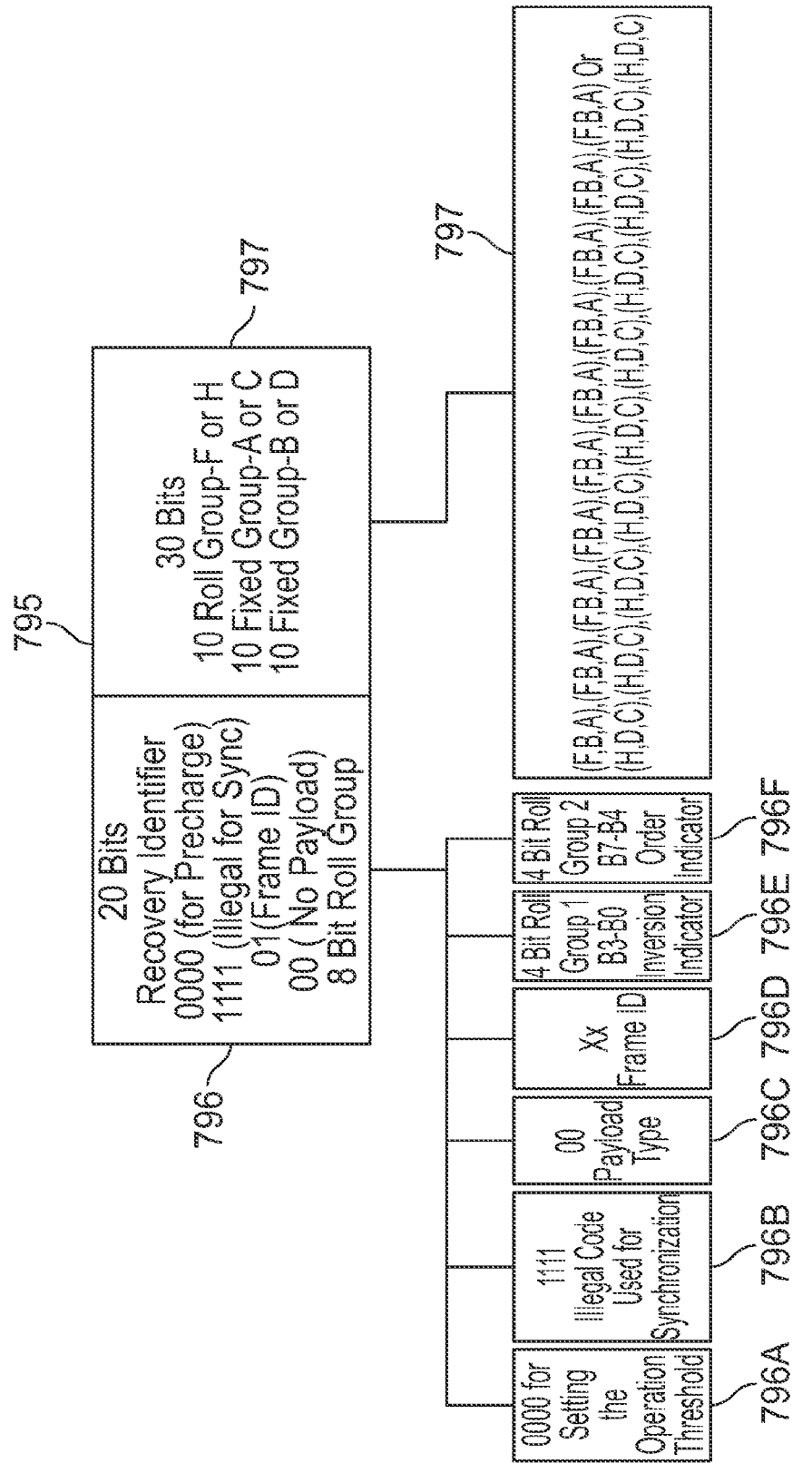
FIG. 8H is an example message diagram in accordance with one example of an encrypted message.

FIGS. 8G and 8H are schematic views of bit processing and parsing (FIG. 8G) and an example message diagram (FIG. 8H) configured in accordance with one example of forming an encrypted message. This provides one example in which a fixed code portion and variable (e.g. rolling) code portion may be used to form an encrypted message. Referring now to FIG. 8G, one illustrative embodiment of bit processing and parsing will be presented. In this example, the only substantive content to be associated and transmitted with a 28 bit rolling code 790 comprises a 40 bit value that represents fixed information 791. This fixed information 791 may serve, for example, to uniquely identify the transmitter that will ultimately transmit this information. In this embodiment, the bits comprising the rolling code 790 are encrypted 792 by mirroring the bits and then translating those mirrored bits into ternary values as suggested above to provide corresponding bit pairs (in this example, this would comprise 18 such bit pairs) to thereby provide a resultant encrypted rolling code 793. This mirroring can be applied to specific groupings of bits in the rolling code creating mirrored groups or can involve the entire value. In this illustrative example, the encrypted rolling code 793 is presented for further processing as four groups. In this example, these four groups comprise a roll group E 793A comprised of four binary bit pairs, a roll group F 793B comprised of five binary bit pairs, a roll group G 793C comprised of four binary bit pairs, and a roll group H 793D comprised of five binary bit pairs.

The 40 bit fixed information 791 is subdivided in a similar manner albeit, in this embodiment, sans encryption. This comprises, in this particular illustrative approach, forming four subgroups comprising a fixed group A 794A, a fixed group B 794B, a fixed group C 794C, and a fixed group D 794D, wherein each such group is comprised of 10 bits of the original 40 bit value.

These variously partitioned data groups can then be used as shown in FIG. 8H to effect a desired transmission. In this example, one or more joint messages 795 provide a primary vehicle by which to communicate the desired information (which includes both the encrypted rolling code and fixed information data as modified as a function of a given portion of the encrypted rolling code along with a recovery identifier that represents that given portion of the encrypted rolling code). This joint message 795 comprises, generally speaking, a first 20 bit portion 796 and a second 30 bit portion 797.

The first portion 796 comprises, in this embodiment, the following fields: "0000"—these bits 796A serve to precharge the decoding process and effectively establish an operational threshold; "1111"—these bits 796B comprise two bit pairs that present the illegal state "11" ("illegal" because this corresponds to a fourth unassigned state in the ternary context of these communications) and serve here as a basis for facilitating synchronization with a receiving platform; "00"—this bit pair 796C identifies a type of payload being borne by the joint message (in this embodiment, "00" corresponds to no payload other than the fixed identifying information for the transmitter itself, "01" corresponds to a supplemental data payload, and "10" corresponds to a supplemental data-only payload—further explanation regarding these payload types appears further below); "Xx"—this bit pair 796D presents a frame identifier that can be used by a receiver to determine whether all required joint messages 795 have been received and which can also be used to facilitate proper reconstruction of the transmitted data; "B3, B2, B1, B0"—these two bit pairs 796E comprise an inversion pattern recovery identifier and are selected from the bits that comprise the encrypted rolling code 793 described above; "B7, B6, B5, B4"—these two bit pairs 796F comprise a bit order pattern recovery identifier and are also selected from the bits that comprise the encrypted rolling code 793 described above.

There are various ways by which these recover identifier values can be selected. By one approach, a specified number of bits from the encrypted roll group can be selected to form a corresponding roll sub-group. These might comprise, for example, the first or the last eight bits of the encrypted roll group (in a forward or reversed order). These might also comprise, for example, any eight consecutive bits beginning with any pre-selected bit position. Other possibilities also exist. For example, only even position bits or odd position bits could serve in this regard. It would also be possible, for example, to use preselected bits as comprise one or more of the previously described roll group sub-groups.

It would also be possible to vary the selection mechanism from, for example, joint message to joint message. By one simple approach in this regard, for example, the first eight bits of the encrypted roll group 793 could be used to form the roll sub-group with the last eight bits of the encrypted roll group 793 being used in a similar fashion in an alternating manner. The bits that comprise this roll sub-group may then be further parsed to form two recovery indicators. These recovery indicators may be used in conjunction with one or more lookup tables to determine a data bit order pattern to use with respect to formatting the data as comprises the a portion of the joint message. In some embodiments, roll groups used to form the recovery indicators do not appear in the joint message.

Figure 9A:
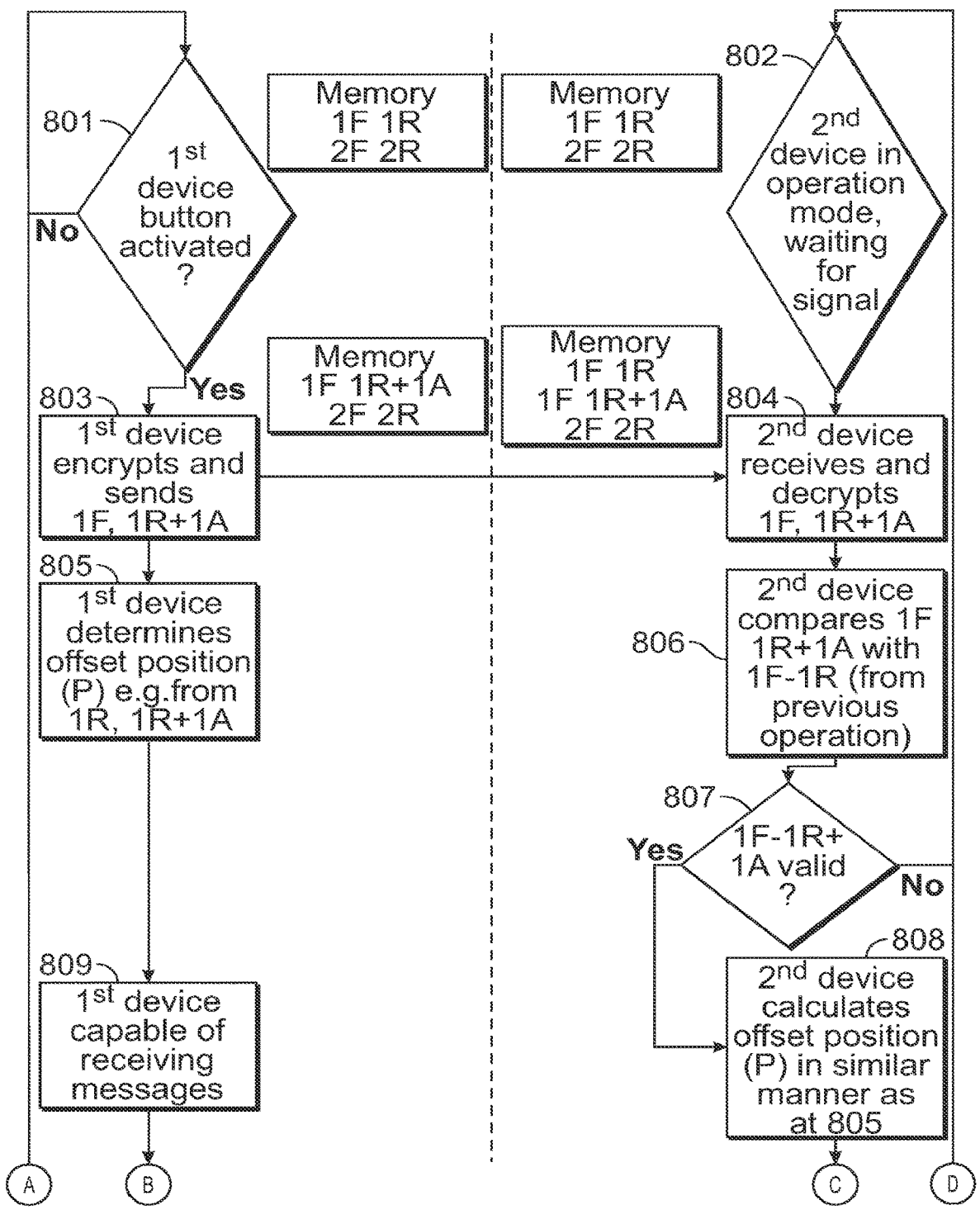
FIGS. 9A-C are flow diagrams showing another example communication flow between a first device and a second device during normal operation.
Figure 9B:
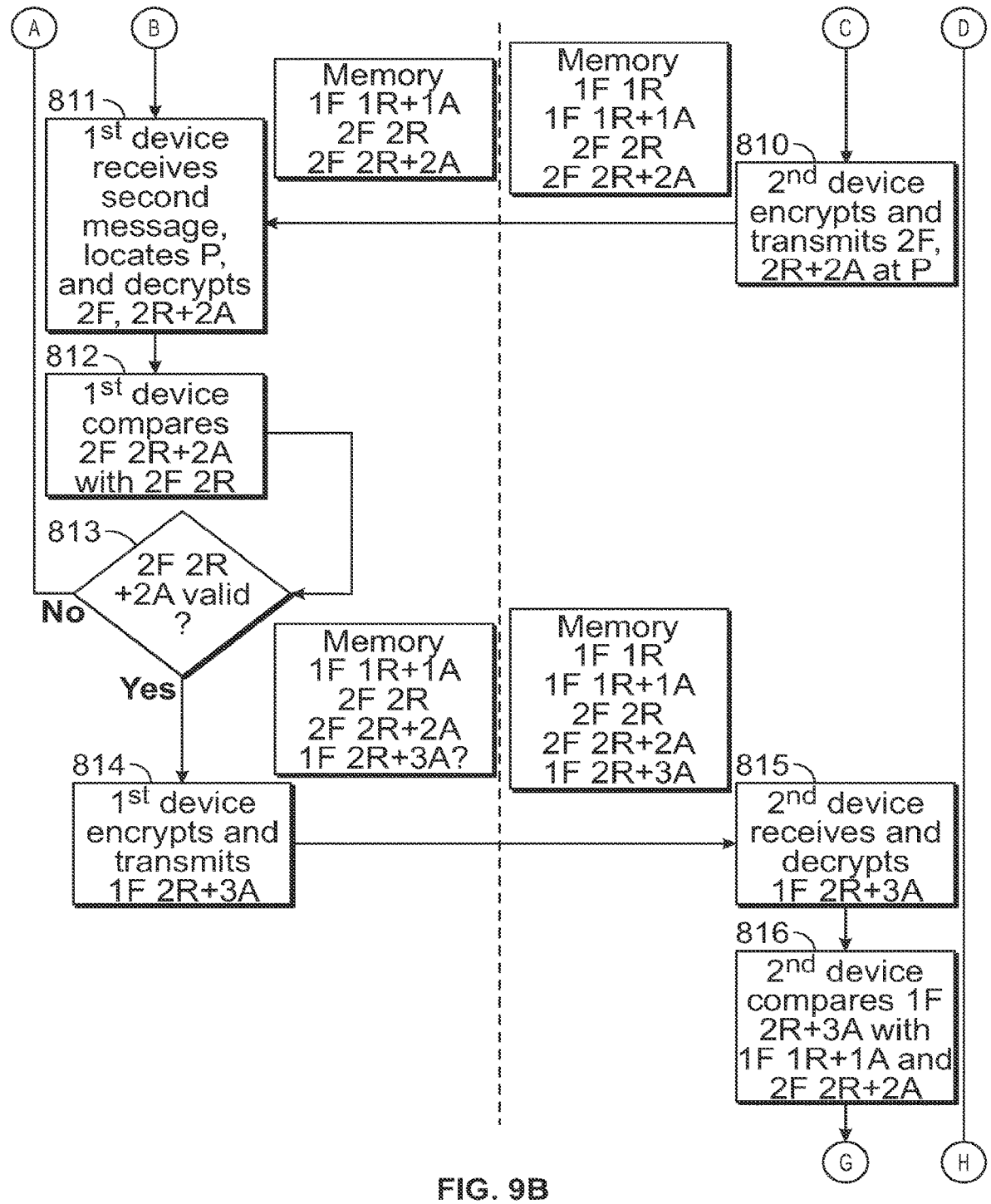
Figure 9C:
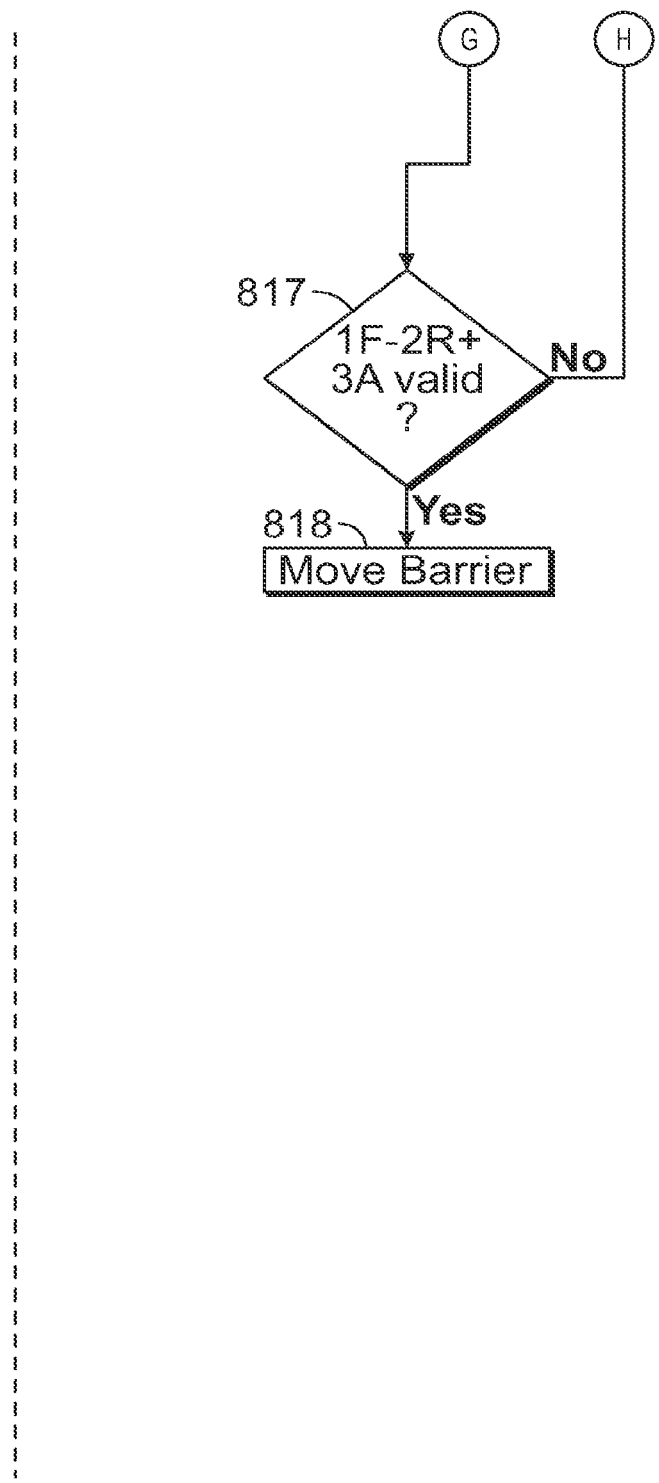

FIGS. 9A, 9B, and 9C are interconnected flow charts that demonstrate a more specific example of the process discussed above with respect to FIGS. 4A-C. In this example, a first device (such as a handheld or vehicle mounted transceiver) commands a second device (such as a garage door operator) to take an action through encrypted transmissions of rolling codes. Throughout FIGS. 9A-C, "1F" refers to a first fixed code, "1 W" refers to a first rolling code, "2F" refers to a second fixed code unrelated to 1F, and "2 W" refers to a second changing/rolling code unrelated to 1R. "1A," "2A," and "3A" each refer to an "adder" that represents a value added to the rolling code or one or more rolls of the rolling code. 1A, 2A, and 3A may be the same or different. The communications involve multiple levels of encryption so that each device encrypts fixed and changing codes with a first level of encryption and then encrypts the entire transmitted message with a second level of encryption, thus entailing the other device to decrypt the message, locate the encrypted fixed and changing codes within the decrypted message, and then decrypt the fixed and changing codes.

Initially, the first and second devices both have stored in their memories a first fixed code and first variable code from the immediately previous operation involving the first device, as well as a second fixed code and second rolling code from the immediately previous operation involving the second device. When the first device is activated by a user in a manner intended to cause an action by the second device, such as by pressing an activation button (step 801), the first device creates or otherwise assembles a first message that includes a first fixed code corresponding to the first device (1F) and a first changed version of the first rolling code (1R+1A) representing the rolling code value from the previous operation as modified by a first change protocol (i.e. an algorithm that cycles through a specified number of codes in a sequence or calculates a new value from the initial rolling code value). The changed code (1F 1R+1A) is stored in the memory of the first device, and is also encrypted using one or more encryption methods for transmittal to the second device (step 803). At this point, the initial value of the rolling code (1R) may be optionally deleted from the device memory. The first device also specifies or determines 805 an offset position at which it expects to find an encrypted fixed and/or rolling code in a subsequently-received message. The offset position (P) may be determined from one or both of the rolling code values (1R and/or 1R+1A) or a portion thereof, or from the encrypted message or a portion thereof. For instance, the 1R+1A may include bit position data within a specific portion of its sequence or the first device may use a lookup table, apply an algorithm to 1R+1A or one or more portions thereof in order to calculate or otherwise determine or specify the offset position P. For instance, the transmission characteristics of recovery identifiers (e.g. portions 796E and/or 796F of the message 795 shown in FIG. 8H), a portion of the encrypted changing code portion (e.g. part of the 30 bit portion 797 shown in FIG. 8H), and/or a portion of the decrypted changing code value may determine or specify: a) how to position (e.g. shift or offset) the data of interest within a message that is to be assembled and communicated; and b) how a recipient of the message may focus on the data of interest that has been shifted, for example determining a number of bits to ignore before beginning reading of a fixed or changing code at a point designated as P.

The second device, which is in operation mode and awaiting signals (step 802), receives the first encrypted message from the first device, decrypts the message to obtain the encrypted first fixed code and first variable code (1F 1R+1A), decrypts the first fixed code and first variable code, and stores the new value in its memory (step 804). The second device then compares the first fixed code and first variable code received from the first device (1F 1R+1A) to expected values based on stored code values (e.g. by applying the same algorithm used by the first device to previous first device values stored in the second device's memory (1F 1R)) (step 806). When comparing the received values with stored values, the second device will perform a validation step 807. If the fixed codes match and the received first rolling code (1R+1A) matches an expected value based on the stored rolling code (1R), the second device will establish or maintain a previously-established communications session (e.g. constituted by multiple messages between the first and second devices) and will proceed to further communicate with the first device. In order to account for accidental triggering of the first and/or second devices, use of multiple first devices with the second device, or other situations in which the rolling code received from the first device may not exactly match the expected value, this validation step preferably compares the received rolling code (1R+1A) to a set number of values from a series of values that fall within a sequence before and/or after the expected value (i.e. within a window of specified size around the expected value), and consider the message from the first device valid if the received rolling code matches any value within the series. In this way, activation of one device when not in range of the other will not completely desynchronize the two devices and render communication impossible. If the decrypted code values do not match the stored code values, the second device ignores the first message and returns to step 802.

If the received message is validated, the second device calculates 808 an offset position (P) at which to include encrypted fixed and variable codes. As depicted in FIG. 9A, the second device may calculate the same offset position (P) in the same manner calculated by the first device at step 805.

In response to validating the first encrypted message, and after determining the offset position, the second device transmits 810 a response comprising a second encrypted message derived from a second fixed code (2F) corresponding to the second device and a second rolling code (2R+2A) that is independent from the first changing code and represents a modified version of the second changing code from the immediately previous operation (2R). The second fixed code (2F) and second rolling code (2R+2A) are encrypted and positioned at the determined offset position (P) within the encrypted second message. These values for (2F) and (2R+2A) also are stored in the second device's memory, so that at this stage the second device memory contains the first fixed and variable code from the previous operation (1F 1R), the second fixed and variable code from the previous operation (2F 2R), the first fixed and variable code from the first encrypted message sent by the first device (1F 1R+1A), and the second fixed and variable code from the encrypted response (2F 2R+2A).

The first device is capable of receiving (step 809) messages from the second device, which may require actively enabling the receiver if the first device is configured to conserve power and has its receiver in an off configuration by default. When the second device's response is received by the first device, the first device will decrypt the second message, locate the offset position (P), and decrypt the encrypted fixed and variable codes to determine the second fixed code and second rolling code (2F, 2R+2A) (step 811). These values (2F, 2R+2A) are stored in the first device's memory, along with the second fixed and variable code from the previous operation (2F 2R) and the first fixed and variable code from the first encrypted message (1F 1R+1A).

The first device then compares the second fixed code and second rolling code (2F 2R+2A) with fixed and variable codes from a previous operation (2F 2R) stored in the memory of the first device (step 812). The first device will then perform a validation step (step 813) similar to the validation step performed by the second device at step 807. If the second fixed code matches the fixed code from the prior operation and the second variable code (2R+2A) matches the prior changing code as modified according to a set of established rules for the changing code, taking into account a predetermined accepted amount of error (e.g. forward-looking window), the response message is considered validated. If the second fixed and variable codes (2F 2R+2A) are determined valid (step 813), the first device generates or otherwise assembles a message including at least the first fixed code and a changed version of the second rolling code (1F 2R+3A) by applying an algorithm (which may be the same or different as the algorithm used at step 803 and/or step 810) to the rolling code value received from the second device (2R+2A), encrypts the message to create a third encrypted message, stores the new values in its memory, and transmits the third encrypted message to the second device (step 814). Generation or assembly of the third encrypted message may include configuring the data of interest (i.e. the first fixed code and the changed version of the second rolling code (1F 2R+3A)) at an offset position within the message at which the recipient second device will focus upon when parsing the message contents for extraction of the message contents. If the first device is unable to validate the response from the second device, the process ends and the first device returns to awaiting subsequent activation (801).

The second device receives and decrypts 815 the third encrypted message to determine the first fixed code and the changed version of the second variable code (1F 2R+3A), locating an offset position to do so if the third message includes offset information. The second device then compares the fixed codes from the first and third encrypted transmissions to confirm that they were transmitted by the same first device, and the rolling code from the third encrypted message to an expected value based on the last stored second rolling code value (2R+2A from the second encrypted message) (step 816). In a validation step similar to those discussed above, the second device then determines 817 if the third encrypted message is valid. If the third message is validated, the second device performs 818 the requested action associated with activation of the first device. If the second device is unable to validate the third message, it ends the process without performing the requested action and returns to step 802 awaiting signals from the first device.

Figure 10A:
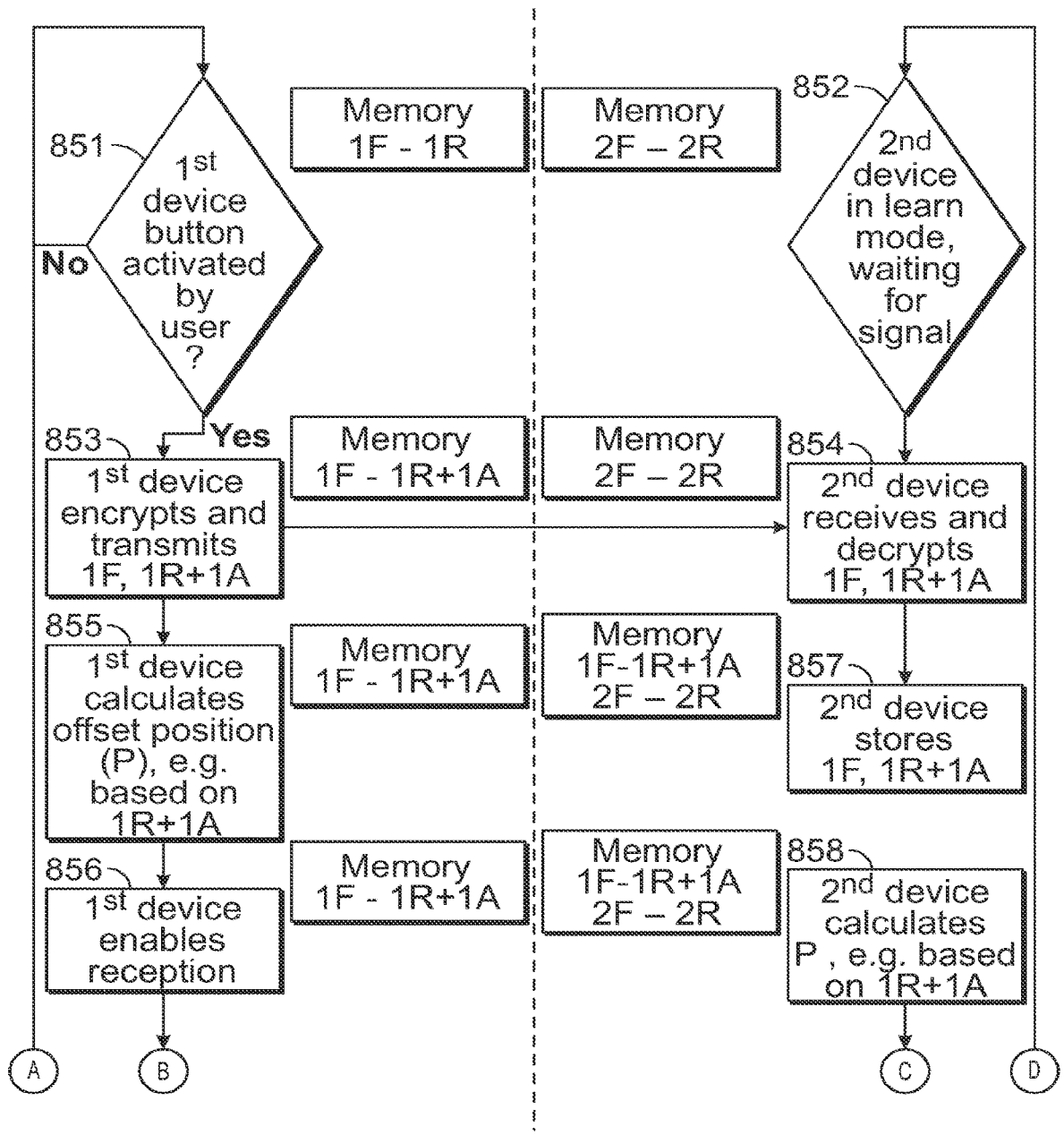
FIGS. 10A-C are flow diagrams showing another example communication flow between a first device and a second device during a learning sequence.
Figure 10B:
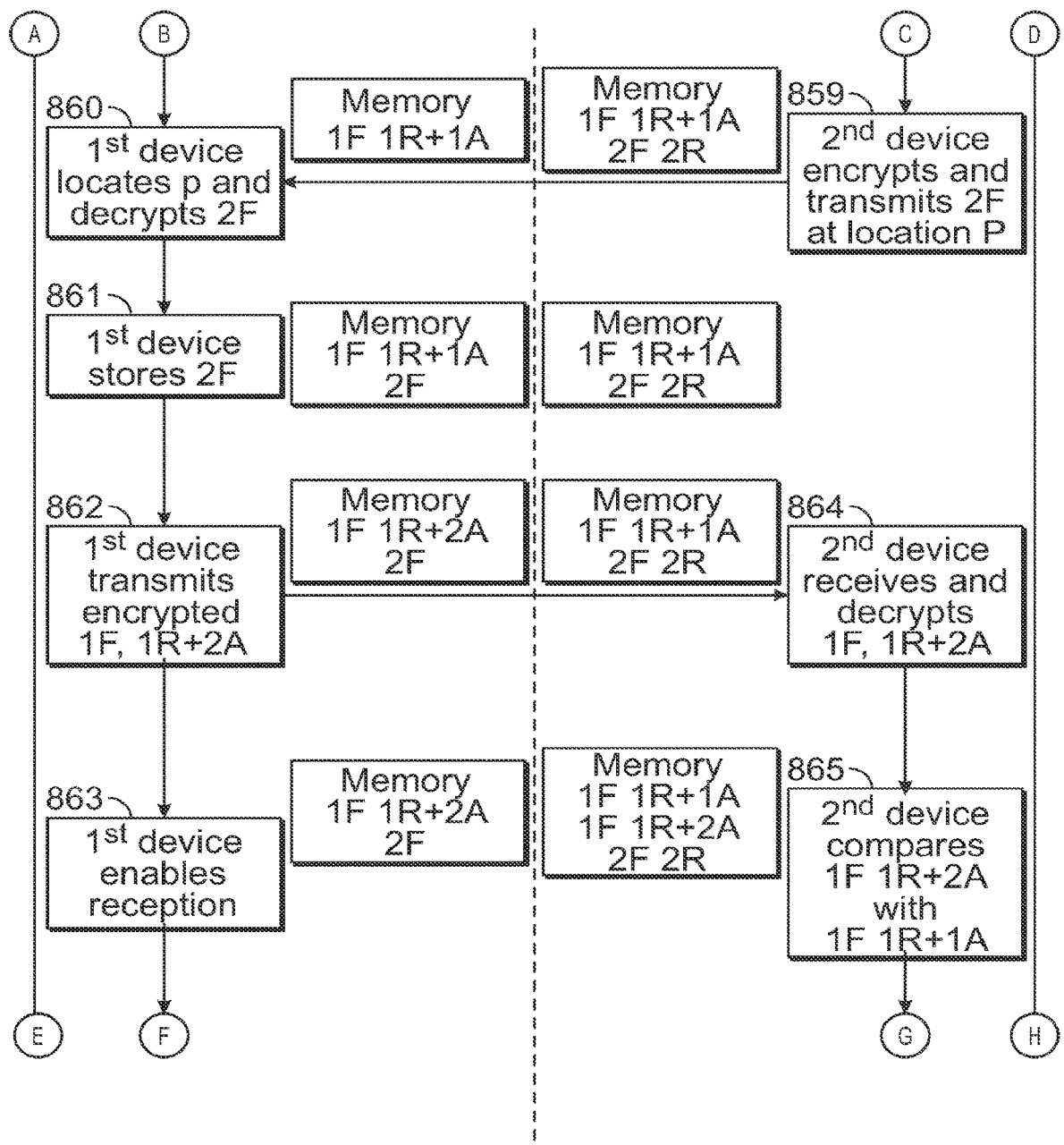
Figure 10C:
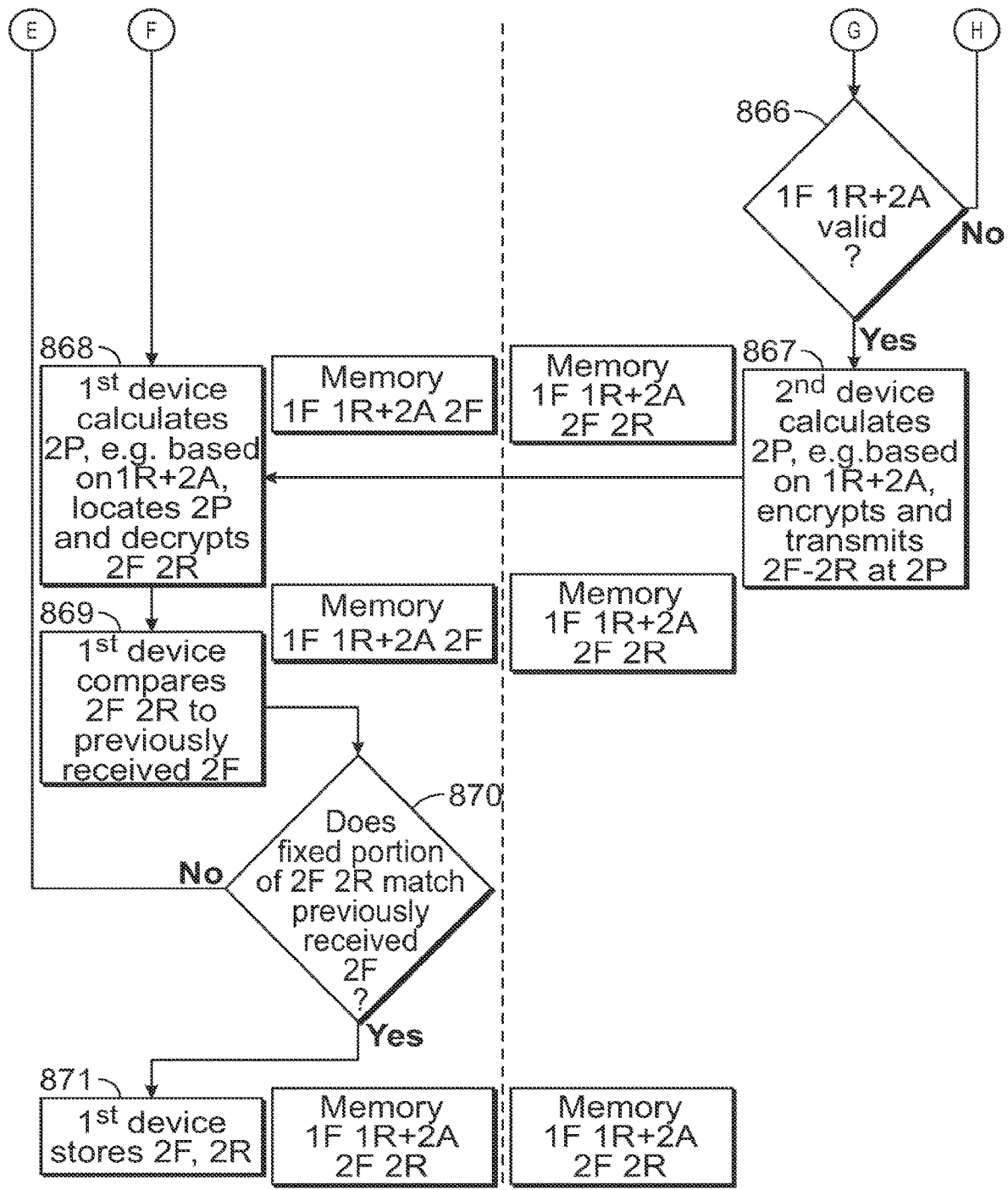

FIGS. 10A-C illustrate one example of a specific learning sequence for a first device and a second device corresponding to the more general method illustrated in FIGS. 5A-C. In this example, a first device (e.g. a user-actuated device) and a second device (e.g. an operator device for carrying out a specific action) are synchronized in order to recognize and validate signals shared between the devices on both ends. Throughout FIGS. 10A-C, "1F" refers to a first fixed code, "1R" refers to a first rolling code, "2F" refers to a second fixed code unrelated to 1F, "2 W" refers to a second rolling code unrelated to 1R. "1A," "2A," and "3A" each refer to an "adder" that represents a value added to the rolling code or one or more rolls of the rolling code. 1A, 2A, 3A may be the same or different. Each of these values are not necessarily the same as those in FIGS. 9A-C.

The learning sequence begins when the first device is activated (such as by a user pressing a button on the device) (step 851) while a second device has been placed in "learn" mode (step 852) (e.g. by pressing a button or switching a lever associated with the second device). To begin, the first device contains within its memory a first fixed (1F) and first variable code (in this case rolling code 1R) that represent initial values or values from previous operation of the first device, and the second device contains a second fixed code (2F) and second variable code (in this case rolling code 2R) that represent initial values or values from previous operation. The fixed codes are each associated with and identify their respective devices, while the rolling codes are independent from one another. When the first device is activated, it generates a first encrypted message from the first fixed code and a modified version of the first rolling code (1F 1R+1A) (step 853), and determines or specifies based on at least a portion of the first rolling code or the first encrypted message an offset position (P) in which to expect an encrypted fixed and/or rolling code from the second device (step 855). The offset position (P) may be defined by values within the first rolling code or first encrypted message, or may be calculated therefrom based on a lookup table or an algorithm. If necessary, a first device receiver is enabled in order to receive the response from the second device (step 856).

Meanwhile, the second device receives the first encrypted message while the second device is in the learn mode (step 854) and stores in the second device's memory the decrypted first fixed and first variable codes (1F 1R+1A) from the first encrypted message (step 857) or portions thereof. The second device determines the offset position (P), based on the first encrypted message and/or first rolling code, at which to include its fixed code in a response (step 858). The second device then transmits a response comprising an encrypted version of the second fixed code (2F) located at shifted/offset position P (step 859). Optionally a second rolling code that is independent from the first rolling code may be included in the second encrypted message. The second rolling code may, for instance, begin with a minimum value (such as 00). If the second encrypted message is received by the first device, the second message is decrypted (step 860) and the first device focuses on or otherwise locates the data of interest and proceeds to parse and extract the data of interest from offset position, thereafter storing the second fixed code (and optional second variable code if sent) (step 861). If either the first device or second device incorrectly calculates the offset position (P) of the second fixed code, the devices will not have matching second fixed codes (2F) due to the first device failing to begin parsing, extracting or otherwise reading 2F at the appropriate point.

After receiving the response from the second device and storing associated values, and either being set to learn mode by activation of a switch or receipt of a learning indicator from the second device, the first device then transmits a third encrypted message including at least the first fixed code (1F) and a changed version of the first changing code (1R+2A) (step 862). The first fixed code (1F) and a changed version of the first changing code (1R+2A) may be offset in a manner similar to that described above. If necessary, the first device also enables a receiver of the first device in anticipation of receiving further communications from the second device.

When the second device receives and decrypts the third encrypted message (step 864), it validates the message by comparing (step 865) the first fixed code and the changed versions of the first changing code (1F 1R+2A) to expected values from stored code values from the first encrypted message (1F 1R+1A) (step 866). If the first fixed code and the changed versions of the first changing code (1F 1R+2A) within the third message are offset/shifted, the second device also must determine the offset position and subsequently focus thereon for parsing and/or extraction of the relevant data. If the second device determines that the codes from the third encrypted message (1F 1R+2A) are valid (step 866), the second device then transmits, in response to validating the third encrypted message, a fourth encrypted message including encrypted versions of the second fixed code and a second changing code (2F 2R) (step 867). The second device positions encrypted versions of the second fixed code and the second changing code (2F 2R) at a second offset position (2P) in the fourth message based on the current version of the first changing code (1R+2A). Due to the second offset position (2P) being based on a version of the first changing code that differs from the version of the first changing code that is included in the first message, the second offset position (2P) likely differs from the first offset position (P).

The first device receives and decrypts the fourth encrypted message (step 868), calculates the second position (2P) of the fourth message at which the second device's encrypted codes are located based on the changing code (1R+2A) from the third message, decrypts the second fixed code and second changing code (2F 2R) at the second position (2P), and validates the fourth message by comparing the fixed code of the fourth message to the previously-received fixed code (step 869). If the fixed codes are the same, indicating that both came from the second device and that both the first and second devices were capable of calculating positions P and 2P for the two transmissions of the second fixed code, the fourth message is determined to be valid (step 870), the first device stores the second fixed code and the second rolling code (2F 2R) (step 871). The first and second devices now have stored in their respective memories matching first fixed/rolling and second fixed/rolling code pairs (1F 1R+2A and 2F 2R) that may be used as initial values (1F 1R and 2F 2R) in an operation such as that shown in FIGS. 9A-9C.

Learn mode may operate on the same frequency as operation mode, and both modes may operate on multiple frequencies. In some embodiments the first device and the second device communicate wirelessly in the operation mode and/or the learn mode via one or more frequencies, channels, bands, and radio physical layers or protocols including but not limited to, for example, 300 MHz-400 MHz, 900 MHz, 2.4 GHz, Wi-Fi/WiLAN, Bluetooth, Bluetooth Low Energy (BLE), 3GPP GSM, UMTS, LTE, LTE-A, 5G NR, proprietary radio, and others. In other embodiments, the first device and the second device communicate in the operation mode and/or the learn mode via a wired connection and various protocols including but not limited to two (or more) wire serial communication, Universal Serial Bus (USB), Inter-integrated Circuit (I$^2$C) protocol, Ethernet, control area network (CAN) vehicle bus, proprietary protocol, and others. In some embodiments, the maximum distance between the first device and second device may vary between learn mode and operation mode, while in other modes the maximum range will be the same in both modes due to variation in range from interference.

Figure 10D:
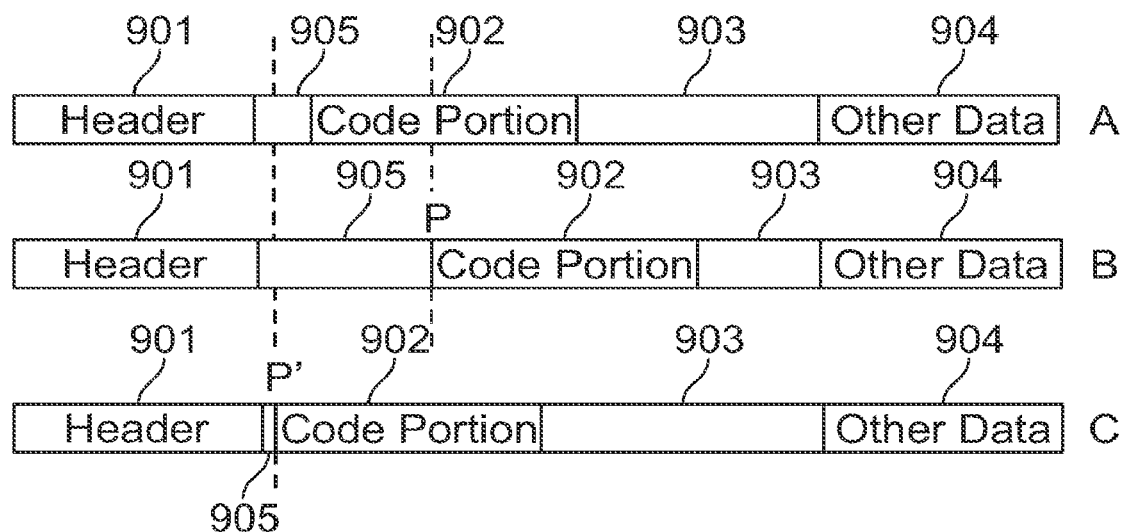
FIG. 10D shows diagrams of example message segments demonstrating positioning of codes withing a message based on information from a previous message, wherein the message is of a fixed length.
Figure 10E:
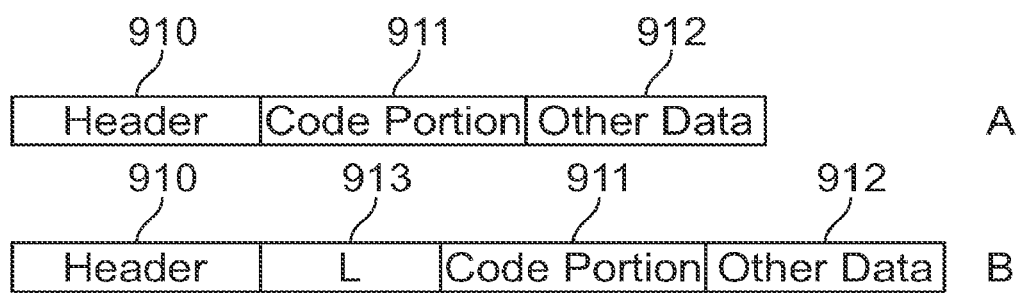
FIG. 10E shows diagrams of example message segments demonstrating positioning of codes within a message without regard to overall message length.

FIGS. 10D and 10E demonstrate specific examples of ways in which content of a message may be positionally shifted in order to increase security. For example, a default message format shown as "A" of FIG. 10D includes a header 901, a code portion 902 (a sequence of bits or bytes that includes a fixed code and/or a changing code), a random sequence forming a trailing sequence 903 and other data 904 such as a payload or additional fixed and/or changing codes. The default message may also include a leading sequence 905 before the code portion 902. When a device alters the position of code portion 903 within the message as shown in "B" of FIG. 10D, the code portion 903 is shifted away from the header 901 so that the code portion 902 begins at a position P within the message, resulting in a longer leading sequence 905 preceding the code portion 902 (or the introduction of leading sequence 905 if it had not existed in the default message) and separating the header portion 901 or preamble of the message and the code portion 902. The code portion 902 may be moved to position P to provide an offset code sequence based on shifting a specific number of bits or bytes relative the beginning of the message, the end of the header 901, or some other marker within the message, or alternatively may be positioned within a window or slot of a defined length. If a device that receives a message is configured to expect the code portion 902 to begin at offset position P, as shown in "B" of FIG. 10D, but the device sending the message is not properly instructed to shift the position of code portion 902 and sends a message in a default format as shown by "A" of FIG. 10D, then the receiving device will attempt to read the code portion starting at position P, which is toward the end of the code portion 902 of the message format "A" of FIG. 10D. As a result, the receiving device will incorrectly parse the message and extract or transcribe the code portion 902 thereby failing to properly authenticate the message or subsequent messages in a message chain or communications session. Alternatively, a device may alter the position of code portion 903 within the message as shown in "C" of FIG. 10D so that the code portion 903 is shifted toward the header 901 so that the code portion 902 begins at a position P' within the message, reducing (and in some cases eliminating) the leading sequence 905 preceding the code portion 902. If a device that receives a message is configured to expect the code portion 902 to begin at offset position P', as shown in "C" of FIG. 10D, but the device sending the message does not properly shift the position of code portion 902 and sends a message in a default format as shown by "A" of FIG. 10D, then the receiving device will attempt to read the code portion starting at position P', which is within the leading sequence of the message format "A" of FIG. 10D. In FIG. 10D, the overall message is of a fixed length so that when the code sequence in portion 902 is preceded by a leading sequence 905, the trailing sequence 903 is adjusted in length so that the starting position of the other data 904 is unaffected. The leading sequence 905 inserted between the header 901 and the code portion 902 may comprise either random bits or a predetermined sequence (for instance, the leading sequence may be a specific arrangement of bits based on a fixed code or changing code from another message). The leading sequence 905 may have a length determined based on one or more portions of a previous message. In some forms, the leading sequence 905 may be present in a default message configuration but adjusted in length based on one or more portions of a previous message. A device reading the message may be configured to locate the code portion 902 by ignoring the leading sequence 905 due to its format or configuration, by ignoring a specific number of bits following the beginning of the message or the end of the header 901, or by another method.

In FIG. 10E, another method of positionally shifting a code portion of a message is shown. In FIG. 10E, a default message is shown by view "A" in which a header 910 is contiguous with a code portion 911 including a fixed or changing code sequence. Other data 912 such as a payload or other codes may also be present. In view "B" of FIG. 10E, the code portion 911 has been shifted a distance or amount L so that a leading sequence 913 is interposed between the header 910 and the code portion 911. A receiving device that expects to receive an offset code sequence as shown by view "B" in FIG. 10E will not be able to correctly read a message as in view "A" of FIG. 10E wherein the code portion 911 is not offset. However, if such a receiving device receives a message formatted as in view "B" of FIG. 10E, it will be configured to ignore a message segment having length L and properly read code portion 911. If the device is also configured to read the other data segment 912 at a position in the message relative to code portion 911, the device's ability to accurately read the other data segment 912 will be unaffected by the addition of leading sequence 913.

Figure 11:
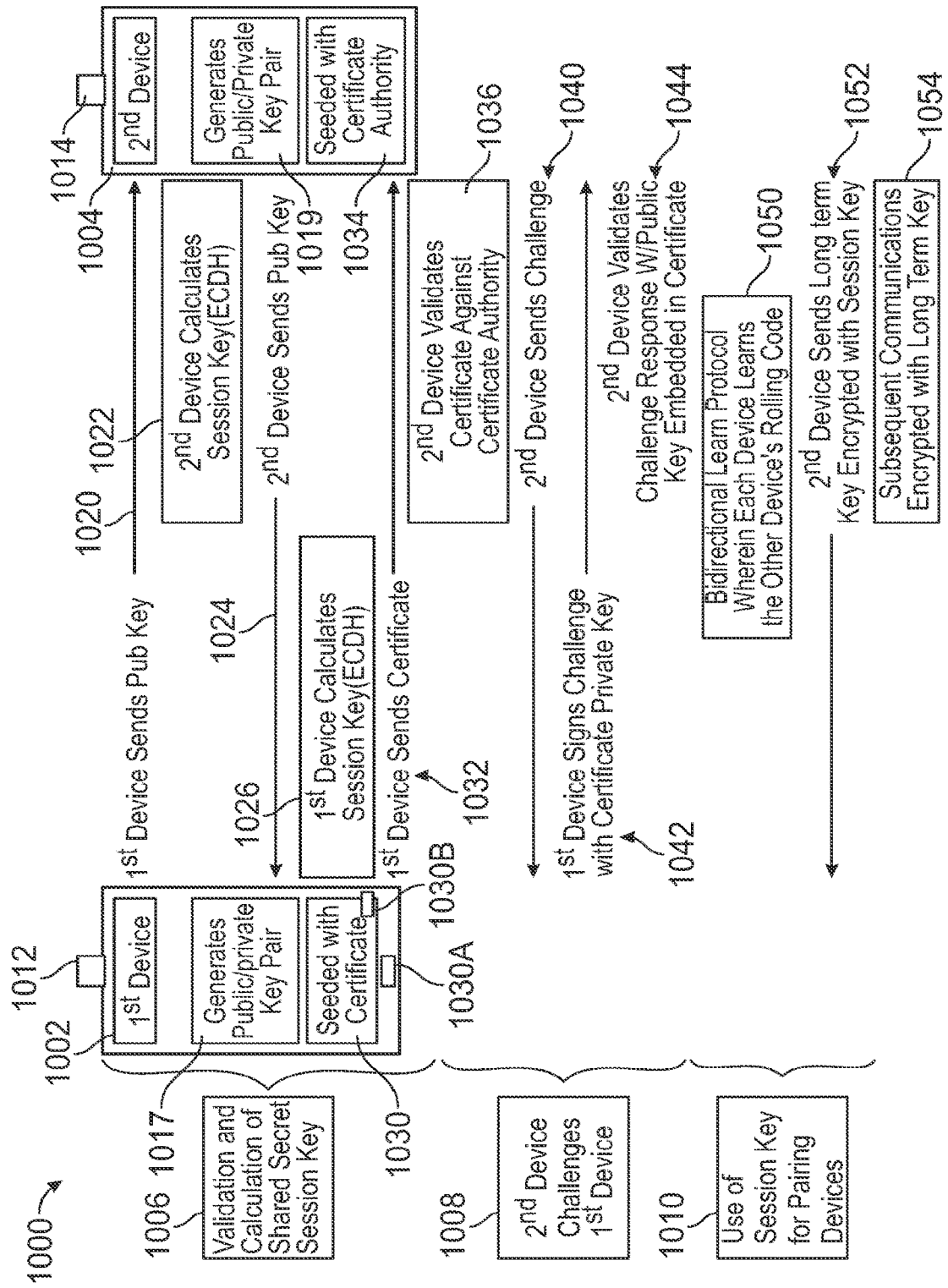
FIG. 11 is a flow diagram showing an example communication flow between a first device and a second device during a learning sequence.

Regarding FIG. 11, example communications between a first device 1002 (remote control, in-vehicle device, portable electronic device, etc.) and a second device 1004 (movable barrier operator, door lock, or other device) during a learning method 1000 are provided. The first device 1002 includes components similar to the transmitter 30 discussed above with respect to FIG. 2 and the second device 1004 includes components similar to the movable barrier operator 12 discussed above with respect to FIG. 3.

The method 1000 may be utilized when the first device 1002 and the second device 1004 communicate using a short-range wireless communication protocol such as Bluetooth®. Once the second device 1004 learns the first device 1002, the first device 1002 may communicate a command to the second device 1004 and the second device 1004 carries out a requested operation in response to the command from the first device 1002.

The method 1000 generally includes three phases: a first portion 1006 involving validation and calculation of a shared secret session key; a second portion 1008 wherein the second device 1004 challenges the first device 1002; and a third portion 1010 wherein the shared secret session key is used to complete the method 1000. In one embodiment, the method 1000 is initiated by a user providing a user input to a user interface 1012 and/or a user interface 1014. The user interfaces 1012 and 1014 may be components of the respective first and second devices 1002, 1004 or may be components of devices in communication with the first and second devices 1002, 1004 such as a vehicle infotainment system or a smartphone. Alternatively, the method 1000 begins automatically once the devices 1002, 1004 are brought into proximity with one another.

The first portion 1006 begins with the first device 1002 and the second device 1004 randomly generating 1017, 1019 retrieving, receiving, or otherwise establishing a set of paired keys—a public/private key pair. The first device 1002 communicates 1020 the public key of the first device 1002. The communication 1020 is unencrypted.

The second device 1004 receives the public key of the first device 1002 and calculates 1022 a shared secret session key using the public key of the first device 1002, the private key of the second device 1004, and an elliptic-curve cryptographic 'ECC' protocol (e.g. Elliptic Curve Diffie-Hellman).

The second device 1004 communicates 1024 the public key of the second device 1004 to the first device 1002. The first device 1002 calculates 1026 the shared secret session key using the public key of the second device 1004, the private key of the first device 1002, and the ECC protocol.

The first device 1002 is seeded with a certificate 1030. The certificate 1030 includes a public certificate key 1030B and an identifier of the first device 1002, such as a universally unique ID (UUID). The identifier of the first device 1002 is the base identifier for the first device 1002. Derived identifiers of the first device 1002 are derived from the base identifier. For example, the first device 1002 may be visor-mounted transmitter having a base identifier and each button of the transmitter has a derived identifier (such as a UUID) derived from the base identifier. The certificate 1030 may be provided in a memory of the first device 1002 by a manufacturer of the first device 1002 as one example. In another example, the first device 1002 receives the certificate via a network e.g. the internet from a remote device such as a server computer that executes or instantiates a certificate authority or server. The first device 1002 communicates 1032 the certificate 1030 to the second device 1004. The communication 1032 is encrypted using the shared secret session key calculated by the first device at operation 1026.

The second device 1004 is seeded with a certificate authority 1034. The certificate authority 1034 may be provided in a memory of the second device 1004 by the manufacturer as one example. In another example, the second device 1004 receives the certificate authority 1034 from a remote device such as from a server computer via the internet.

The second device 1004 validates 1036 the certificate 1030 of the first device 1002 against the certificate authority 1034. If the second device 1004 does not validate the certificate 1030, the method 1000 ends and the second device 1004 does not learn the first device 1002.

The second portion 1008 of the method 1000 includes the second device 1004 sending a challenge to the first device 1002, the first device 1002 responding to the challenge, and the second device 1004 validating the challenge response from the first device 1002. More specifically, if the second device 1004 validates the certificate 1030 at operation 1036, the second device 1004 generates a challenge, such as a random series of bytes, and communicates 1040 the challenge to the first device 1002. The communication 1040 is encrypted using the shared secret session key calculated by the second device 1004 at operation 1022.

The challenge sent by the second device 1004 at operation 1040 may include, for example, random data. To respond to the challenge from the second device 1004, the first device 1002 concatenates the session key with the random data and signs the output of the concatenation with the certificate private key of the first device 1002. The first device 1002 communicates 1042 the challenge response to the second device 1004. The communication 1042 is encrypted using the shared secret session key calculated by the first device 1002 at operation 1026.

The certificate private key 1030A and a certificate public key 1030B of the first device 1002 are generated by middleware (e.g., server computer 1306 shown in FIGS. 13A-C) when the middleware generates the certificate 1030 for the first device 1002. The certificate 1030 (which includes the certificate public key 1030B) and the certificate private key 1030A are seeded in the first device 1002 such as during manufacture of the first device 1002.

In one embodiment, the public/private key pairs randomly generated by the first and second devices 1002, 1004 at operations 1017 and 1019 are specifically used to facilitate calculation of the session key at operations 1022 and 1026. Once the first and second devices 1002, 1004 have determined the private session key, the first and second devices 1002, 1004 utilize the certificate 1030 (including the certificate public key 1030B) and certificate private key 1030A of the first device 1002 for subsequent operations in the method 1000. In some embodiments, the second device 1004 may have a certificate, which includes a certificate public key, and a certificate private key. The first and second devices 1004 learning method may alternatively or additionally involve the first device 1002 authenticating the certificate, certificate public key, and certificate private key of the second device 1004.

The second device 1004 validates 1044 the challenge response, such as using an elliptic curve digital signature algorithm verification operation in conjunction with the public key 1030B of the certificate 1030 of the first device 1402, the random data sent as a challenge 1040 to the first device 1402, and the session key.

The first and second devices 1002, 1004 each have a fixed code (which may be an ID of the device) and a changing code such as a rolling code. The rolling code of each of the first and second devices 1002, 1004 changes with every radio frequency transmission from the device.

Once the second device 1004 validates 1044 the challenge response from the first device 1002, the third portion 1010 of the method 1000 is performed. As shown, the third portion 1010 starts with the bidirectional learn protocol 1050 wherein each device 1002, 1004 learns the other device's fixed code and rolling code. The bidirectional learn protocol 1050 involves the method discussed above with respect to FIGS. 5A-5C, although the method discussed above in FIGS. 4A-4C may be utilized in some applications. The communications between the first and second devices 1002, 1004 during the bidirectional learn protocol 1050 are encrypted using the shared secret session key calculated at operations 1022, 1026.

At the end of the bidirectional learn protocol 1050, the second device 1004 transmits 1052 a new long-term key encrypted using the shared secret session key. The first device 1002 stores the long-term key. The second device 1004 has learned the first device 1002 and the first and second devices 1002, 1004 are now paired. The first and second devices 1002, 1004 use the long-term key to encrypt and decrypt subsequent communications 1054 between the first and second devices 1002, 1004 when the first device 1002 is used to trigger operation of the second device 1004.

Figure 12:
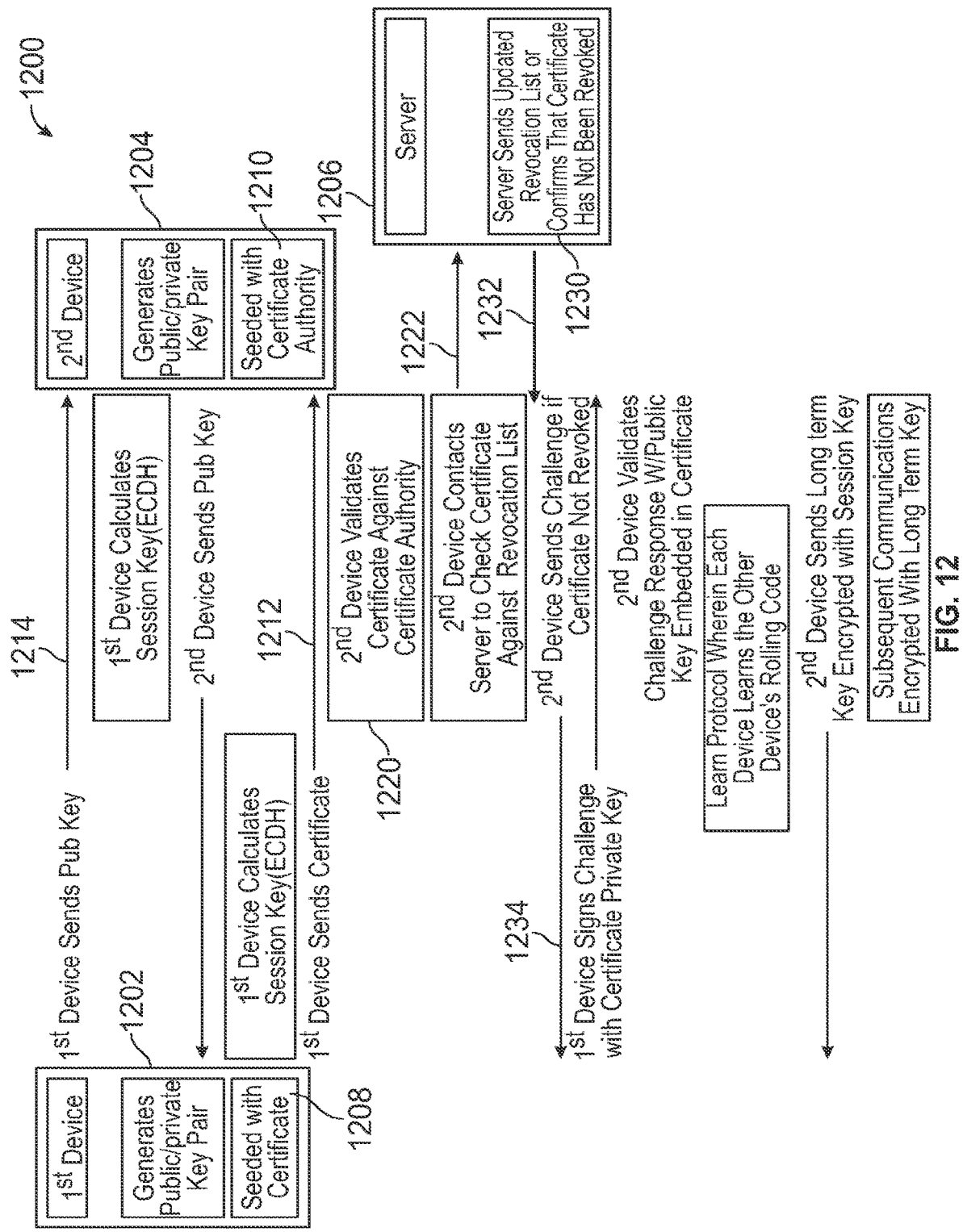
FIG. 12 is a flow diagram of an example communication flow between a first device and a second device.

Turning to FIG. 12, example communications between a first device 1202 and a second device 1204 during a learning method 1200 are provided. The method 1200 is similar to the method 1000 discussed above such that differences will be highlighted. One difference between the methods 1000, 1200 is that the second device 1204 communicates with a server 1206 to validate a certificate 1208 of the first device 1202.

More specifically, the second device 1204 is seeded with a certificate authority 1210. After the operations 1214 including the public key exchange and the calculation of the shared secret session key, the first device 1202 communicates 1212 the certificate 1208 to the second device 1204. The second device 1204 validates 1220 the certificate 1208 against the certificate authority 1210. Alternatively or additionally, the second device 1204 communicates 1222 with the server 1206 to check the certificate 1208 against a revocation list. The server 1206 performs an operation 1230 wherein the server 1206 checks for an updated or current revocation list or confirms that the certificate 1208 has not been revoked. The server 1206 then communicates 1232 the updated revocation list or an indication of whether the certificate 1208 has been revoked. The second device 1202 determines whether the certificate 1208 has been revoked based on the communication 1232 from the server 1206. If the certificate 1208 has not been revoked, the second device 1204 sends 1234 a challenge to the first device 1202 and the method proceeds in a manner similar to the challenge 1042, challenge response 1044, and learning communications 1050-1054 of the method 1000.

The second device 1204 may be seeded with the certificate authority 1210. The certificate authority 1210 includes a revocation list which is current as of the manufacture of the second device 1204. If the second device 1204 is unable to connect to the server 1206, such as due to a network outage, the second device 1204 may detect the connection issue and may perform operation 1220 locally with the seeded revocation list. If the certificate 1208 of the first device 1202 is not on the seeded revocation list, the second device 1204 communicates 1234 the challenge to the first device 1202.

Figure 13A:
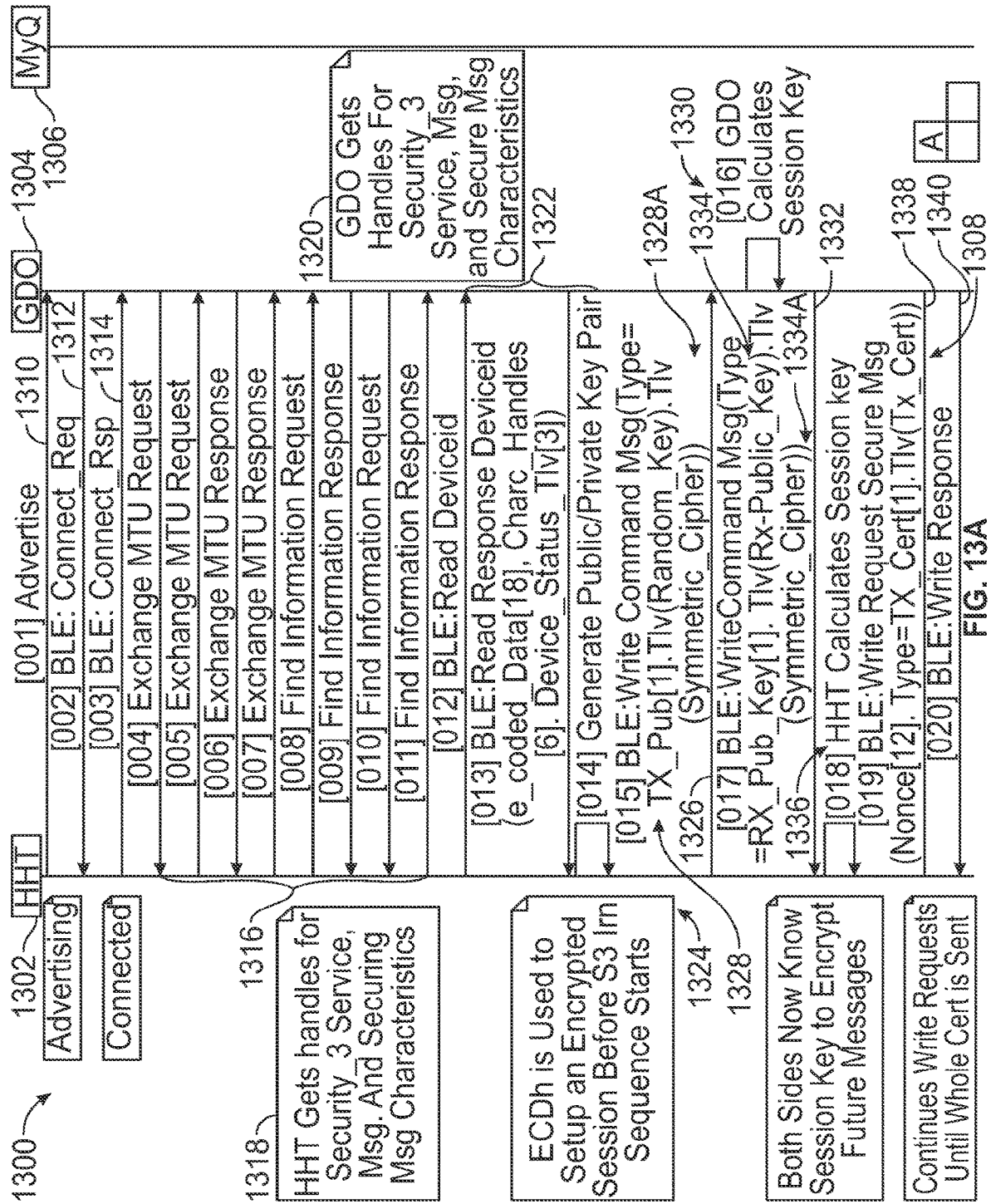
FIGS. 13A-C are flow diagrams showing an example communication flow between a first device and a second device.
Figure 13B:
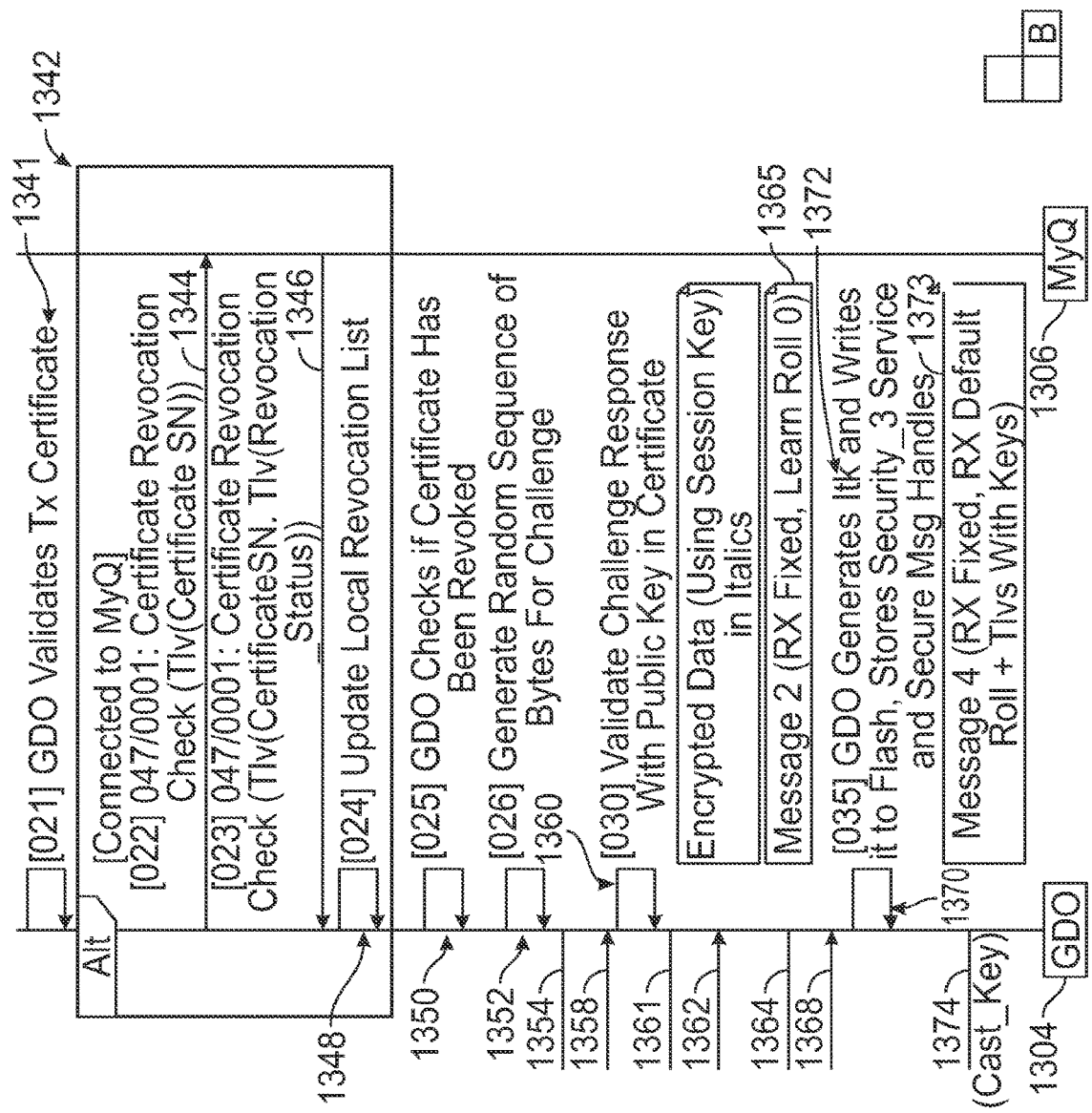
Figure 13C:
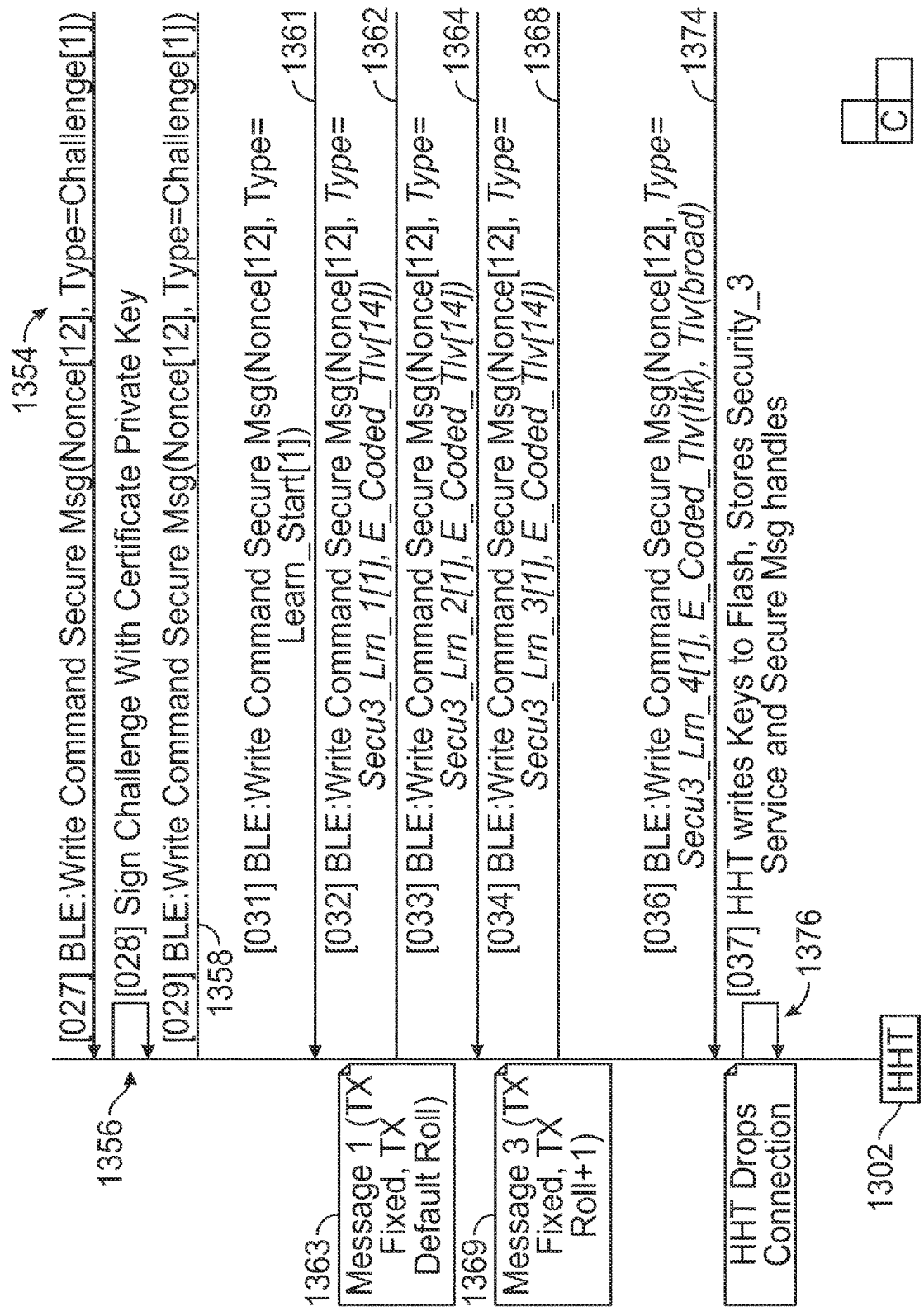
Figure 14A:
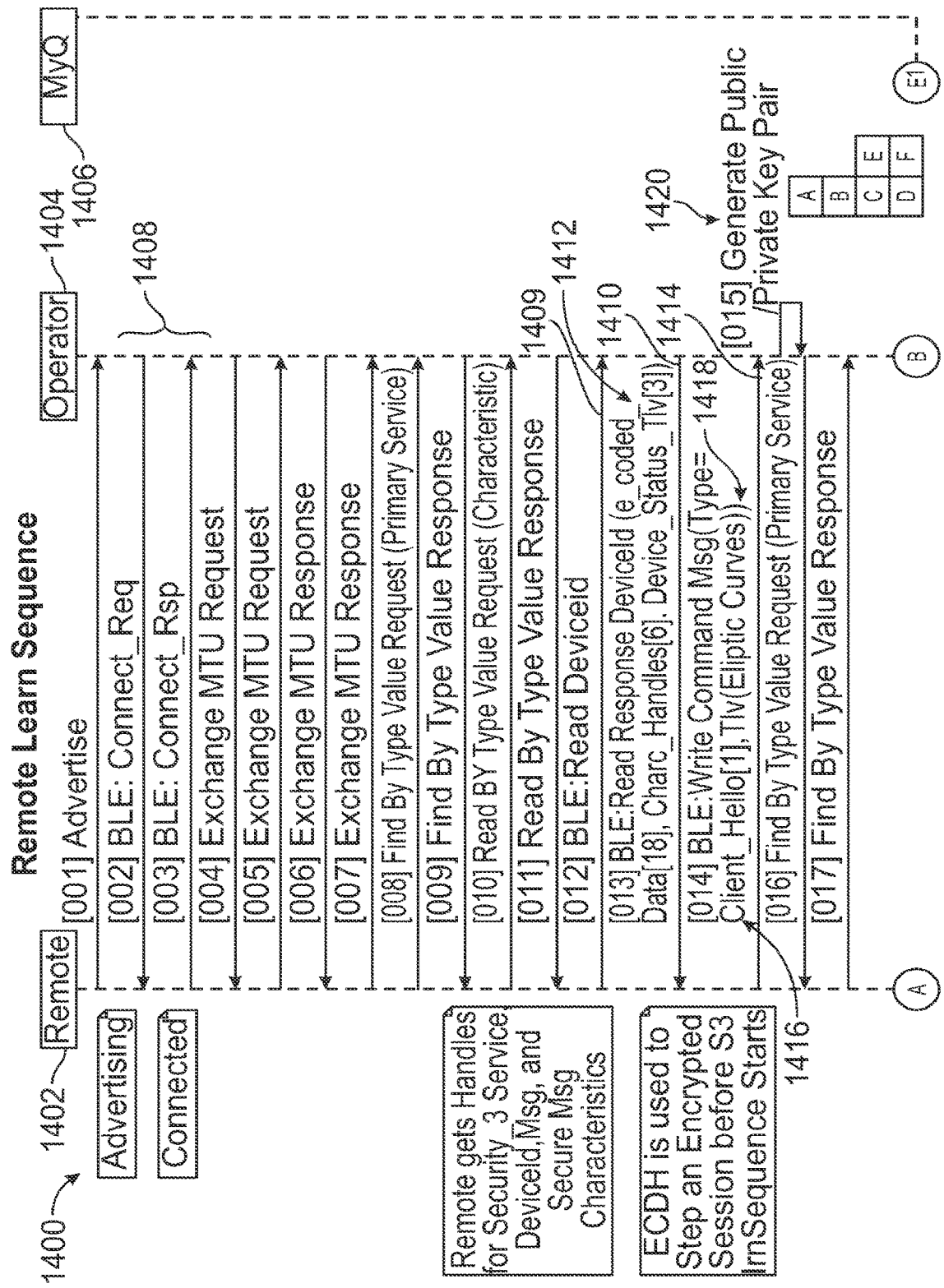
FIGS. 14A-F are flow diagrams showing an example communication flow between a first device and a second device.
Figure 14B:
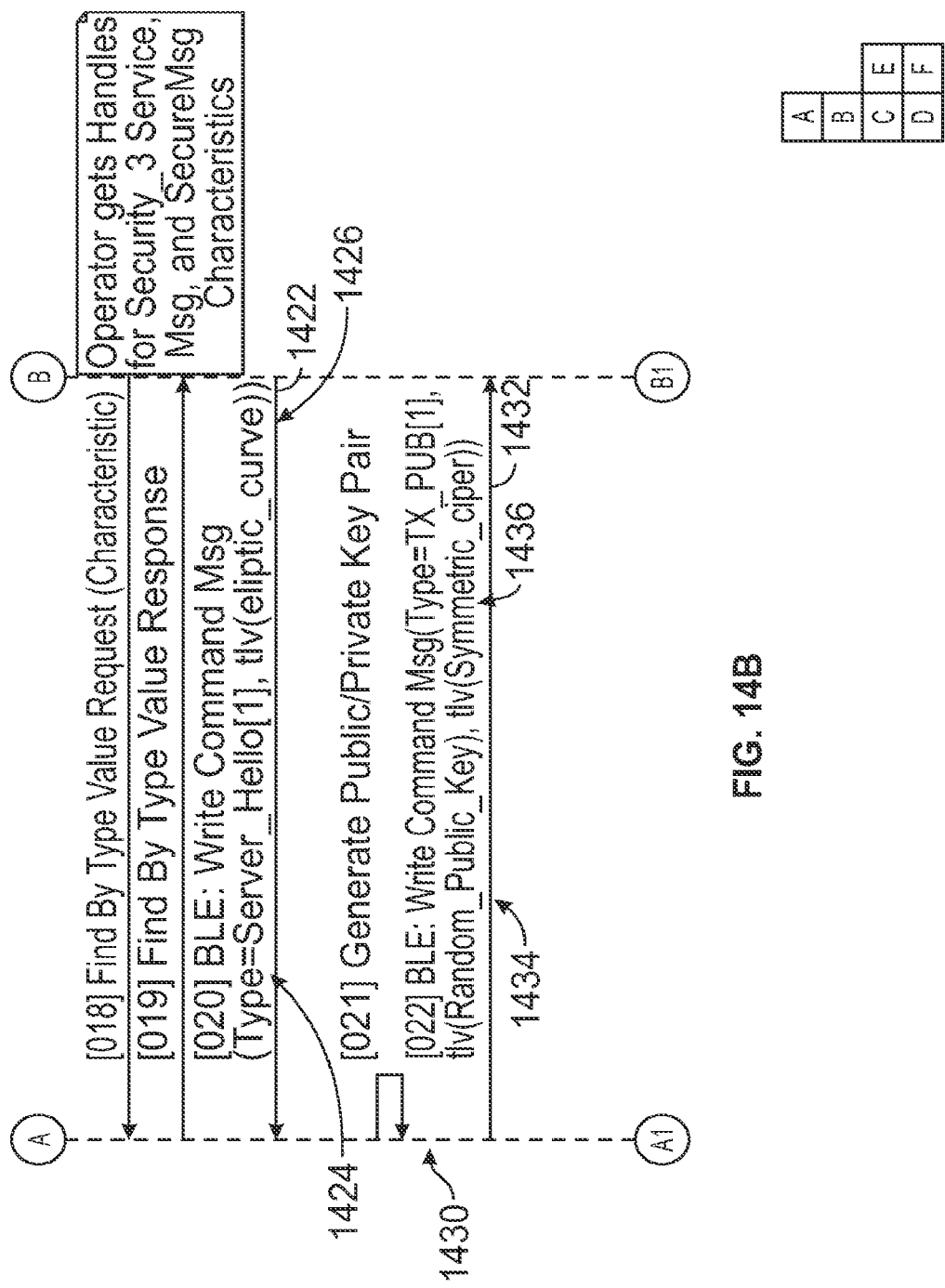
Figure 14C:
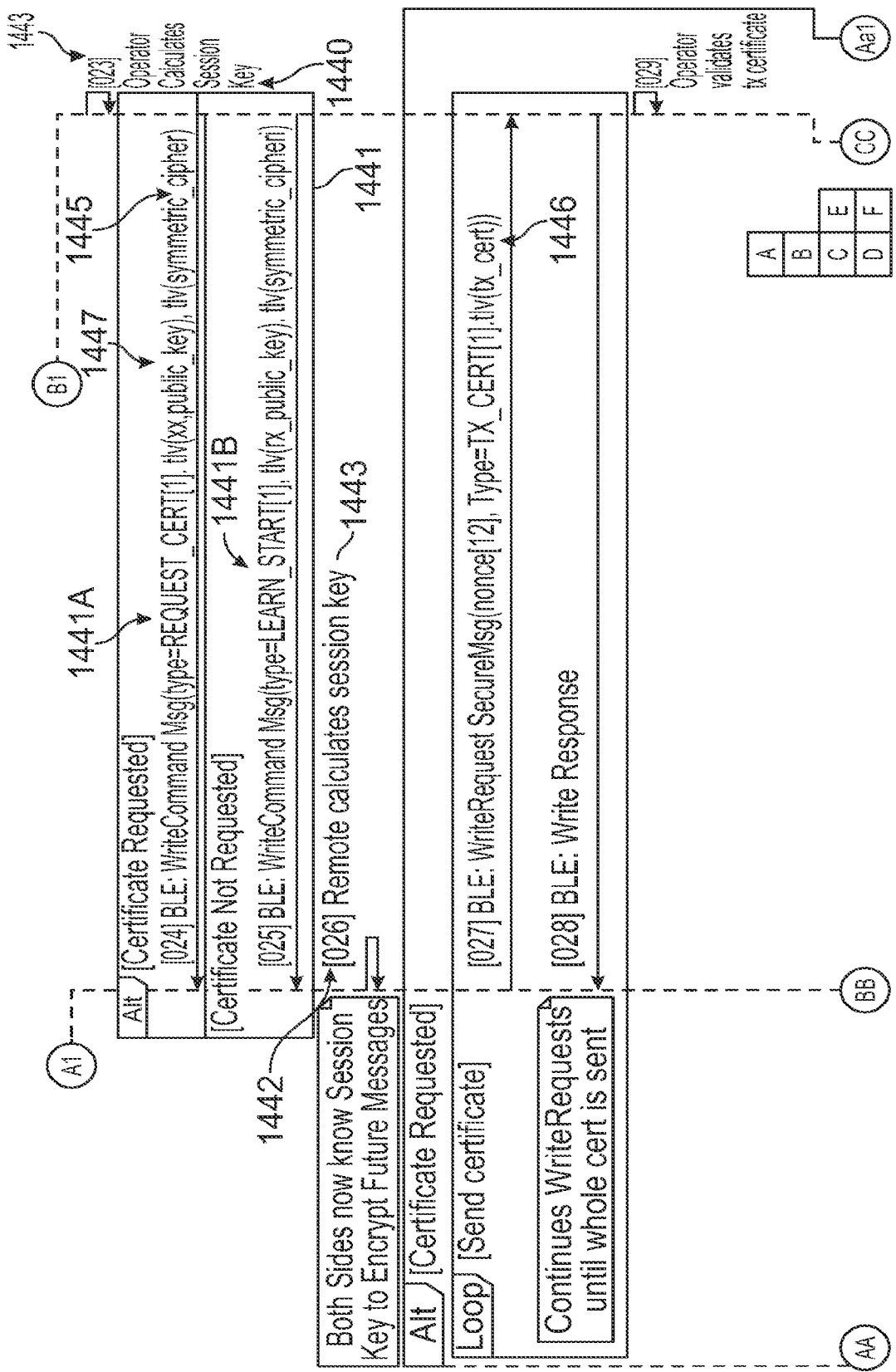
Figure 14D:
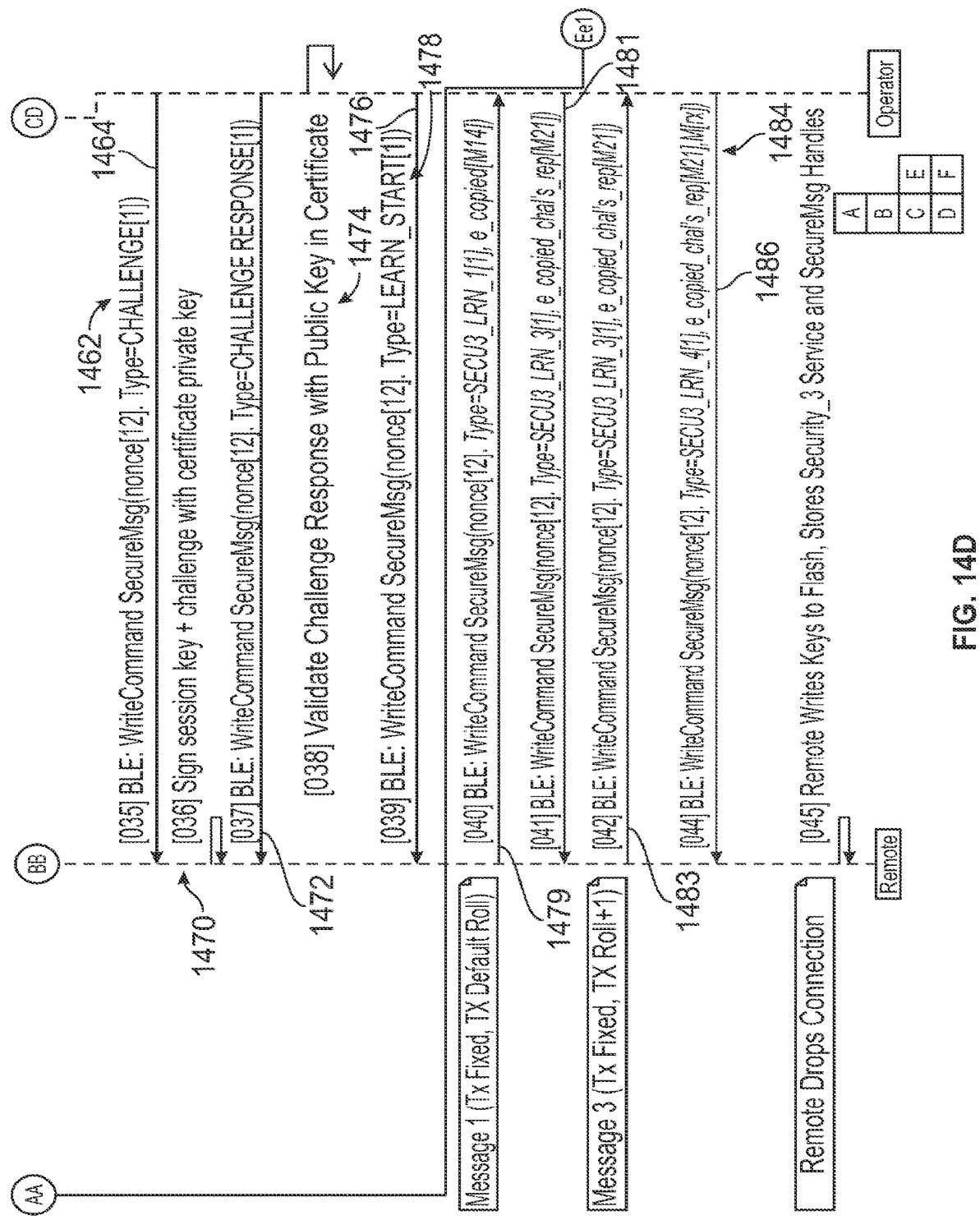
Figure 14E:
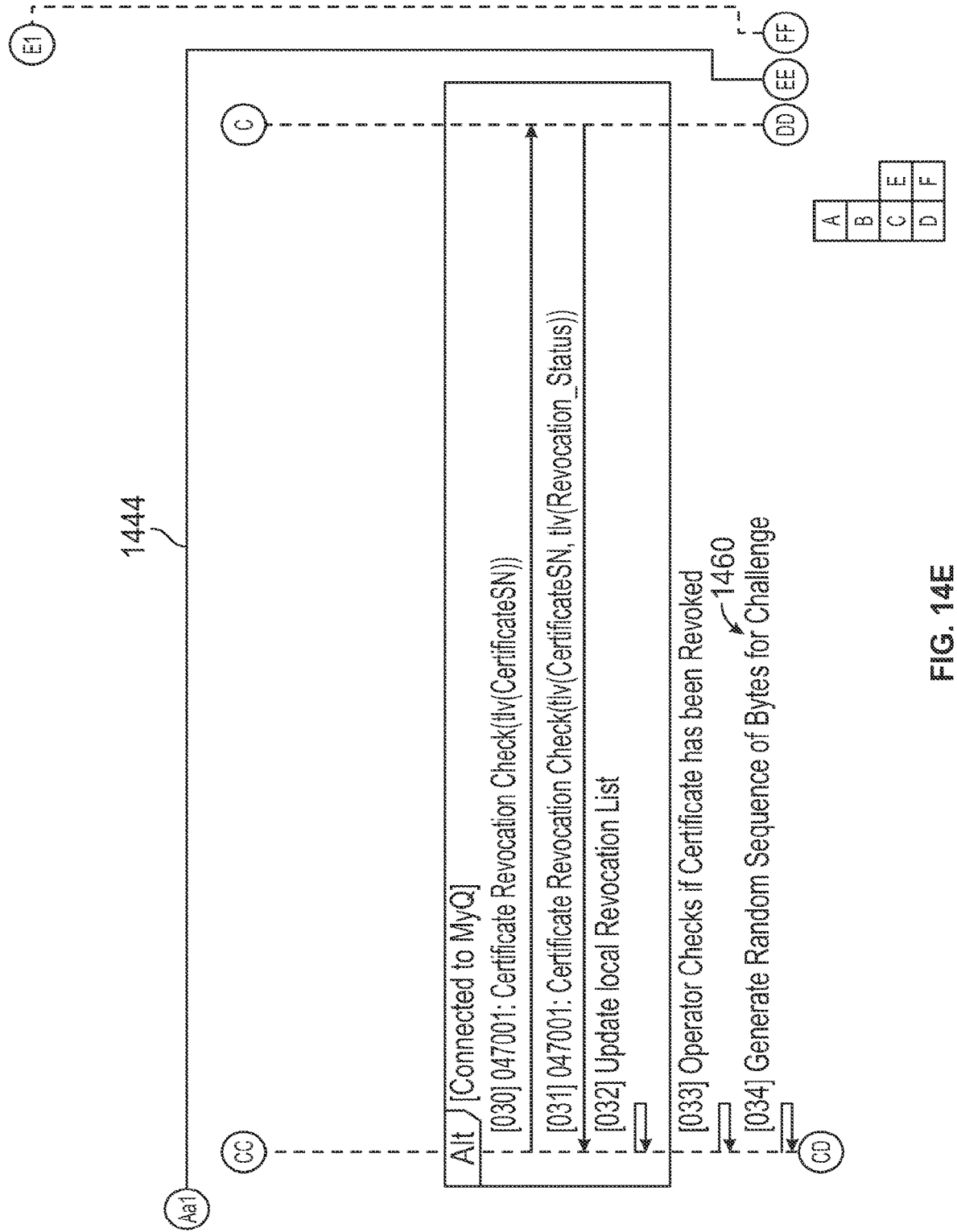
Figure 14F:
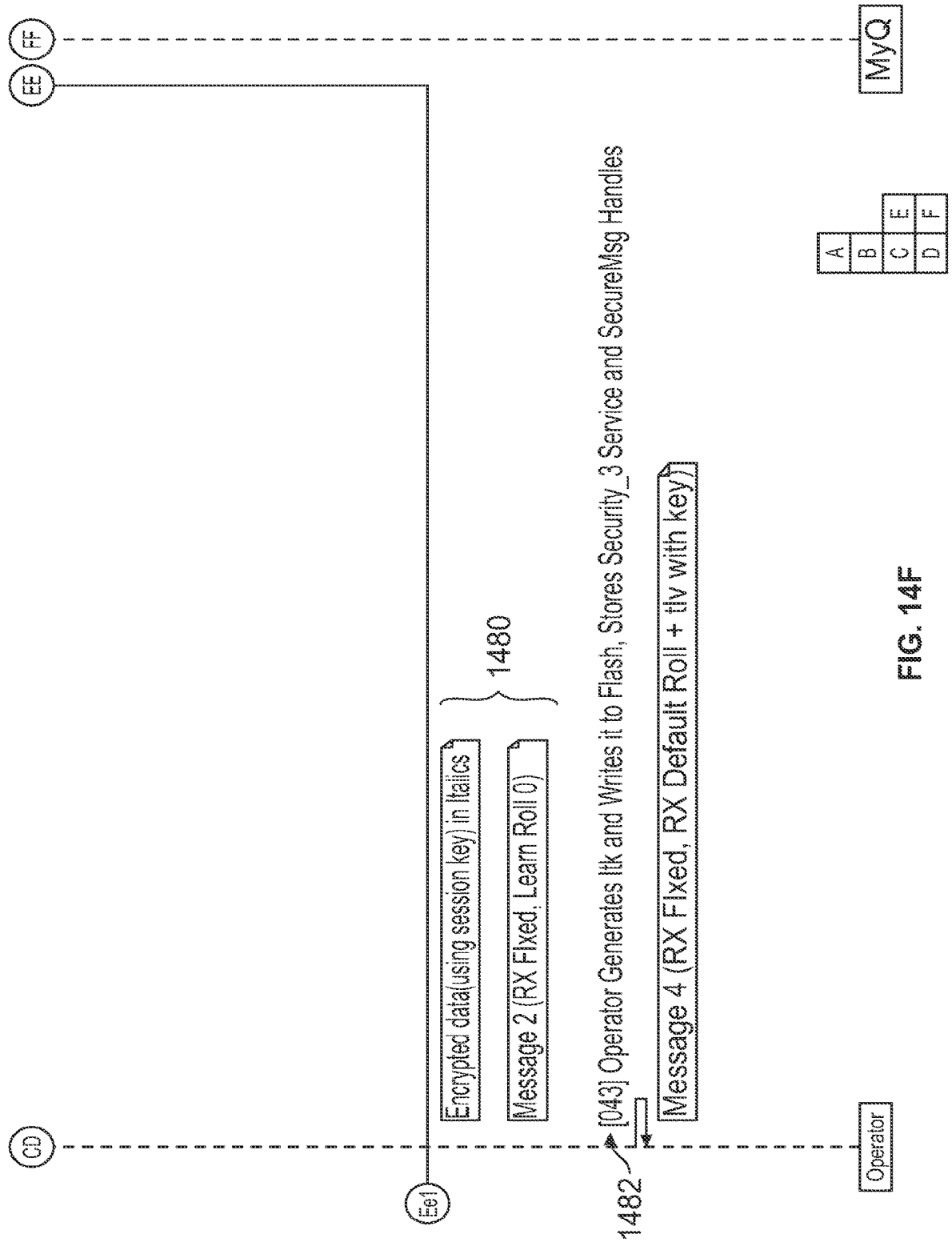

With reference to FIGS. 13A-13C, example communications between a first device 1302, such as a hand-held transmitter 'HHT' or an in-vehicle transmitter, and a second device 1304 such as a garage door operator 'GDO' or another type of movable barrier operator, during a learning method 1300 is provided. The method 1300 is similar in many respects to the methods 1000, 1200 discussed above. Like the method 1200, the method 1300 includes the second device 1304 communicating with a remote computer, such as a server computer 1306 to determine whether a certificate 1308 of the first device 1302 has been revoked. The method 1300 includes communications between the first and second devices 1302, 1304 using a wireless communication protocol such as Bluetooth®. The second device 1304 communicates with the server computer 1306 via one or more networks, such as a local Wi-Fi® network and the internet.

The method 1300 begins with the first device 1302 transmitting 1310 an advertising signal. The second device 1304 responds with a Bluetooth Low Energy (BLE) connection request 1312. The first device 1306 sends a connection response 1314 which creates an initial Bluetooth connection and/or session between the first and second devices 1302, 1304.

The first and second devices 1302, 1304 next engage in a series of communications 1316 wherein the first and second devices 1302, 1304 exchange maximum transmission units (MTUs) and other information to facilitate subsequent communications between the first and second devices 1302, 1304. The communications 1316 result in the first device 1302 determining 1318 handles for the message and secure message characteristics used to communicate during the bidirectional learning process (see method of FIGS. 5A-5C). The handles are used as identifiers for the message and secure message characteristics. Similarly, the communications 1316 result in the second device 1304 determining 1320 corresponding handles for the message and secure message characteristics used to communicate during the bidirectional learning process.

Next, communications 1322 include the first device 1302 sending its Device ID to the second device 1304 and the second device 1304 providing its Device ID to the first device 1302. The Device ID message from the second device 1304 to the first device 1302 includes a status of the second device 1304, such as whether the second device 1304 is in a learn mode or an operational mode.

Next, the first device 1302 generates 1324 a random public/private key pair. The first device 1302 communicates 1326 a public key 1328 and a cryptographic algorithm identifier 1328A to the second device 1304. The cryptographic algorithm identifier 1328A specifies a requested cryptographic algorithm for use during the learning process. The communication 1326 is unencrypted.

The second device 1304 calculates 1330 a shared secret session key using the private key of the second device 1328, the public key 1328 received from the first device 1302, and an elliptic-curve cryptographic 'ECC' (e.g. elliptic-curve Diffie-Hellman) protocol. The second device 1304 communicates 1332 a public key 1334 of the second device 1304 and a cryptographic algorithm identifier 1334A selected by the second device 1304. The first device 1302 then calculates 1336 the shared secret session key using the private key of the first device 1302, the public key 1334 of the second device 1304, and the ECC protocol. At this juncture, both the first device 1302 and the second device 1304 know the shared secret session key. Communications between the first and second devices 1302, 1304 after operation 1336 in method 1330 are encrypted and decrypted using the shared secret session key.

Next, the first device 1302 communicates 1338 the certificate 1308 of the first device 1302. The second device 1304 sends a response 1340 indicative of the communication 1338 received such that the first device 1302 may continue to send communications until the entire certificate 1308 has been received by the second device 1304.

Once the second device 1304 has received the entire certificate 1308, the second device 1304 validates 1341 the certificate 1308 as shown in FIG. 13B. In one embodiment, the method 1300 includes a server validation process 1342 which includes the second device 1304 requesting 1344 the server computer 1306 check the status of the certificate 1308. The server computer 1306 responds 1346 with data indicative of whether the certificate 1308 has been revoked. In one example, the server computer 1306 compares the certificate 1308 to a list of revoked certificates and the response 1346 informs the first device 1302 that the certificate 1308 has been revoked. The second device 1304 may proceed to operation 1352.

In another example, the server computer 1306 provides data representative of revoked certificates in the communication 1346, such as a list of revoked certificates, and the first device 1302 determines whether the certificate 1308 has been revoked. The second device 1304 updates 1348 locally-stored data representative of revoked certificates, such as a local list of revoked certificates. Using the updated local list of revoked certificates, the second device 1304 determines 1350 whether the certificate 1308 has been revoked. If the certificate 1308 has been revoked, the method 1300 ends and the second device 1304 does not learn the first device 1302.

The second device 1304 may be seeded with a certification revocation list upon manufacture of the second device 1304. If the second device 1304 is unable to connect to the server 1306, such as due to a network issue during the learning process, the second device 1304 performs operation 1350 using the local certificate revocation list.

If the certificate 1308 has not been revoked, the second device 1304 generates 1352 a challenge such as a random series of bytes and communicates 1354 the challenge to the first device 1302. Regarding FIG. 13C, the first device 1302 generates 1356 a challenge response. The generating 1356 operation includes the first device 1302 concatenating the session key calculated at operation 1336 with the random bytes from the second device 1304, and the first device 1302 signing the output of the concatenation with a private certificate key of the first device 1302. The first device 1302 communicates 1358 a challenge response including the signed challenge to the second device 1304.

Referring to FIG. 13B, the second device 1304 validates 1360 the challenge response such as using an elliptic curve digital signature algorithm (ECDSA) verification operation. For example, the validation 1360 includes the second device 1304 using a ECDSA verification in conjunction with a certificate public key in the certificate 1308, the random data sent to the first device 1302 in operation 1354, the challenge response received from the first device 1302 in operation 1358, and the session key. If the second device 1304 is unable to validate the challenge response, the method 1300 ends.

If the second device 1304 is able to validate the challenge response, the second device 1304 communicates 1361 a request to start the bidirectional learning process of FIGS. 5A-5C. Regarding FIGS. 13B and 13C, the first device 1302 communicates 1362 a first message 1363 including a fixed code and a rolling code of the first device 1302. The second device 1304 receives the first message 1363 and stores the fixed code and rolling code of the first device 1302 in a memory of the second device 1304.

The second device 1304 communicates 1364 a second message 1365 including a fixed code and a rolling code of the second device 1304. In one embodiment, the rolling code of the second device 1304 may be a rolling code associated with the learning process. The first device 1302 stores the fixed code and the rolling code of the second device 1304 in a memory of the first device 1302.

The first device 1302 communicates 1368 a third message 1369 including the fixed code of the first device 1302 and a changed rolling code. The changed rolling code is changed according to the rolling code algorithm.

The second device 1304 validates the third message 1369 from the first device 1302. Specifically, the second device 1304 determines whether the changed rolling code received in the third message 1369 is the code the second device 1304 expects based on the rolling code from the first device 1302 in the first message 1363. If the second device 1304 is unable to validate the third message 1369 from the first device 1302, the method 1300 ends and the second device 1304 does not learn the first device 1302.

If the second device 1304 validates the third message 1369 from the first device 1302, the second device 1304 performs operations 1370 including generating a long-term key 1372 ("ltk" in FIGS. 13B and 13C), storing the long-term key 1372 in the memory of the second device 1304, and storing the fixed and rolling code values of the first device 1302 in the memory of the second device 1304.

The second device 1304 then communicates 1374 a fourth message 1373 to the first device 1302. The fourth message 1373 includes the fixed code and the rolling code of the second device 1304 as well as the long-term key 1372 generated by the second device 1304.

The first device 1302 performs operations 1376 including storing the long-term key 1372 and the fixed and rolling codes of the second device 1304 in a memory of the first device 1302. The first device 1302 then drops the connection with the second device 1304.

After operation 1376, the first and second devices 1302, 1304 have completed the learning process. The first and second devices 1302, 1304 each utilize the long-term key 1372 to encrypt and decrypt subsequent communications between the first and second devices 1302, 1304.

With reference to FIGS. 14A-F, example communications between a first device 1402, such as a transmitter, and a second device 1404, such as a movable barrier operator, during a learning method 1400 are provided. FIGS. 14A-F include a key in each figure showing the position of the figure relative to the other figures. The method 1400 is similar in many respects to the method 1300 discussed above and includes communications with a remote computer such as a server computer 1406. The method 1400 utilizes asymmetric key cryptography to encrypt the learning process between the first device 1402 and second device 1404. The asymmetric key cryptography includes the first and second devices 1402, 1404 each generating a random public/private key pair and calculating a temporary shared secret session key. The session key is used during an authentication procedure of the method 1400 wherein the second device 1404 authenticates the first device 1402. The session key is also used during a learning procedure of the method 1400 wherein the second device 1404 learns the fixed code and changing code of the first device 1402. Once the second device 1404 has learned the first device 1402, the second device 1404 calculates and communicates a long-term key 1484 to the first device 1402. The long-term key 1484 is used for subsequent communications between the first and second devices 1402, 1404, such as when the first device 1402 communicates a state change request to the second device 1404.

The method 1400 includes establishing 1408 a Bluetooth Low Energy (BLE) connection between the first device 1402 and the second device 1404. The first device 1402 communicates 1409 a Device ID of the first device 1402 to the second device 1404. The second device 1404 communicates 1410 a message including a Device ID of the second device 1404 and a device status 1412 of the second device 1404 to the first device 1402. The first device 1402 reads the device status 1412 to determine if the second device 1404 is in a learn mode. If the second device 1404 is in the learn mode, the first device 1402 communicates 1414 a message including a client hello message 1416 and an indication 1418 of the public/private key algorithm the first device 1402 supports, such as an indication of the elliptic curves the first device 1402 supports for an elliptical curve Diffie-Hellman (ECDH) algorithm.

The second device 1404 utilizes the indication 1418 to select the elliptic curve Diffie-Hellman algorithm to be used in the learning process and generates 1420 a random public/private key pair. The second device 1404 communicates 1422 a message including a server hello message 1424 and an indication 1426 of the elliptic curve that the second device 1404 selected.

The first device 1402 generates 1430 a public/private key pair using the elliptic curve selected by the second device 1404. The first device 1402 communicates 1432 the public key 1434 and a list 1436 of ciphers the first device 1402 will support.

The ECDH algorithm is used by both the first device 1402 and the second device 1404 to securely generate a temporary shared secret session key. The second device 1404 calculates the session key using the generated public key of the second device 1404, the generated private key of the second device 1404, the public key of the first device 1402, and the list 1436 of ciphers supported by the first device 1402. The second device 1404 selects one of the ciphers from the list 1436.

The second device 1404 sends a communication 1441 including the public key 1447 of the second device 1404 and an indication 1445 of the symmetric cipher the second device 1404 has selected from the list 1436 of ciphers from the first device 1402.

The communication 1441 includes a certificate request message 1441A to initiate the certificate verification process. In some situations, the second device 1404 may not authenticate the certificate of the first device 1402 and instead sends a learn start message 1441B. The learn start message 1441B causes the first device 1402 to initiate a learning mode sequence 1480.

The first device 1402 calculates 1442 the session key using the generated public key of the first device 1402, the generated secret key of the first device 1402, the public key 1447 of the second device 1404, and the indication 1445 of the selected symmetric cipher.

Using a random public/private pair allows for a session key 1443 to be calculated at operations 1440, 1442 that is unique even if the second device 1404 is learning a first device 1402 from which the second device 1404 has previously received communications. In one embodiment, the session key 1443 is calculated at operations 1440, 1442 via a SHA-256 function.

The method 1400 includes an authentication operation 1444 wherein the first device 1402 communicates a certificate 1446 to the second device 1404 and the second device 1404 validates certificate 1446 including comparing the certificate 1446 to a list of revoked certificates in a manner similar to the method 1300 discussed above.

The authentication operation 1444 further includes the second device 1404 generating 1460 a challenge 1462, such as random data, and communicates 1464 the challenge 1462 to the first device 1402.

The first transmitter 1402 has a certificate private key and a certificate public key that are generated by middleware (e.g., server computer 1406) when the middleware generates the certificate 1446 for the first transmitter 1402. The certificate 1446, which includes the certificate public key, and the certificate private key are seeded in the first device 1402 such as during manufacture of the first device 1402.

To respond to the challenge from the second device 1404, the first device 1402 concatenates the session key with the random data and signs 1470 the output of the concatenation with the certificate private key of the first device 1402. The first device 1402 communicates 1472 the challenge response to the movable barrier operator 20.

The second device 1404 validates 1474 the challenge response. In one approach, the validation 1474 includes the second device 1404 utilizing an elliptic curve digital signature algorithm (ECDSA) verification operation in conjunction with the public key in the certificate 1446 that the second device 1404 previously received from the first device 1404, the challenge data the second device 1404 sent to the first device 1402, and the session key.

The challenge-response procedure permits the second device 1404 to prove to itself that there is not a malicious actor intercepting communications between the first and second devices 1402, 1404. Specifically, the second device 1404 determines the first device 1402 is the owner of the certificate 1446 the second device 1404 received. Proving ownership of the certificate 1446 is accomplished by performing an operation that proves the first device 1402 has the private key associated with the certificate 1446 the second device 1404 received. The operation includes having the first device 1402 sign the session key concatenated with the random data of the challenge from the second device 1404 and the first device 1402 sending the output of the signing operation back to the second device 1404. If there was a malicious actor intercepting communications between the first and second devices 1402, 1404, there would be two session keys. The first session key would between the first device 1402 and the malicious actor and the second session key would be between the second device 1404 and the malicious actor. The two session keys would be different since the session keys are calculated based on the public/private key pairs randomly generated by the devices. Because the session key is calculated by each side and not sent over the air, the first device 1402 will not know the second session key and the second device 1404 will not know the first session key. Therefore, even if the malicious actor forwarded the challenge request from the second device 1404 to the first device 1402, the first device 1402 would send a challenge response different than the challenge response expected by the second device 1404 and the validation 1474 would be unsuccessful. More specifically, the first device 1402 would send a challenge response signed using the first session key while the second device 1404 is expecting a challenge key signed using the second session key.

If the validation 1474 is successful, the second device 1404 communicates 1476 a learn start message 1478 to cause the first device 1402 to initiate the learning message sequence 1480.

The learning message sequence 1480 includes bidirectional communications similar to the operations 1362, 1364, 1368 discussed above with respect to FIG. 13C. In one embodiment, the first transmitter 1402 sends a communication 1479 including a fixed code and a rolling code. The second device 1404 responds by sending a communication 1481 including a fixed code and a rolling code of the second device 1404. The rolling code in the communication 1481 has a value of zero to indicate that the second device 1404 is in a learning mode.

The first device 1402 sends a communication 1483 including the fixed code and a rolling code that has been incremented from the rolling code sent by the first device 1402 in communication 1479.

At operation 1482, the second device 1404 confirms that the incremented rolling code received in communication 1483 are the expected values based on the rolling code algorithm utilized by both the first device 1402 and the second device 1404. If the learning message sequence 1480 is successful, the second device 1404 generates a long-term key 1484 at operation 1482.

The second device 1404 communicates 1486 the long-term key 1484 to the first device 1402. The first and second devices 1402, 1404 thereafter utilize the long-term key 1484 to encrypt and decrypt communications between the first and second devices 1402, 1404.

With reference to FIGS. 15-19, once the second device 1404 has learned the first device 1402, the second device 1404 enters an operational mode wherein the second device 1404 performs an action in response to a command from the first device 1404. Examples of the actions include moving a barrier, locking or unlocking a door, turning a light on/off, etc. The first and second devices 1402, 1404 may configured to perform other operations upon the second device 1404 learning the first device 1402. Various operations are provided in the methods 1500, 1600, 1700, 1800, 1900, 2000 discussed below. The methods 1500-2000 are discussed below with respect to first device 1402 and second device 1404, but may be performed with any of the first and second devices discussed above.

Once the second device 1404 has learned the first device 1402, any command from one of the first and second devices 1402, 1404 to the other of the first and second devices 1402, 1404 involves a communication session constituted by a sequence of bidirectional communication messages. Further, the bidirectional communication message sequence is encrypted using the long-term key 1484 calculated by the second device 1404 and provided to the first device 1402 in communication 1486.

Figure 15A:
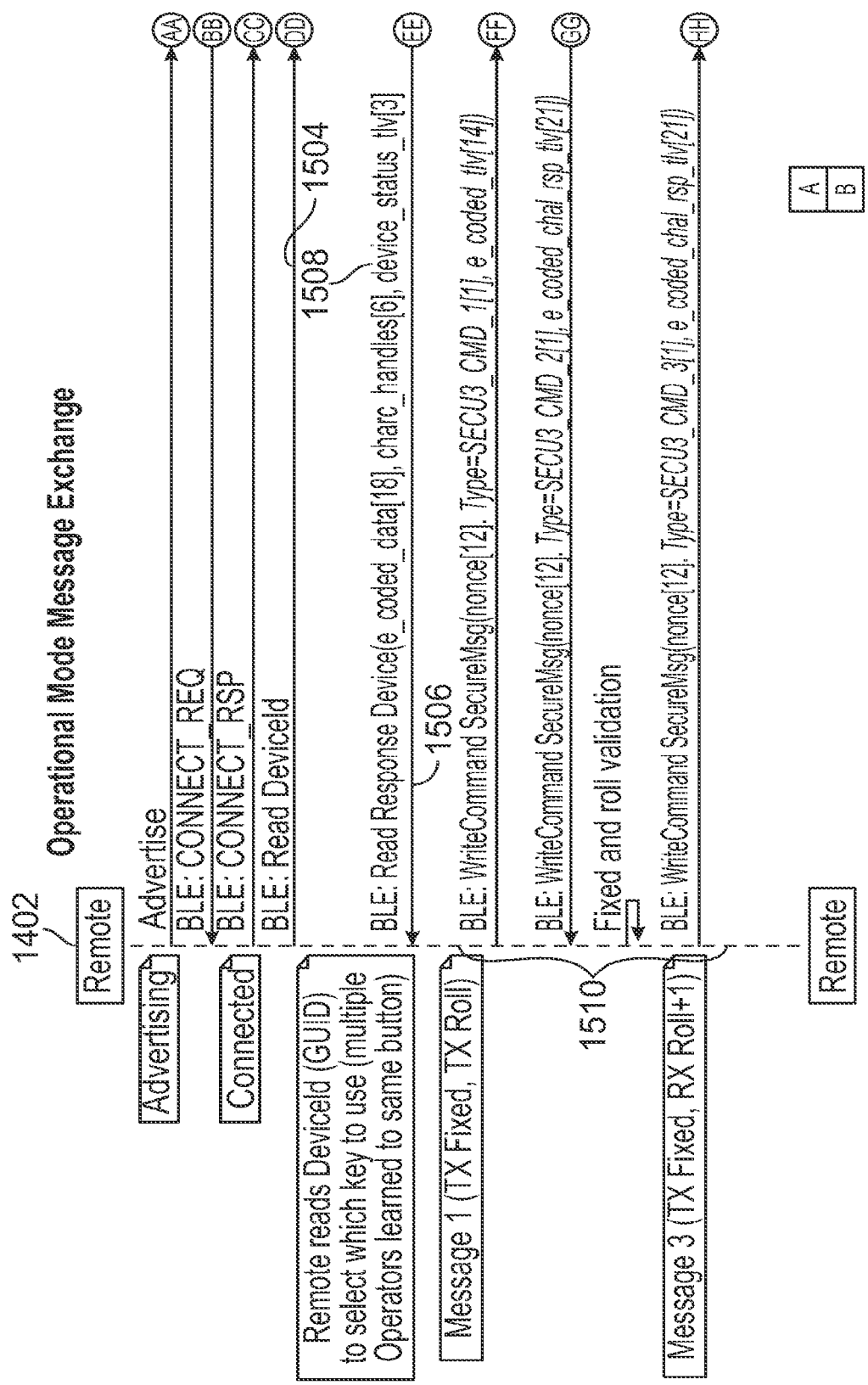
FIGS. 15A-B are flow diagrams of a method of a first device requesting the second device perform an action when the second device is in an operational mode.
Figure 15B:
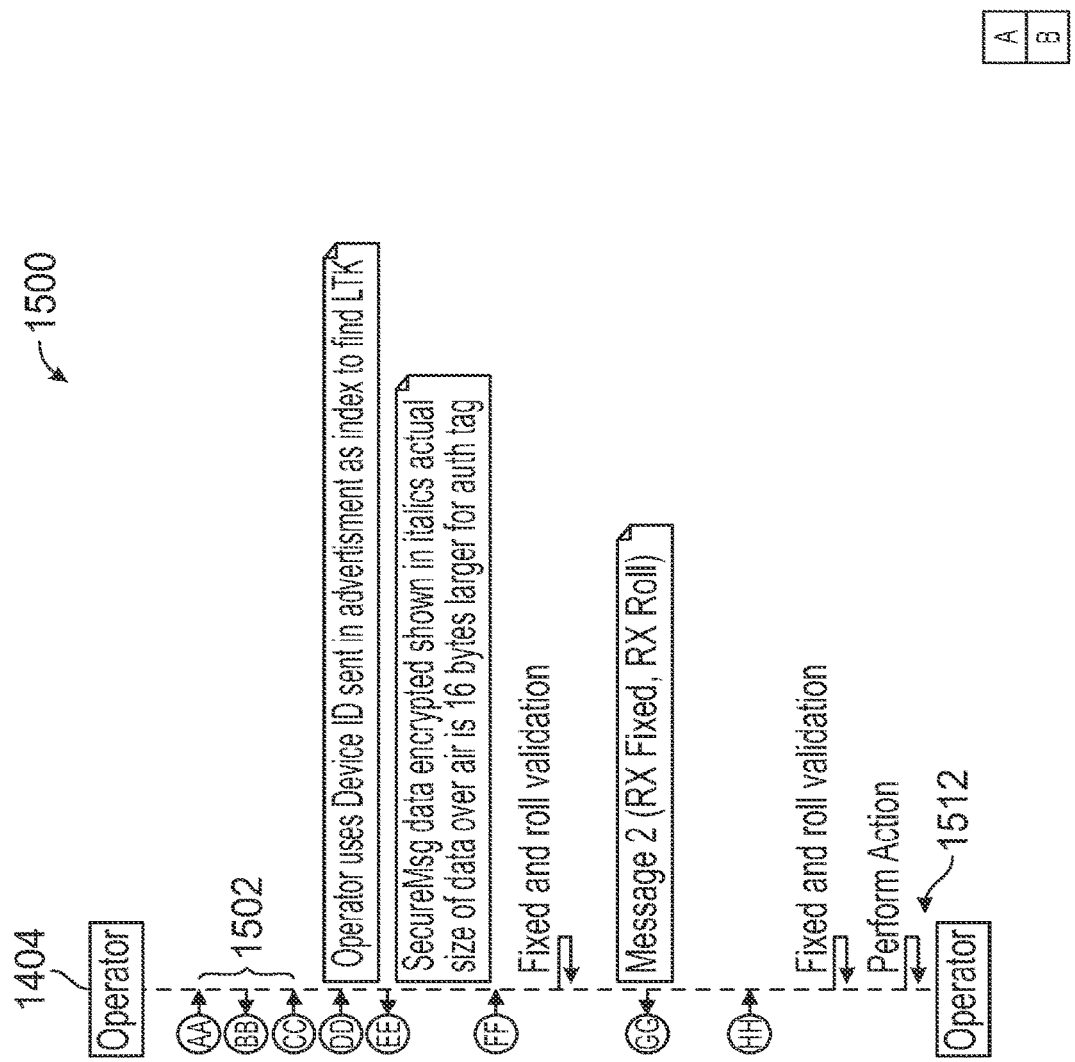

With reference to FIGS. 15A-B, the method 1500 facilitates the first device 1402 causing the second device 1402 to perform an action, such as changing a state (e.g., open/closed) of a movable barrier. The method 1500 includes an initial connection operation 1502 wherein the first device 1402 advertises, the second device 1404 requests a connection, and the first device 1402 responds by accepting the connection request. The second device 1404 uses an identifier (Device ID) in the advertisement from the first device 1402 to determine the long-term key associated with the first device 1402.

The first device 1402 communicates 1504 a request for an identification (Device ID) of the second device 1504. The second device 1402 communicates 1506 a message including the Device ID of the second device 1404 and a device status 1508 (e.g., learn mode or operational mode). As an example, the device status 1508 may be a bit of the Device ID. The first device 1402 uses the Device ID of the second device 1404 to select which long-term key to use with the second device 1404. As an example, the first device 1402 may be a visor-mounted transmitter having three buttons each associated with a different second device 1404, such as two buttons for garage door operators and one button for a light. The first device 1402 establishes a different long-term key with each second device 1504 such that the first device 1402 uses the Device ID in communication 1506 to select the correct long-term key for the second device 1404 currently communicating with the first device 1402.

Once the first device 1402 receives the communication 1506, the first device 1402 initiates a bidirectional communication message sequence 1510 including the first and second devices 1402, 1404 validating the fixed and rolling codes of one another. The second device 1404 performs 1512 the action requested by the first device 1402 if the bidirectional communication message sequence 1510 is successful.

Figure 16A:
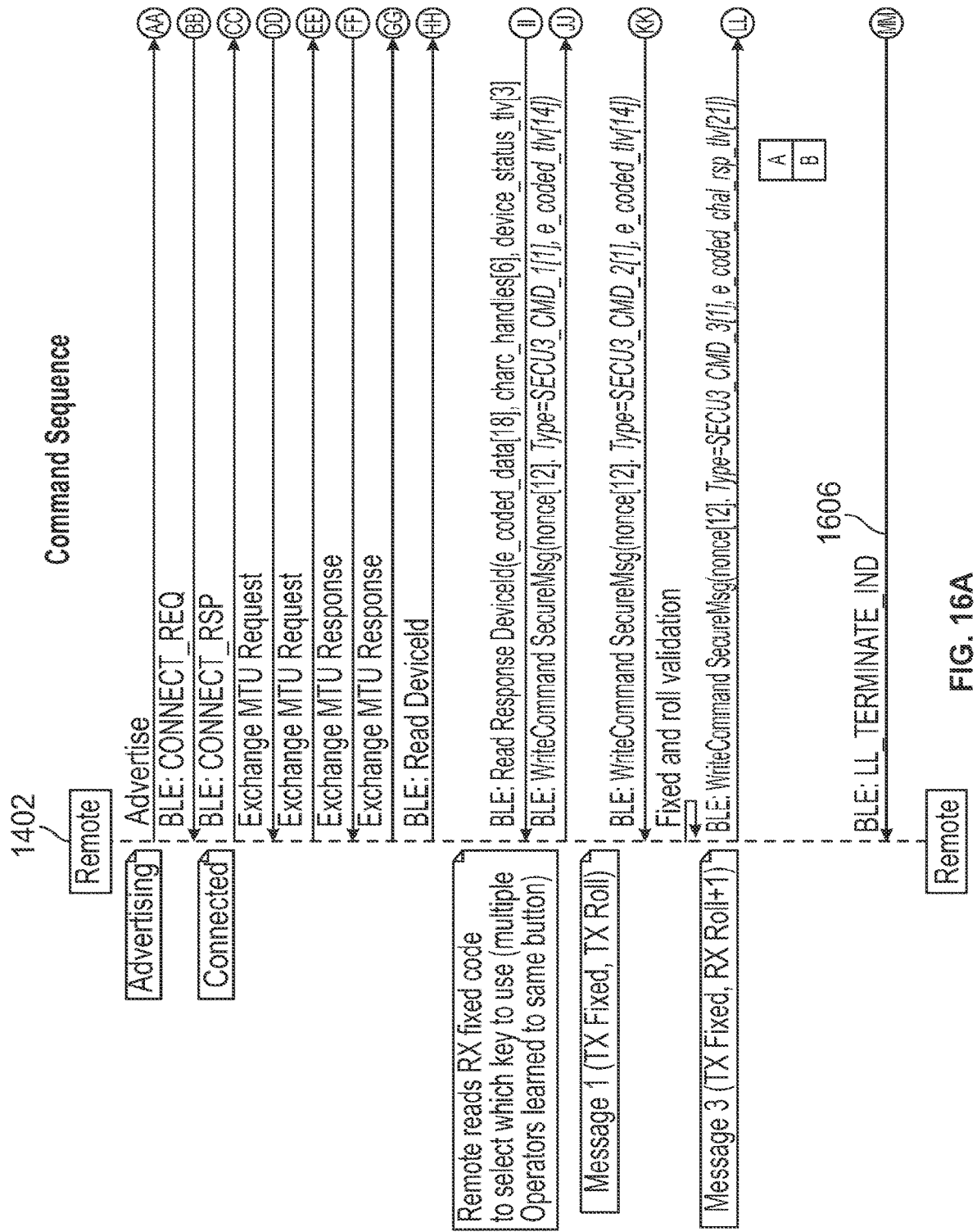
FIGS. 16A-B are flow diagrams of a method of a first device requesting a second device perform an action and the second device disconnecting from the first device after performing the action.
Figure 16B:
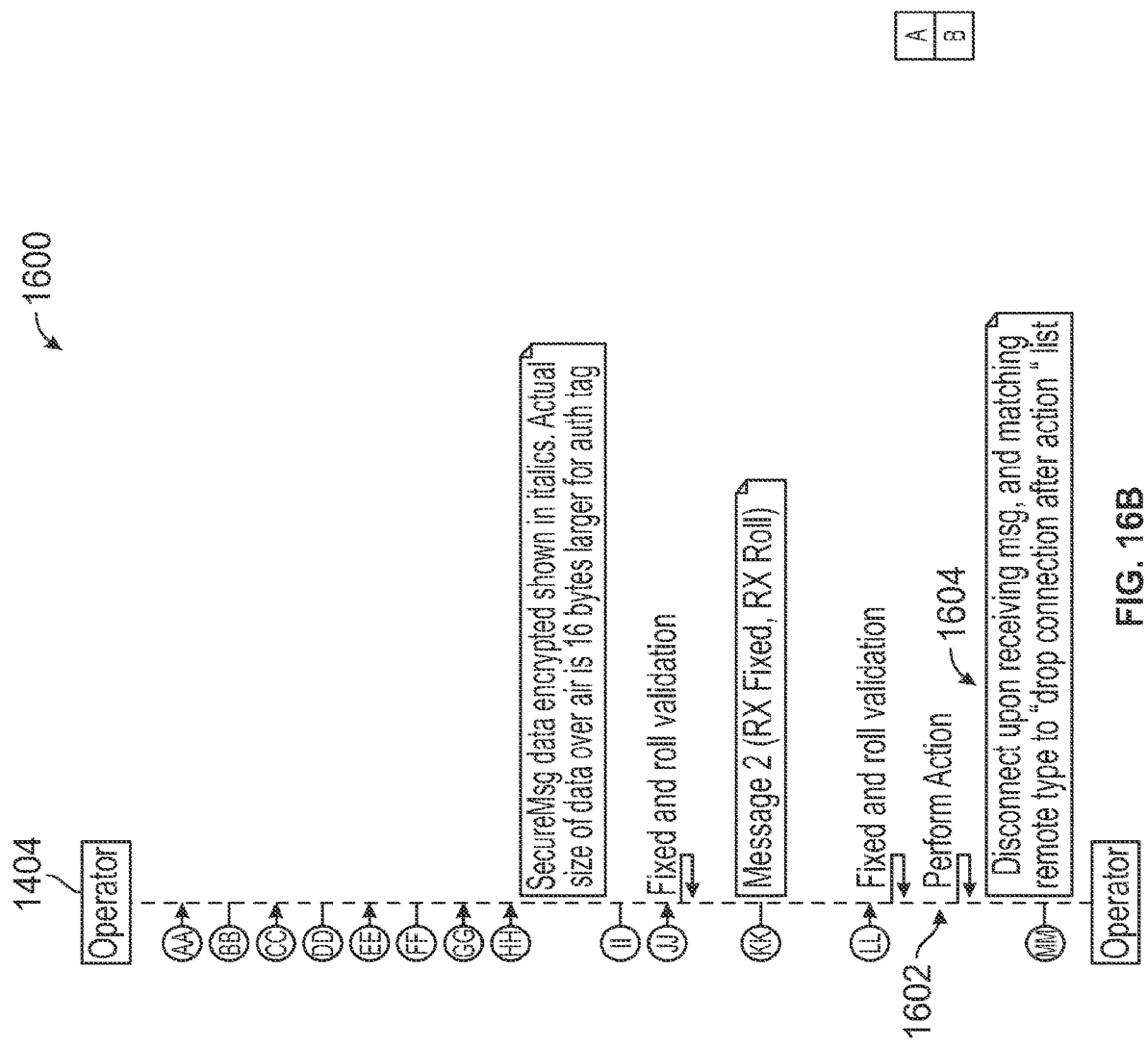

With reference to FIGS. 16A-B, the method 1600 is similar to the method 1500 discussed above such that differences will be highlighted. Specifically, the method 1600 includes the second device 1404 performing 1602 an action requested by the first device 1402 and determining 1604 whether to disconnect the first device 1402. In one embodiment, the determining 1604 checks whether the type of the first device 1402 is a type that should be disconnected after performing 1602 the action. For example, the second device 1404 may check whether the type of the first device 1402 is in a list of types stored in a memory of the second device 1404. If the second device 1404 determines 1604 to disconnect the first device 1402 after performing 1602 the requested action, the second device 1404 disconnects 1606 from the first device 1402.

Figure 17A:
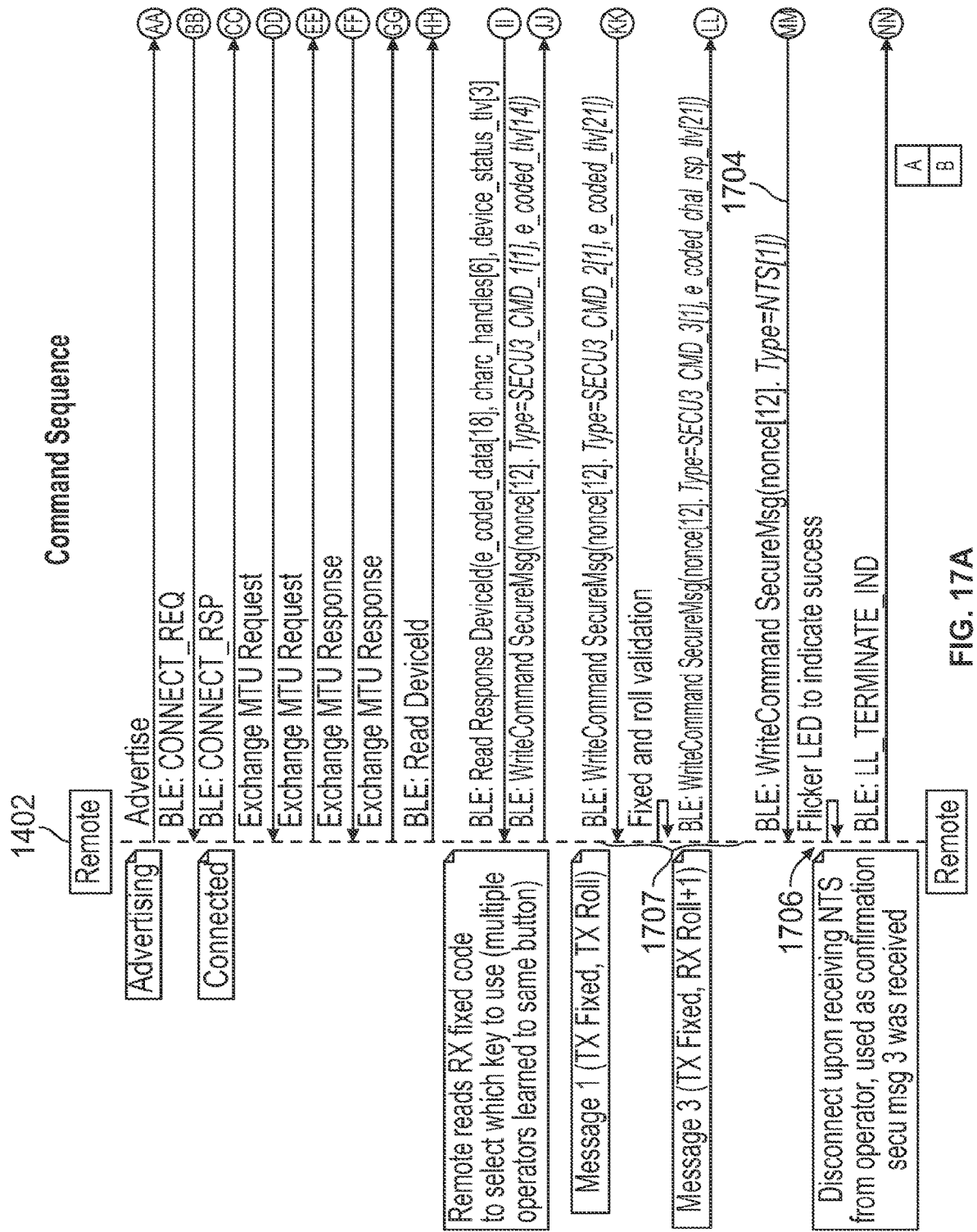

With reference to FIGS. 17A-B, the method 1700 is similar to the method 1600 discussed above. The method 1600 facilitates the first device 1402 requesting the second device 1404 perform 1702 an action. Once the second device 1404 performs 1702 the requested action, the second device 1404 communicates 1704 a nothing to send (NTS) message to the first device 1402. The first device 1402 determines the bidirectional communication message sequence 1707 was successful and the second device 1404 performed the requested action based on the receipt of the NTS message in communication 1704. The first device 1402 disconnects from the second device upon receiving the NTS message in communication 1704. Further, the first device 1402 provides a user output 1706 via a user interface of the first device 1402 to indicate to the user that the action was successfully performed by the first device 1402. The user output 1706 may include, for example, flickering a LED of the first device 1402.

Figure 18A:
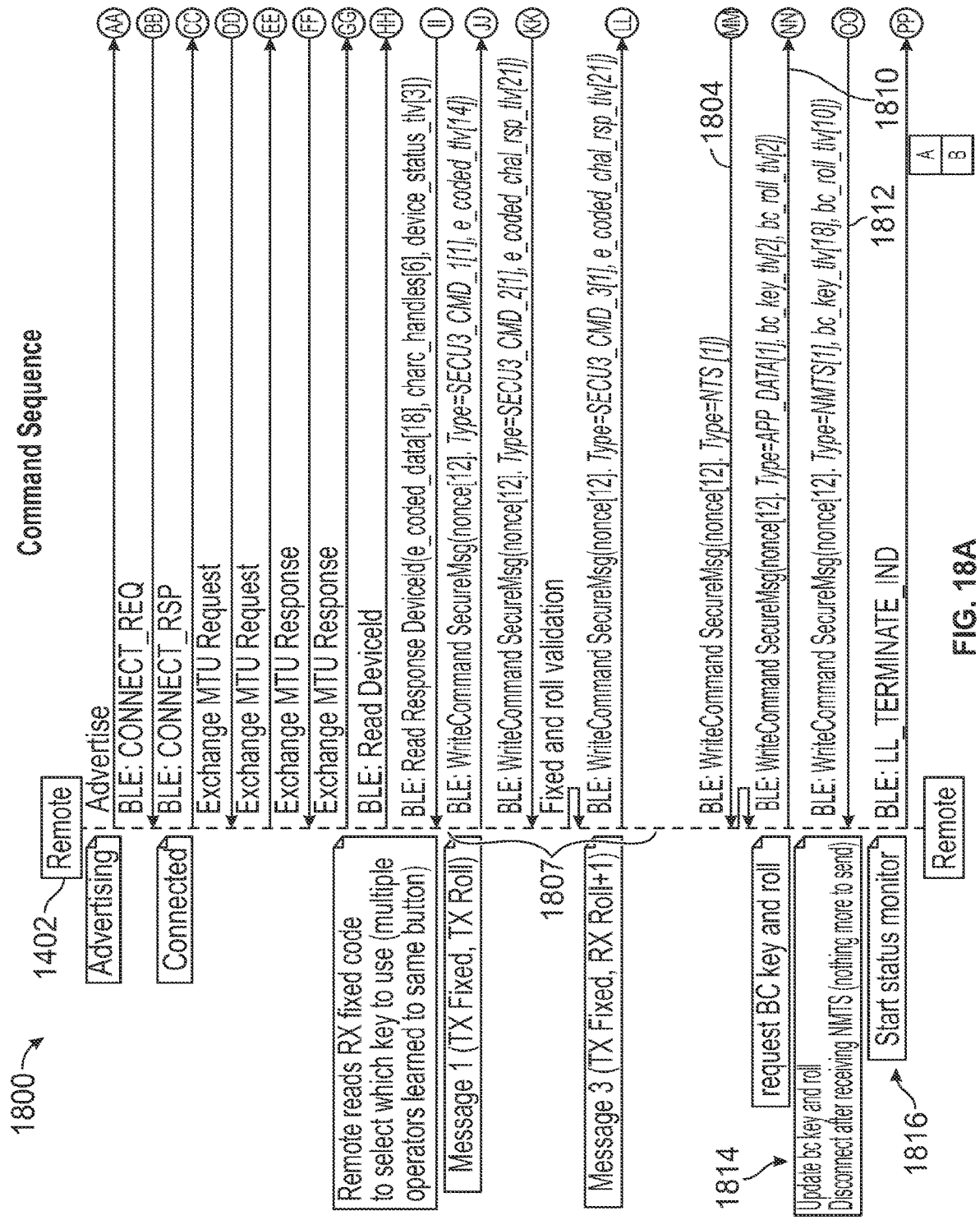
FIGS. 18A-B is a flow diagram of a method of a first device requesting a second device perform an action and requesting a broadcast key and a broadcast roll of the second device so that the first device may monitor the status of the second device.
Figure 18B:
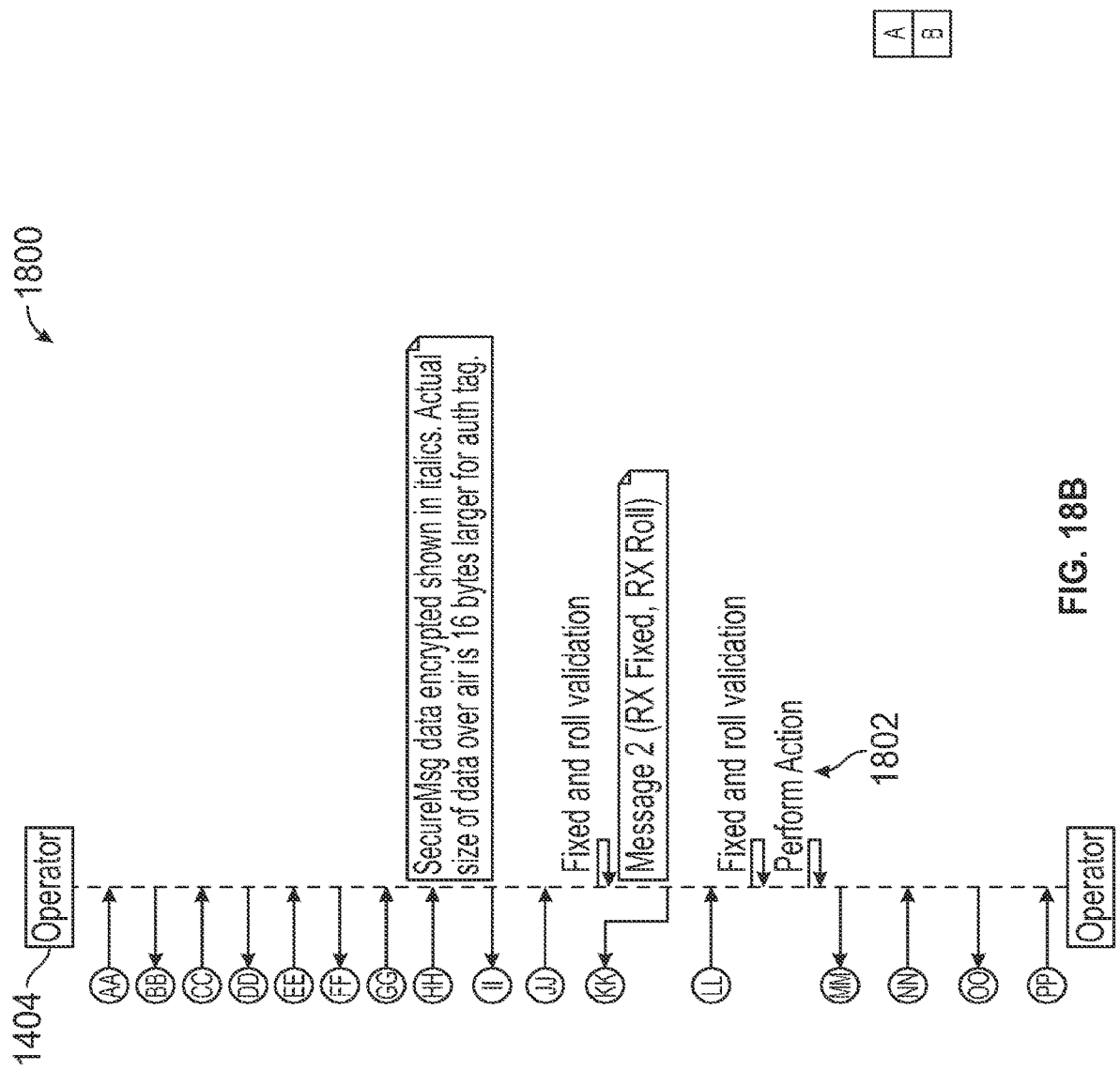

With reference to FIGS. 18A-B, the method 1800 is similar to the method 1500 discussed above. The method 1800 facilitates the first device 1402 requesting the second device 1404 perform 1802 an action and the first device 1402 monitoring the status of the second device 1404. Once the first device 1402 performs 1802 the requested action, the second device 1404 sends a communication 1804 including a NTS message to the first device 1402. Upon receiving the NTS message in communication 1804, the first device 1402 determines the bidirectional communication message sequence 1807 was successful.

The first device 1402 communicates 1810 a request for a broadcast key, broadcast sequence number, and broadcast rolling code from the second device 1404 so that the first device 1402 can decode a broadcast from the second device 1404, such as a current state of the second device 1404. The second device 1404 communicates 1812 a response including the broadcast key, broadcast sequence number, broadcast roll, and a nothing more to send (NTMS) message. The first device 1402 updates 1418 the broadcast key and broadcast rolling code stored in the first device 1402 for the second device 1404 and disconnects from the second device 1804 upon receiving the NTMS message.

The method 1800 next includes the first device 1402 starting a status monitoring operation 1816 wherein the first device 1402 scans for broadcasts from the second device 1404. The second device 1404 may broadcast messages to many peripheral devices (see system 2100 in FIG. 21). The first device 1402 decodes a broadcast from the second device 1404 using the broadcast key, broadcast sequence number, and broadcast roll. The first device 1402 may thereby determine one or more parameters of the second device 1404 from the broadcast, such as a current state, a change of state, etc.

Figure 19A:
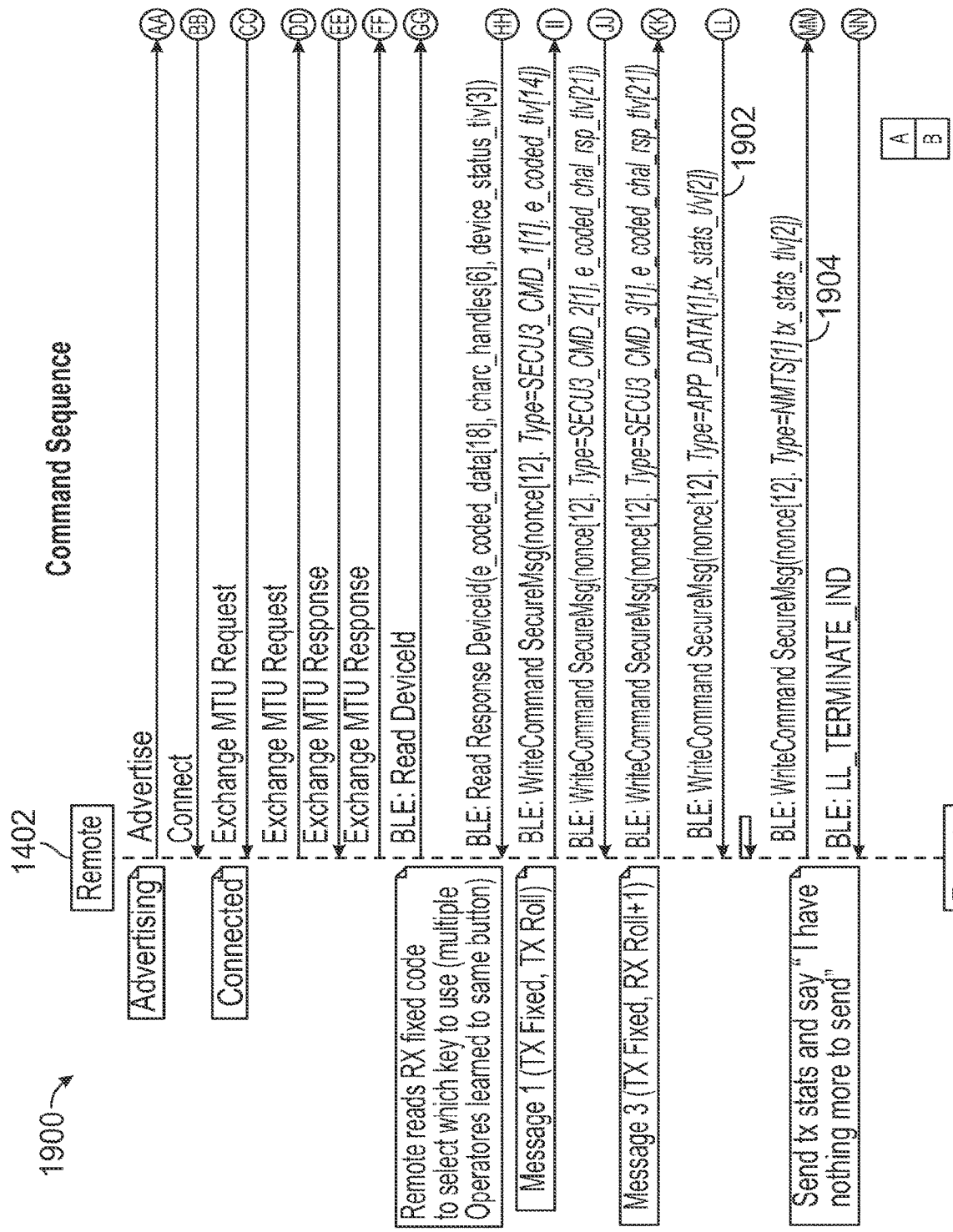
FIGS. 19A-B is a flow diagram of a method of a first device connecting with a second device and the second device requesting performance parameters from the first device.
Figure 19B:
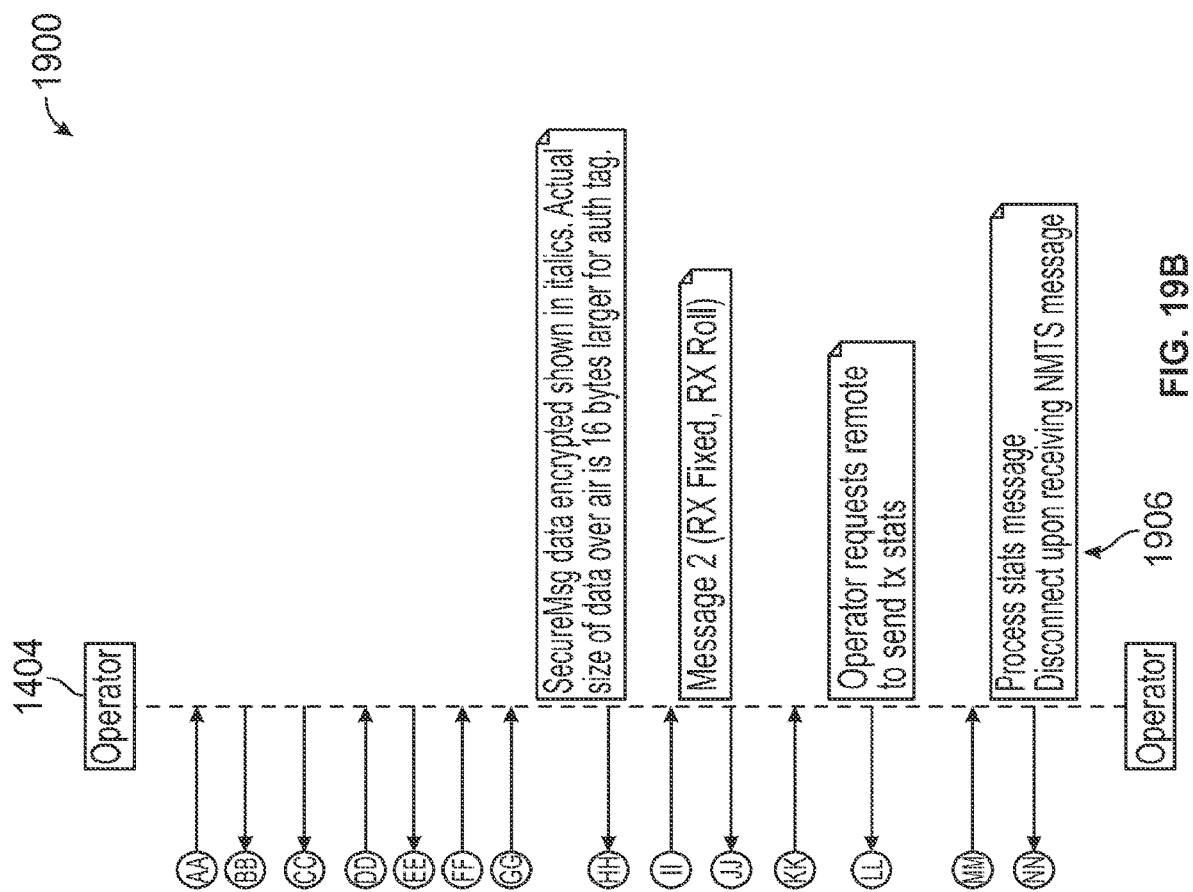

With reference to FIGS. 19A-B, the method 1900 is similar to the method 1800 discussed above. The method 1900 facilitates the first device 1402 connecting to the second device 1404 and the second device 1404 requesting 1902 one or more operational parameters of the first device 1402 such as performance parameters (e.g., statistics) of the first device 1402. The first device 1402 communicates 1904 a response including the requested data and a NMTS message. The second device 1404 processes 1906 the data from the first device 1402 and disconnects from the first device 1402.

Figure 20A:
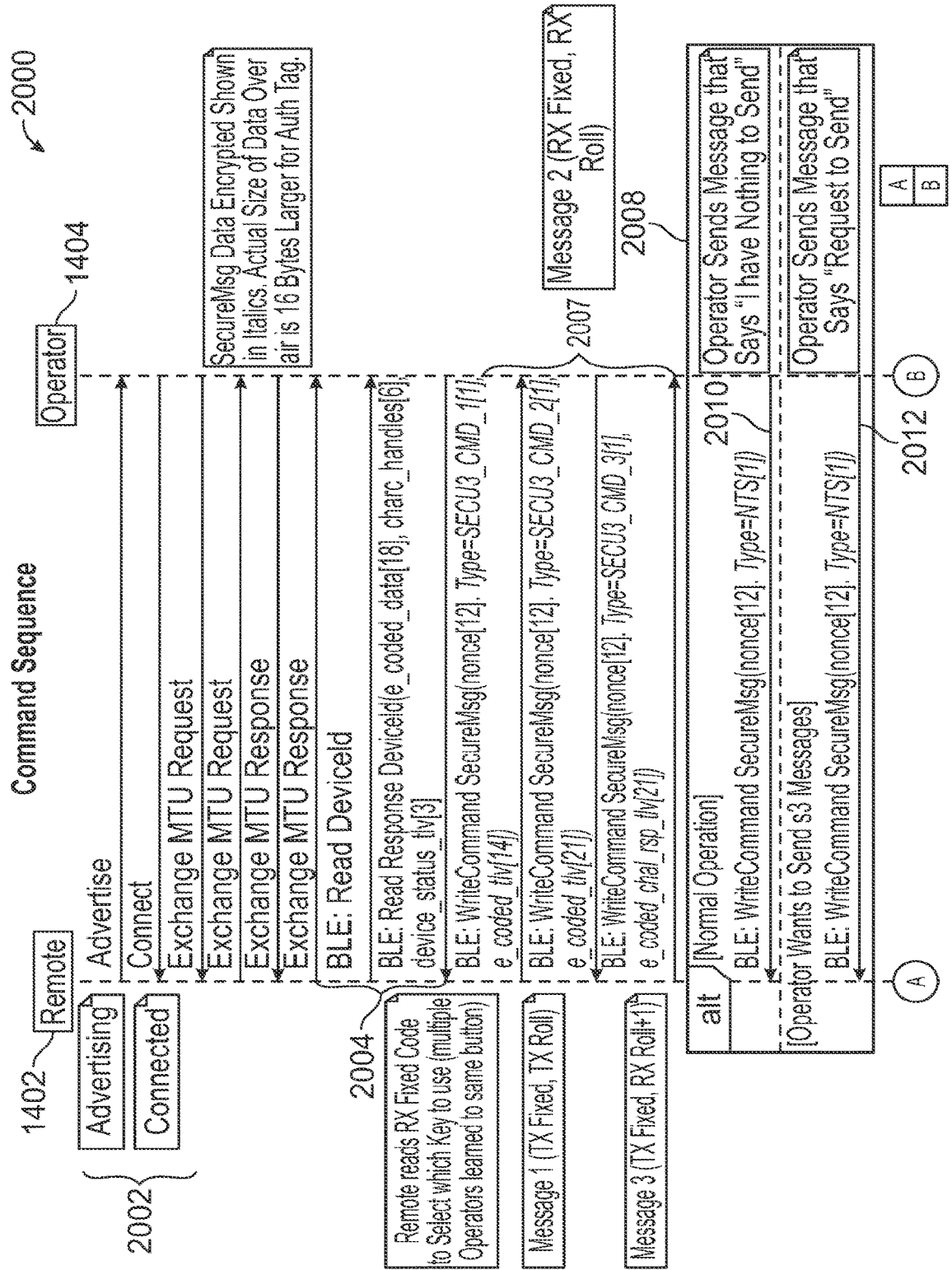
FIGS. 20A-B is a flow diagram of a method of a first device connecting with a second device and the second device determining whether to initiate a bidirectional communication sequence with the first device.
Figure 20B:
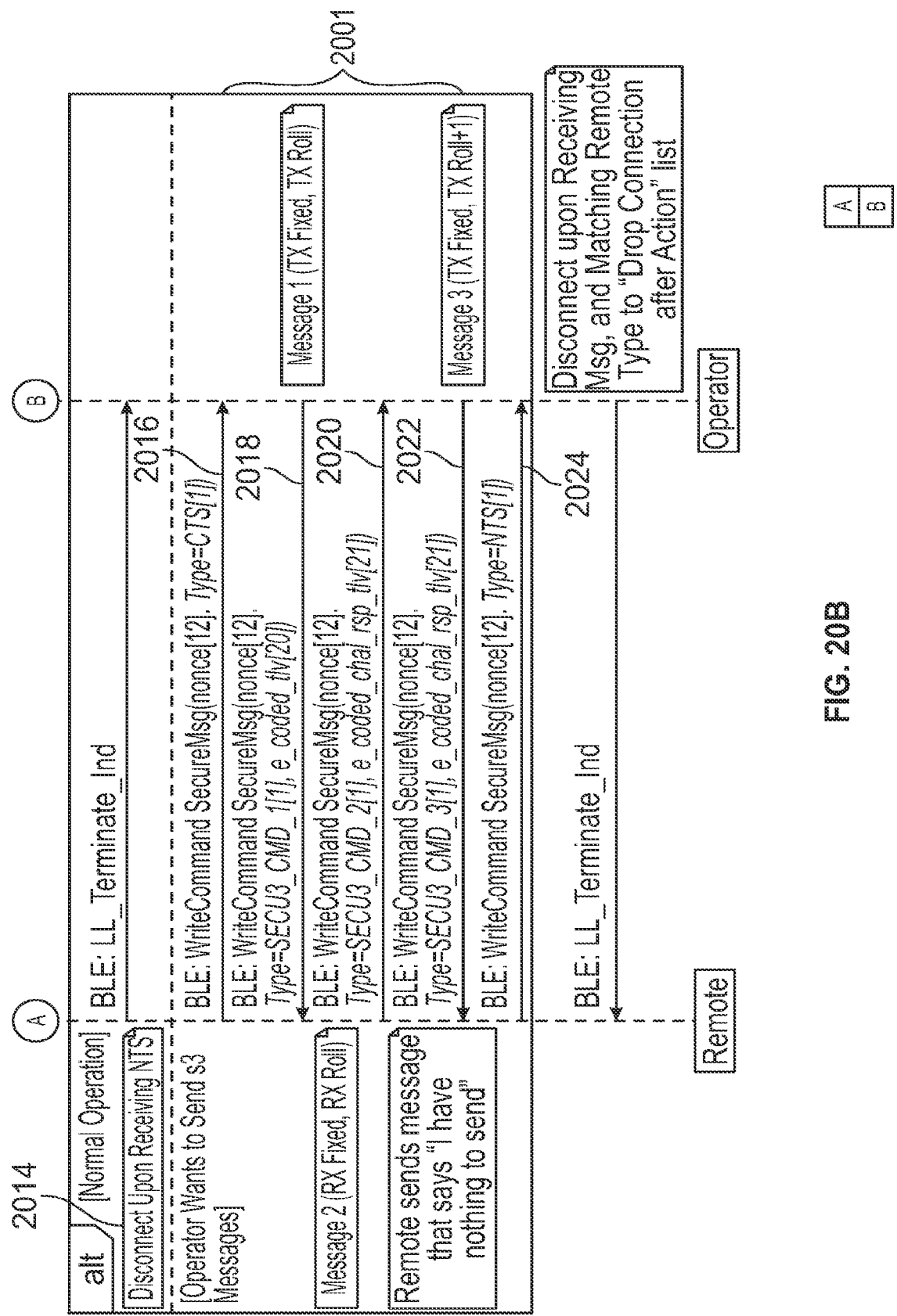

Regarding FIGS. 20A-B, the method 2000 is similar to the methods 1500-1900 discussed above and facilitates the second device 1404 initiating a secondary bidirectional communication message sequence 2001. The bidirectional communication message sequence 2001 permits the second device 1404 to become the initiator of a bidirectional communication session. The bidirectional communication message sequence 2001 effectively permits the first and second devices 1402, 1404 to temporarily switch roles. Specifically, the second device 1404 normally waits to receive a bidirectional communication message sequence command from the first device 1402 but, at sequence 2001, sends the bidirectional communication message sequence command to the first device 1402. The capability of the second device 1404 to initiate the bidirectional communication message sequence may be used by the second device 1404 to provide additional data and/or commands to the first device 1402.

The method 2000 includes an initial connection operation 2002, wherein the first device 1402 advertises and the second device 1404 responds, a Device ID exchange operation 2004 (which includes the second device 1404 providing its device status), and an initial bidirectional communication message sequence 2007.

At operation 2008, the second device 1404 decides whether to initiate the secondary bidirectional communication message sequence 2007. If the second device 1404 decides not to initiate the secondary bidirectional communication message sequence 2001, the second device 1404 sends a communication 2010 that includes a NTS message and the first device disconnects 2014 upon receiving the NTS message. If the second device 1404 decides to initiate the secondary bidirectional communication message sequence 2001, the second device 1404 communicates 2012 a Request to Send (RTS) message. Upon receiving the RTS message, the first device 1402 sends a communication 2016 including a Clear to Send (CTS) message.

Once the second device 1404 receives the CTS message, the second device 1404 initiates the secondary bidirectional communication message sequence 2001 and communicates 2018 a first message including a fixed code and a rolling code of the second device 1404. The first message communicated at operation 2018 may include data that effects a particular operation of the first device 1402. The first device 1402 communicates 2020 a second message including a fixed code and a rolling code of the first device 1402. The second device 1404 responds by communicating 2022 a third message including a fixed code of the second device 1404 and an incremented version of the rolling code of the first device 1402. After receiving the communication 2022, the first device communicates 2024 a NTS message and the second device 1404 disconnects from the first device 1402.

Figure 21:
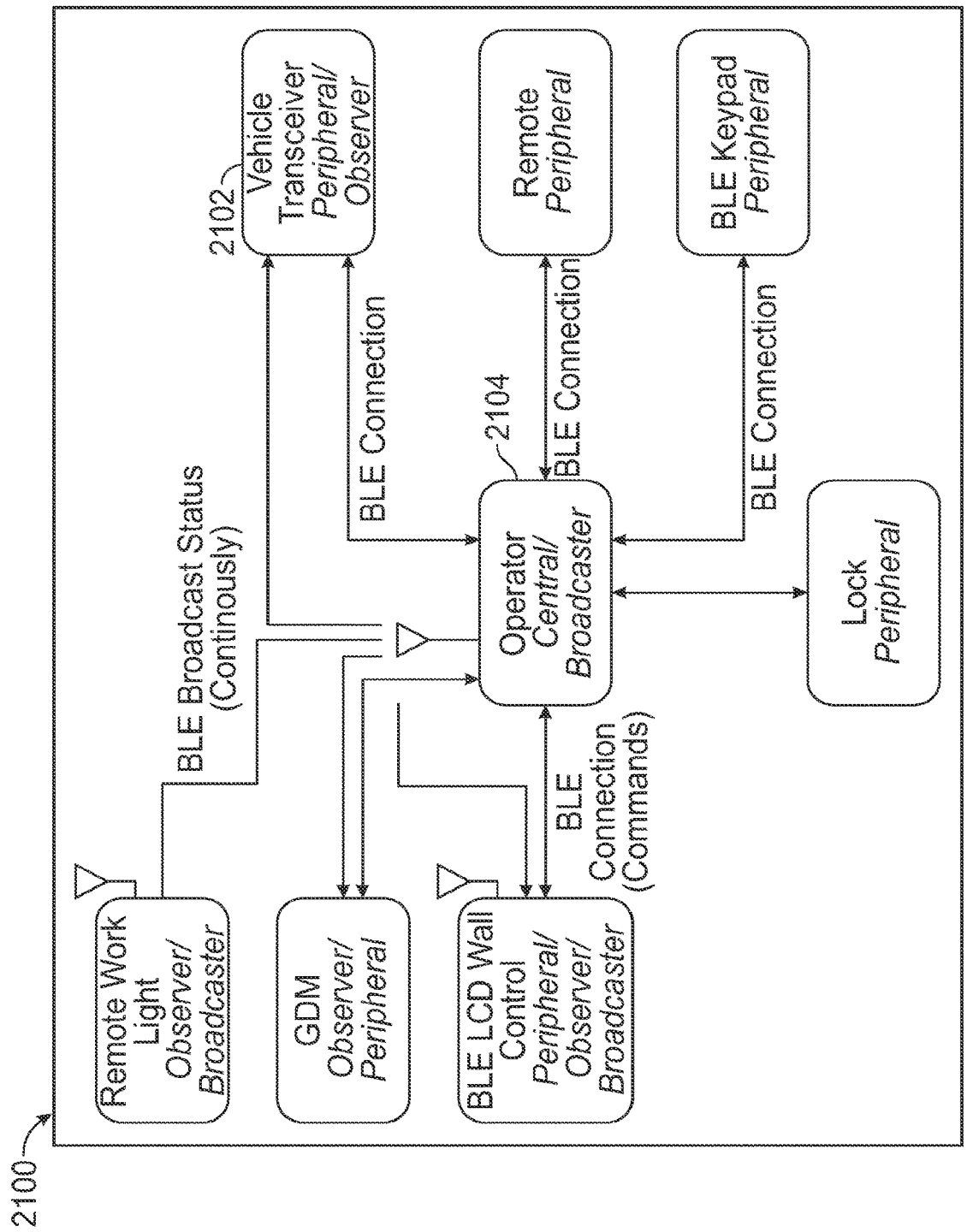
FIG. 21 is a schematic representation of an example system including a second device and first devices in communication with the second device.

With reference to FIG. 21, a block diagram of an example system 2100 is provided that includes one or more first devices 2102 that are similar to the first devices 1202, 1302, 1402 discussed above. The first devices 2102 may be peripheral devices including, for example, a vehicle transmitter such as a HomeLink® system, a handheld remote control, a wall control, a keypad, a work light, a lock, a garage door monitor (GDM), etc. The first devices 2102 are client devices and are capable of one-way or two-way communications with a second device 2104, such as a movable barrier operator, which operates as a server device. The second device 2104 is similar to the second devices 1204, 1304, 1404 discussed above. The second device 2104 may be learned by each of the first devices 2102 using any of the methods 1200, 1300, 1400 discussed above.

Figure 22:
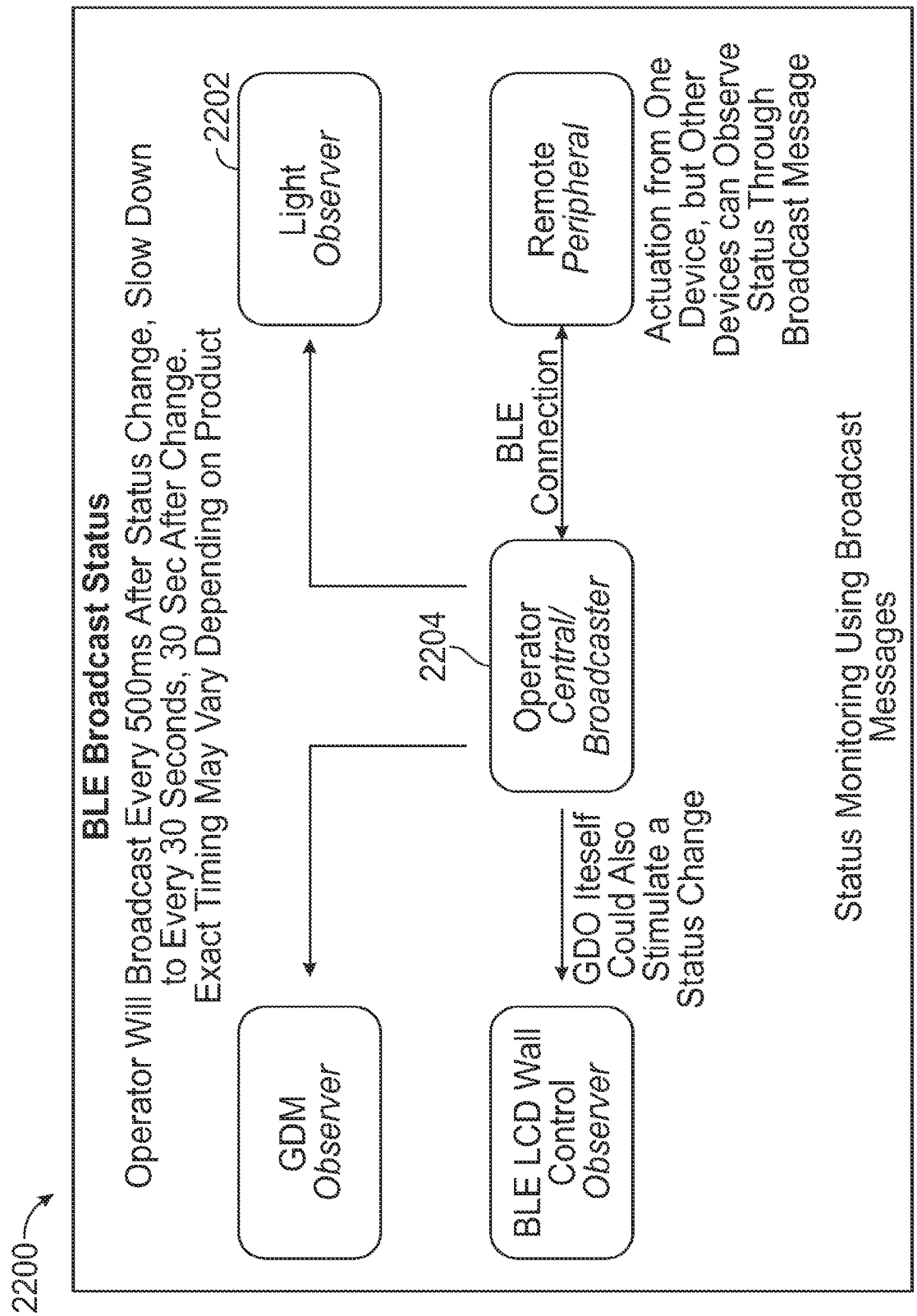
FIG. 22 is a schematic representation of an example system including a second device that periodically broadcasts and first devices that monitor the status of the second device via the broadcasts.

Turning to FIG. 22, another example system 2200 block diagram is provided that is similar to the system 2100. The system 2200 includes one or more first devices 2202 and a second device 2204. The one or more first devices 2102 may send a command to the second device 2104 to perform an action. Alternatively or additionally, the first devices 2102 receive updates regarding the status of the second device 2204 via periodic broadcasts from the second device 2204. The broadcasts from the second device 2204 may include an unencrypted portion and an encrypted portion. In some embodiments, one or more of the first devices 2102 broadcast and the second device 2104 advertises.

A broadcast has a protocol data unit (PDU) including an unencrypted universally unique ID (UUID) that may be used by observer devices to identify the second device 2104. For example, the observer devices may associate the UUID of the second device 2104 as utilizing an encryption technique that is supported by the observer device. The broadcast PDU contains a fixed code and a rolling code of the second device 1404 so that an observer device can listen for specific devices that the observer device is interested in or compatible with. Further, the broadcast PDU including the fixed code and rolling code of the second device 1404 also permits the first device 1402 to exclude messages with an invalid rolling code or messages the observing device has already processed. The unencrypted portion of the broadcast PDU also contains a nonce that is used to encrypt an encrypted portion of the broadcast PDU.

The encrypted portion of the broadcast PDU includes device status and other type-length-values (TLVs). The encrypted portion of the broadcast PDU is encrypted using the nonce, additional authentication data relating to the bidirectional communication message sequence, and the broadcast key.

An advertisement has a format similar to a broadcast. The PDUs for advertisements and the broadcasts differ in the UUIDs in the PDU and in the Manufacturer Specific Data (MSD). While scanning for advertisements or broadcasts, the PDU of a received communication is examined for the appropriate UUID in the specification of the PDU. Once the communication-receiving device 2102, 2104 determines the communication is the appropriate type (e.g., a first device 2202 advertising for connection or a second device 2204 broadcasting a status), the data relating to the bidirectional communication message sequence of the MSD is examined to determine if the communication-transmitting device 2102, 2104 has a recognized Device ID.

Figure 23:
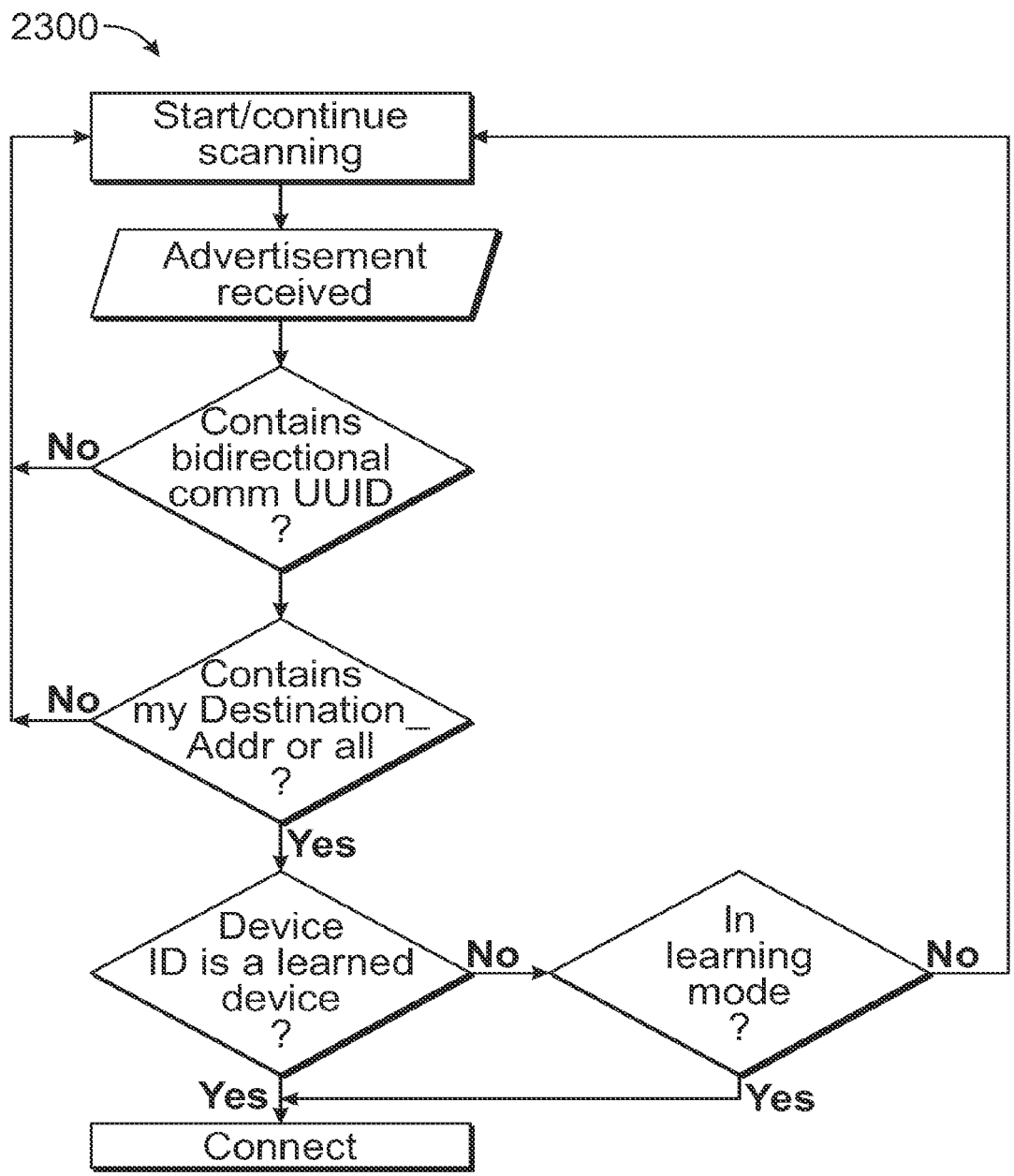
FIG. 23 is a flow diagram of a method including a second device deciding whether to connect to a first device upon the second device receiving an advertisement from the first device.

More specifically and with reference to FIG. 23, a method 2300 is provided is provided to facilitate the second device 2204 filtering advertisements from first devices 2202 and determining whether the second device 2204 should connect to a first device 2202. The method includes the second device 2204 receiving an advertisement from a first device 2202 and examining the advertisement for the appropriate UUID in the specified position of the PDU. Once the second device 2204 has determined that the advertisement from the first device 2202 is the appropriate communication type, the bidirectional communication message section of the MSD can be examined to determine if the first device 2202 has a Device ID of a learned first device 2202. If the Device ID corresponds to a learned first device 2202, the second device 2204 connects to the first device 2202. If the Device ID does not correspond to a learned first device 2202, but the second device 2204 is in the learn mode, the second device 2204 connects to the communication-transmitting device 2204.

Figure 24:
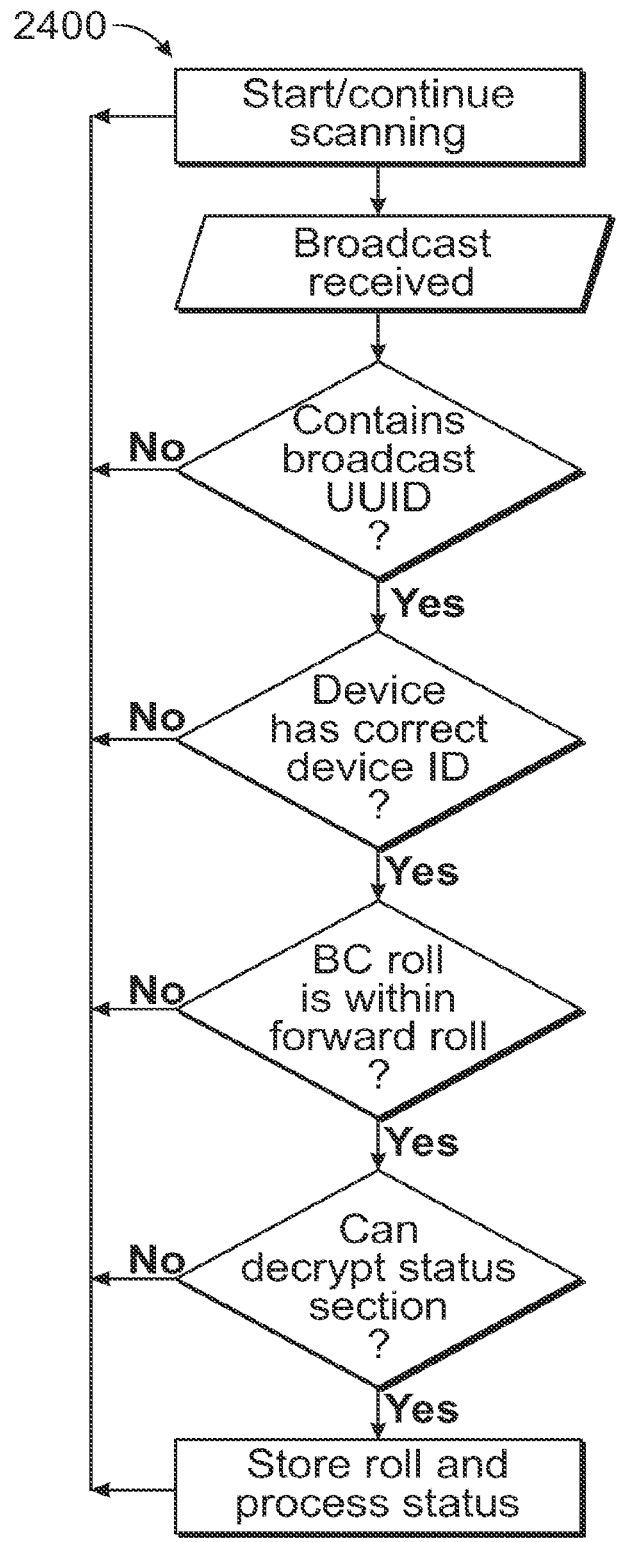
FIG. 24 is a flow diagram of a method including a first device receiving a broadcast from a second device and deciding whether to store a rolling code of the broadcast and a status of the second device.

Regarding FIG. 24, a method 2400 is provided to facilitate the first device 2202 filtering broadcasts for a particular second device 2204. The method 2400 includes checking whether a received broadcast includes a broadcast UUID, whether the broadcasting device has the correct Device ID, whether the broadcast rolling code is within an expected range of rolling codes, and whether the status section of the broadcast can be decrypted. If these requirements are met, the first device 2202 stores the rolling code value of the broadcast and processes the status data of the broadcast from the second device 2204.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A method of effecting secure communications for a first device and a second device, the method comprising:
    transmitting a first public key of the first device to the second device;
    transmitting a second public key of the second device to the first device;
    determining, at the first device, a shared secret session key based at least in part upon a first private key of the first device and the second public key of the second device;
    determining, at the second device, the shared secret session key based at least in part upon a second private key of the second device and the first public key of the first device;
    transmitting, from the first device to the second device, a first message encrypted using the shared secret session key, the first message including a first fixed code and a first changing code;
    transmitting, from the second device to the first device, a second message encrypted using the shared secret session key, the second message including a second fixed code and a second changing code;
    transmitting, from the first device to the second device, a third message encrypted using the shared secret session key, the third message including the first fixed code and a changed version of the first changing code;
    validating, by the second device, the third message based at least in part on the first fixed code, the first changing code, and the changed version of the first changing code;
    transmitting, from the second device to the first device, a fourth message encrypted using the shared secret session key in response to the second device validating the third message, the fourth message including the second fixed code, a changed version of the second changing code, and a long-term key;
    transmitting, from the first device to the second device, a fifth message encrypted using the long-term key;
    decrypting, by the second device, the fifth message using the long-term key; and
    performing, by the second device, an action in response to validating the fifth message.

2. The method of claim 1 wherein transmitting the first and second public keys includes transmitting at least one of the first and second public keys using an unencrypted transmission.

3. The method of claim 1 further comprising transmitting a certificate between the first and second devices; and
    validating the certificate using a certificate authority.

4. The method of claim 3 further comprising:
    transmitting a challenge between the first and second devices;
    transmitting a response to the challenge between the first and second devices, the response signed with a private key associated with the certificate; and
    validating the response with a public key of the certificate.

5. The method of claim 1 further comprising:
    transmitting a certificate between the first and second devices;
    validating the certificate using a certificate authority;
    transmitting a challenge between the first and second devices;
    generating a response to the challenge comprising:
        concatenating the shared secret session key with random data; and
        signing an output of the concatenating with a private key associated with the certificate; and
        transmitting the response between the first and second devices; and
    validating the response based at least in part upon a public key embedded in the certificate.

6. The method of claim 1 further comprising:
    transmitting a certificate of the first device to the second device;

validating, by the second device, the certificate;
transmitting a challenge from the second device to the first device;
transmitting a response to the challenge from the first device to the second device, the response comprising the challenge signed with a private key associated with the certificate;
validating, by the second device, the response based at least in part on a public key of the certificate;
transmitting a request from the second device to the first device; and
wherein transmitting the first message from the first device to the second device comprises transmitting the first message in response to the first device receiving the request from the second device.

7. A system comprising:
a first device comprising a first transmitter, a first receiver, and a first controller operatively connected to the first transmitter and the first receiver, the first controller configured to:
  determine a first public key and a first private key;
  control the first transmitter to transmit the first public key of the first device to a second device;
  receive through the first receiver a second public key of the second device;
  determine a shared secret session key based at least in part upon the first private key and the second public key;
  control the first transmitter to transmit to the second device a first message encrypted using the shared secret session key, the first message including a first fixed code and a first changing code;
  receive through the first receiver a second message from the second device;
  control the first transmitter to transmit to the second device a third message encrypted using the shared secret session key, the third message including the first fixed code and a changed version of the first changing code;
  receive through the first receiver a fourth message from the second device;
wherein the second device comprises a second transmitter, a second receiver, and a second controller operatively connected to the second transmitter and the second receiver, the second controller configured to:
  determine the second public key and a second private key;
  receive through the second receiver the first public key from the first device;
  control the second transmitter to transmit the second public key to the first device;
  determine the shared secret session key based at least in part upon the second private key and the first public key;
  receive through the second receiver the first message;
  control the second transmitter to transmit to the first device the second message encrypted using the shared secret session key, the second message including a second fixed code and a second changing code;
  receive through the second receiver the third message;
  validate the third message based at least in part on the first fixed code, the first changing code, and the changed version of the first changing code;
  control the second transmitter to transmit to the first device the fourth message encrypted using the shared secret session key, the fourth message including the second fixed code, a changed version of the second changing code, and a long-term key;
wherein the first controller is further configured to control the first transmitter to transmit a fifth message encrypted using the long-term key to the second device in response to a user interface receiving a user input; and
wherein second controller is further configured to decrypt the fifth message using the long-term key and cause the second device to perform an action in response to validating the fifth message.

8. The system of claim 7 wherein the first device includes a memory configured to store a certificate;
wherein the first controller is configured to:
  control the first transmitter to transmit to the second device the certificate encrypted using the shared secret session key;
  receive through the first receiver a challenge from the second device;
  control the first transmitter to transmit a response to the challenge, the response comprising the challenge signed with a private key of the first device associated with the certificate;
wherein the second controller is configured to:
  receive through the second receiver the certificate;
  validate the certificate using a certificate authority;
  control the second transmitter to transmit the challenge;
  receive through the second receiver the response;
  validate the response based at least in part on a public key of the certificate; and
  transmit a request to the first device, the request configured to cause the first device to transmit the first message.

9. An apparatus for communicating with a second device to cause the second device to perform an action, the apparatus comprising:
a transmitter;
a receiver;
a memory; and
a controller operatively connected to the transmitter, the receiver, and the memory, the controller configured to:
  determine a first public key and a first private key;
  control the transmitter to transmit the first public key to the second device;
  receive through the receiver a second public key of the second device;
  determine a shared secret session key based at least in part upon the first private key and the second public key;
  control the transmitter to transmit to the second device a first message encrypted using the shared secret session key, the first message including a first fixed code and a first changing code;
  receive through the receiver a second message from the second device, the second message encrypted using the shared secret session key and including a second fixed code and a second changing code;
  control the transmitter to transmit to the second device a third message encrypted using the shared secret session key, the third message including the first fixed code and a changed version of the first changing code;
  receive through the receiver a fourth message from the second device, the fourth message encrypted using the shared secret session key and including the second fixed code, a changed version of the second changing code, and a long-term key;

store the long-term key in the memory for encryption of subsequent communications to the second device; and transmit a fifth message encrypted using the long-term key to the second device in response to a user interface receiving a user input, wherein the fifth message is configured to, upon decryption using the long-term key and validation by the second device, cause the second device to perform an action.

10. The apparatus of claim 9 wherein the controller is configured to control the transmitter to transmit the first public key to the second device using an unencrypted transmission.

11. The apparatus of claim 9 wherein the controller is configured to:

control the transmitter to transmit a certificate to the second device;

receive through the receiver a challenge from the second device;

generate a response to the challenge, the response comprising the challenge signed with a private key associated with the certificate; and control the transmitter to transmit the response to the second device for validation by the second device.

12. The apparatus of claim 11 wherein the controller is configured to:

receive through the receiver a request from the second device upon a successful validation of the response by the second device; and control the transmitter to transmit the first message in response to receiving the request.

13. The apparatus of claim 11 wherein the controller is configured to control the transmitter to transmit the certificate and the response via transmissions encrypted using the shared secret session key.

14. The apparatus of claim 11 wherein to generate the response includes:

concatenating the shared secret session key with random data; and signing an output of the concatenating with the private key associated with the certificate.

15. The apparatus of claim 9 wherein to determine the shared secret session key includes determining the shared secret session key using an elliptic curve cryptographic protocol.

16. The apparatus of claim 9 including a transceiver comprising the transmitter and the receiver.

17. The apparatus of claim 9 the controller is configured to transmit the first message and the second message using radio frequency signals.

* * * * *